United States Patent
Kerkvliet et al.

(10) Patent No.: US 12,208,642 B2
(45) Date of Patent: Jan. 28, 2025

(54) VEHICLE TIRE BEAD RETENTION SYSTEMS, DEVICES, AND METHODS

(71) Applicant: ICON VEHICLE DYNAMICS LLC, Riverside, CA (US)

(72) Inventors: Caleb Bernard Kerkvliet, Crestline, CA (US); Dylan Samuel Evans, Corona, CA (US)

(73) Assignee: ICON VEHICLE DYNAMICS LLC, Riverside, CA (US)

(*) Notice: Subject to any disclaimer, the term of this patent is extended or adjusted under 35 U.S.C. 154(b) by 710 days.

(21) Appl. No.: 17/445,028

(22) Filed: Aug. 13, 2021

(65) Prior Publication Data

US 2022/0118793 A1 Apr. 21, 2022

Related U.S. Application Data

(63) Continuation of application No. 17/227,003, filed on Apr. 9, 2021, now Pat. No. 11,090,976.

(60) Provisional application No. 63/150,263, filed on Feb. 17, 2021, provisional application No. 63/115,175, filed on Nov. 18, 2020, provisional application No. 63/093,424, filed on Oct. 19, 2020.

(51) Int. Cl.
  *B60B 21/10* (2006.01)
  *B60B 21/02* (2006.01)
  *B60B 21/12* (2006.01)

(52) U.S. Cl.
  CPC .......... *B60B 21/102* (2013.01); *B60B 21/023* (2013.01); *B60B 21/12* (2013.01)

(58) Field of Classification Search
  CPC ..................................................... B60B 21/02
  See application file for complete search history.

(56) References Cited

U.S. PATENT DOCUMENTS

| | | | |
|---|---|---|---|
| 2,198,978 | A | 4/1940 | Sauer |
| 2,381,382 | A | 8/1945 | Hale |
| 2,393,494 | A | 1/1946 | Hale |
| 2,409,666 | A | 10/1946 | Comey |
| 2,427,216 | A | 9/1947 | Kraft |
| 3,759,307 | A | 9/1973 | Walther et al. |
| 3,916,970 | A | 11/1975 | Owens |
| 3,918,508 | A | 11/1975 | Mitchell |

(Continued)

FOREIGN PATENT DOCUMENTS

| | | |
|---|---|---|
| CN | 2740722 Y | 11/2005 |
| CN | 106163826 A | 11/2016 |

(Continued)

OTHER PUBLICATIONS

International Search Report and Written Opinion for Application No. PCT/US2021/071707 mailed Dec. 22, 2021.

(Continued)

*Primary Examiner* — Scott A Browne
(74) *Attorney, Agent, or Firm* — KNOBBE, MARTENS, OLSON & BEAR, LLP

(57) ABSTRACT

A wheel assembly includes a rim having a primary tire bead retention ridge; a plurality of secondary bead retention members; and a plurality of sealing members. The plurality of secondary bead retention members are removably coupleable to receptacles of the rim such that a portion of each secondary bead retention member extends into a pressurized portion of the wheel, is positioned behind a tire bead seat, and extends radially beyond the primary tire bead retention ridge.

23 Claims, 35 Drawing Sheets

(56) References Cited

U.S. PATENT DOCUMENTS

| | | |
|---|---|---|
| 3,933,392 A | 1/1976 | Wells |
| 3,983,918 A | 10/1976 | French |
| 4,016,917 A | 4/1977 | Victor |
| 4,709,738 A | 12/1987 | Goodell et al. |
| 4,997,235 A | 3/1991 | Braungart |
| 5,390,718 A | 2/1995 | Victor |
| 5,556,489 A | 9/1996 | Curlett et al. |
| 6,814,114 B2 | 11/2004 | Bouvier et al. |
| 8,151,846 B2 | 4/2012 | Lipper |
| D660,220 S | 5/2012 | Chan |
| D680,940 S | 4/2013 | Hale, Jr. |
| D704,122 S | 5/2014 | Chung |
| D714,708 S | 10/2014 | Chung |
| D721,318 S | 1/2015 | Kim |
| D726,630 S | 4/2015 | Kong |
| D727,829 S | 4/2015 | Chung |
| 9,358,845 B2 | 6/2016 | Franklin |
| D769,785 S | 10/2016 | Wels |
| 9,616,717 B2 | 4/2017 | Marsaly et al. |
| D800,628 S | 10/2017 | Tran |
| D817,844 S | 5/2018 | Hale, Jr. |
| D818,412 S | 5/2018 | Oldham |
| D821,284 S | 6/2018 | Tran |
| D823,214 S | 7/2018 | Chung |
| D826,827 S | 8/2018 | Tran |
| D830,268 S | 10/2018 | Hale, Jr. |
| D832,765 S | 11/2018 | Han |
| D833,942 S | 11/2018 | Chung |
| D835,021 S | 12/2018 | Sempek |
| D845,863 S | 4/2019 | Chung |
| D847,718 S | 5/2019 | Han |
| D848,927 S | 5/2019 | Kleinschuster |
| D849,653 S | 5/2019 | Chung |
| D852,111 S | 6/2019 | Kong |
| D856,245 S | 8/2019 | Hale, Jr. |
| 10,377,171 B2 | 8/2019 | Teixeira |
| D859,277 S | 9/2019 | Hale, Jr. |
| D860,099 S | 9/2019 | Milani |
| D878,992 S | 3/2020 | Yeh |
| D893,378 S | 8/2020 | DiGuglielmo et al. |
| 2013/0234497 A1 | 9/2013 | Franklin |
| 2017/0108074 A1 | 4/2017 | Lim |
| 2017/0253077 A1 | 9/2017 | Werner et al. |
| 2018/0370303 A1 | 12/2018 | Krefting |
| 2019/0389247 A1 | 12/2019 | Osawa et al. |

FOREIGN PATENT DOCUMENTS

| | | |
|---|---|---|
| CN | 208411287 U | 1/2019 |
| CN | 109798725 A | 5/2019 |
| CN | 110682730 A | 1/2020 |
| CN | 110799351 A | 2/2020 |
| CN | 110871647 A | 3/2020 |
| CN | 215284202 U | 12/2021 |
| DE | 2415254 A1 | 10/1975 |
| KR | 930009807 A | 6/1993 |

OTHER PUBLICATIONS

IPGParts.com, Tech Article: How to Install rim Screws, Jun. 25, 2010, in 6 pages.

Moparts Tech Archive, Wheels, Wheel screws for slicks location diametral, May 29, 2001, in 7 pages.

Race Tire Tutorial: A Guide to Tire tubes, Tire Screws, and Beadlocks (and What's rights for You)! Posted by Wayne Scraba on Oct. 13, 2016 on On All Cylinders an Automotive Blog in 10 pages.

Techtips—Drag Racing Traction: Tire Guide, Car Tech Auto Books & Manuals, Mar. 16, 2015, in 30 pages.

Tire Screw Installation Procedures, Sep. 13, 2010, in 1 page.

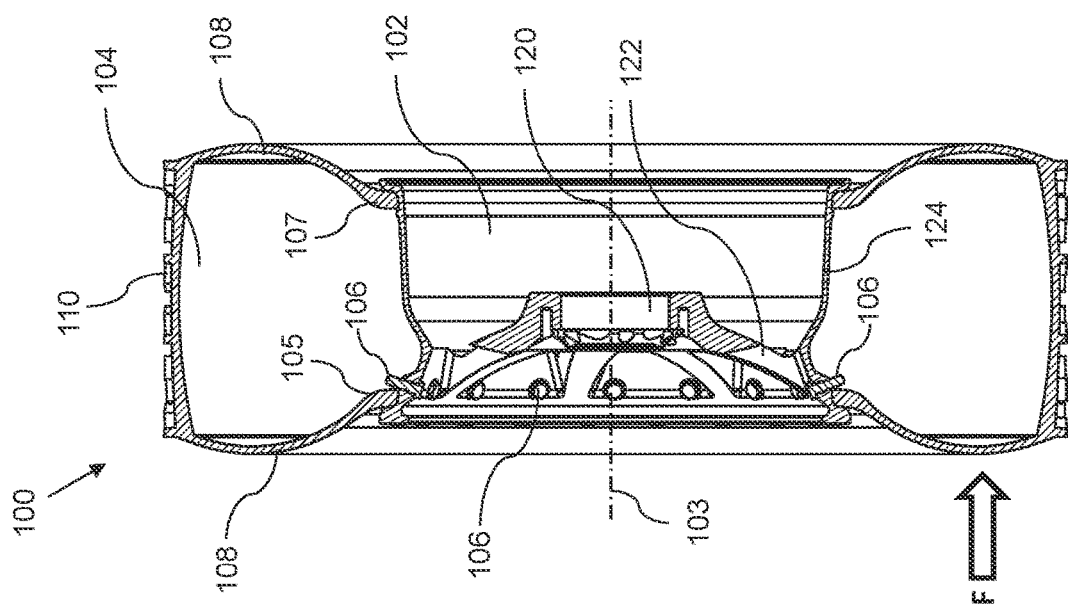
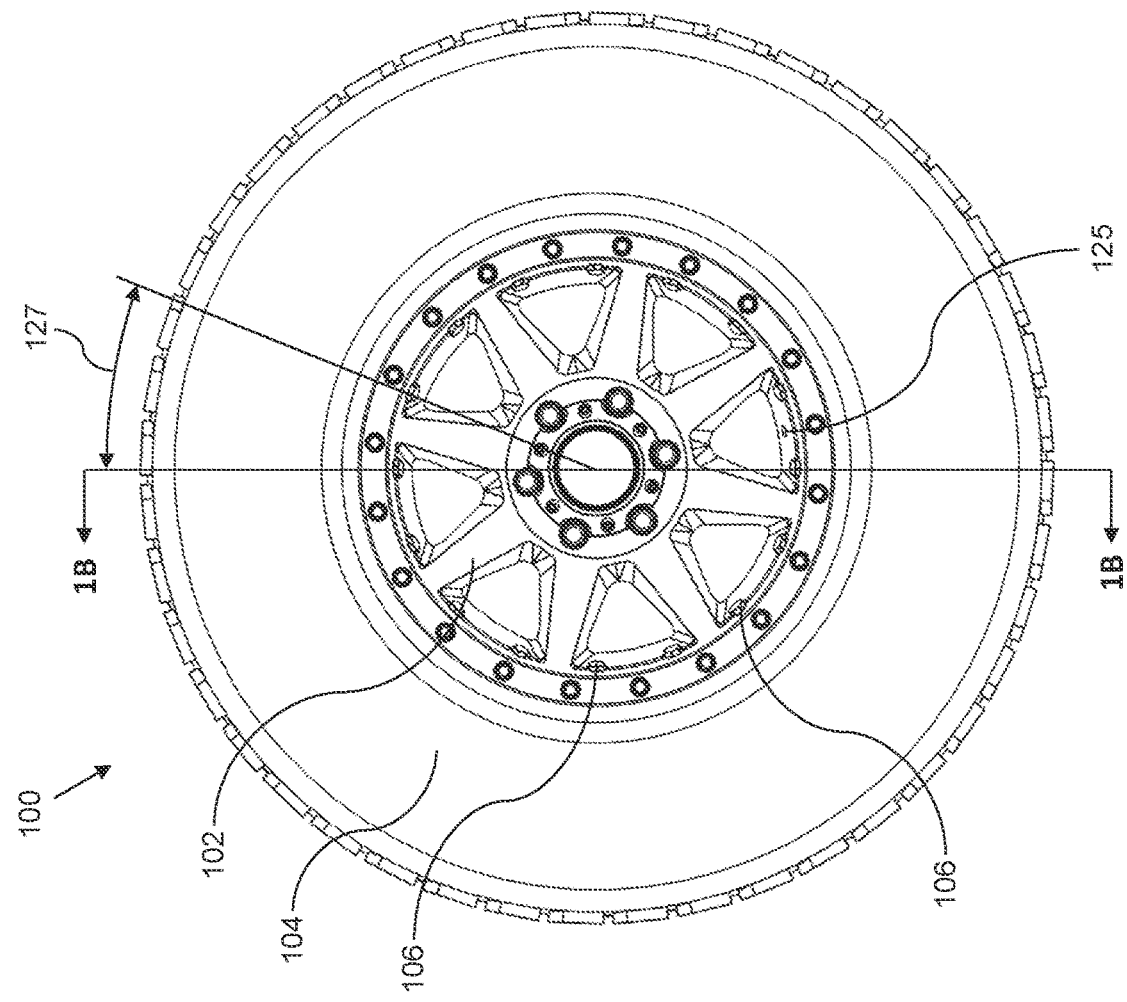

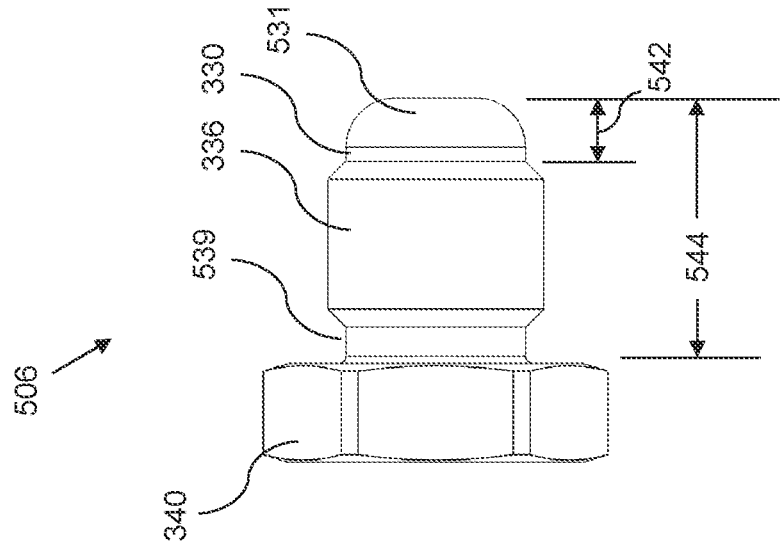
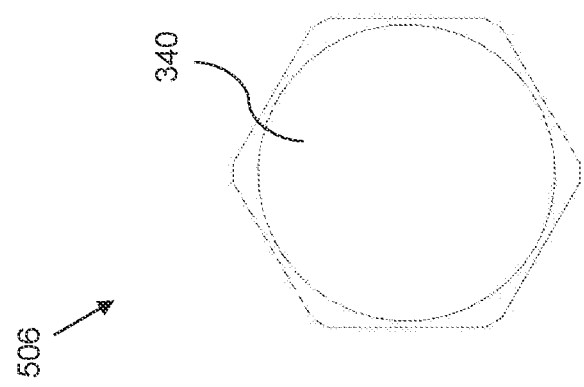

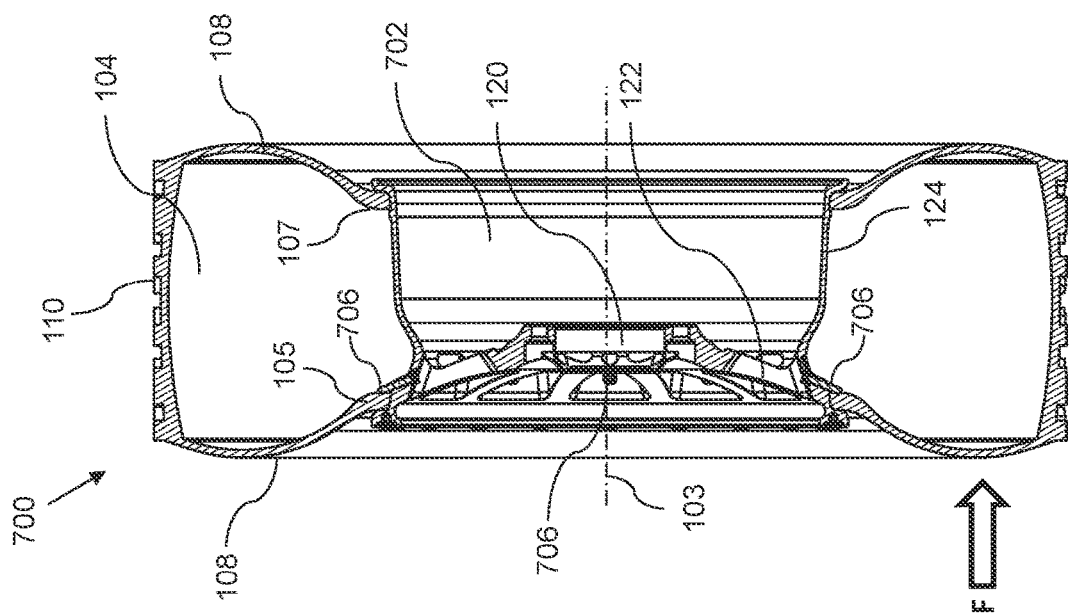
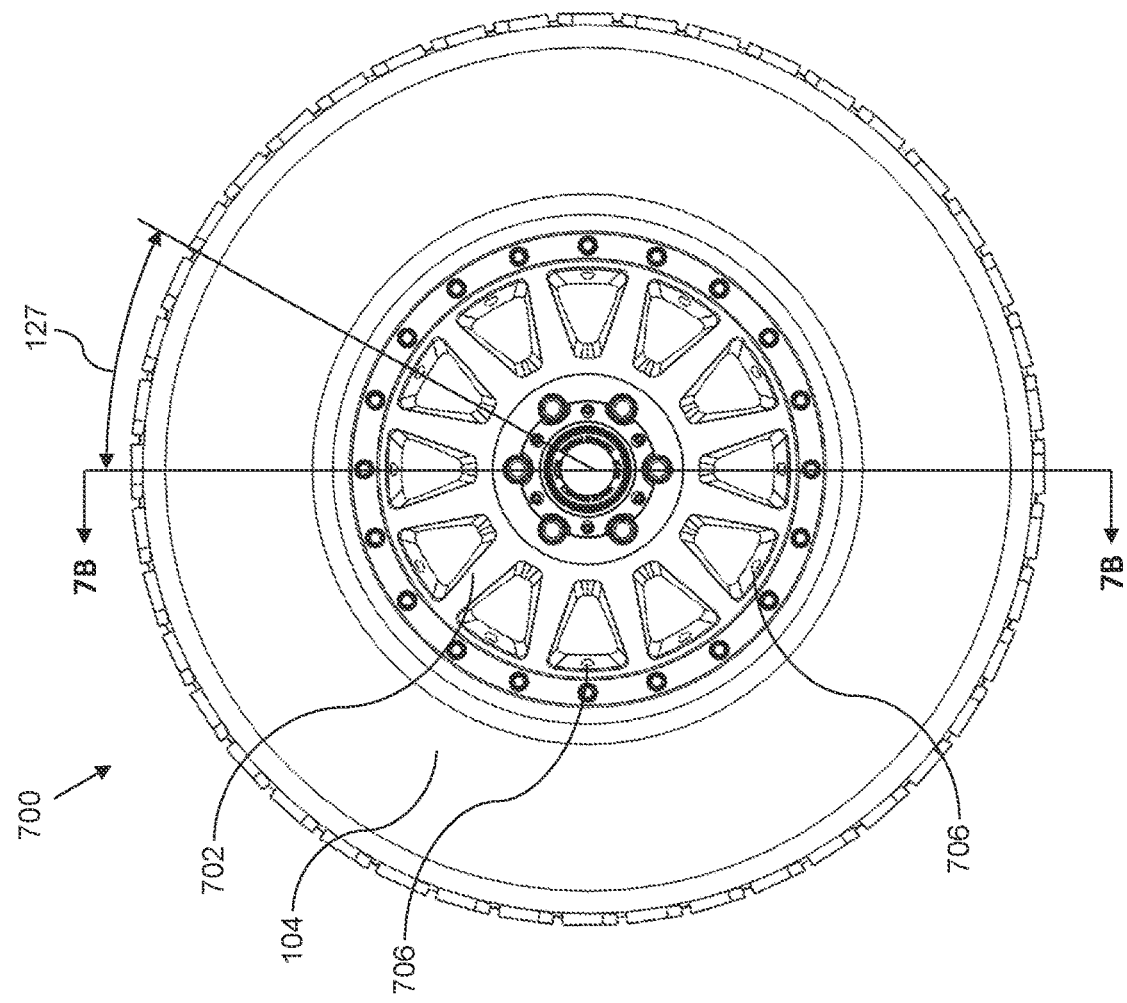

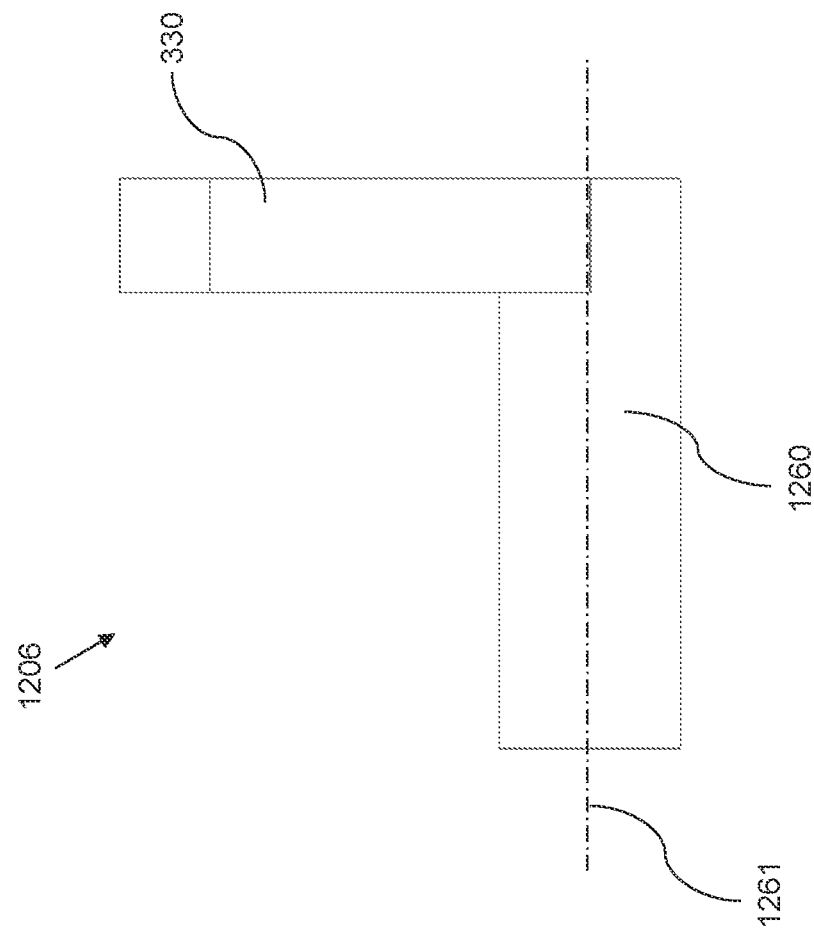
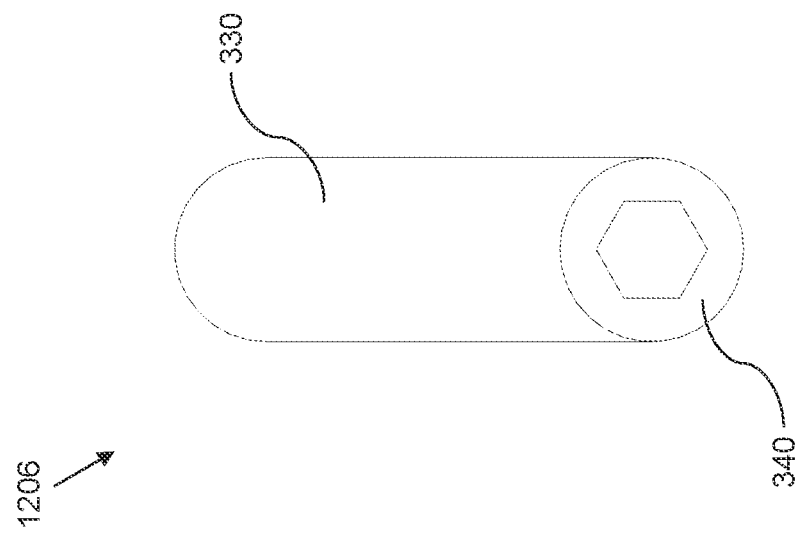

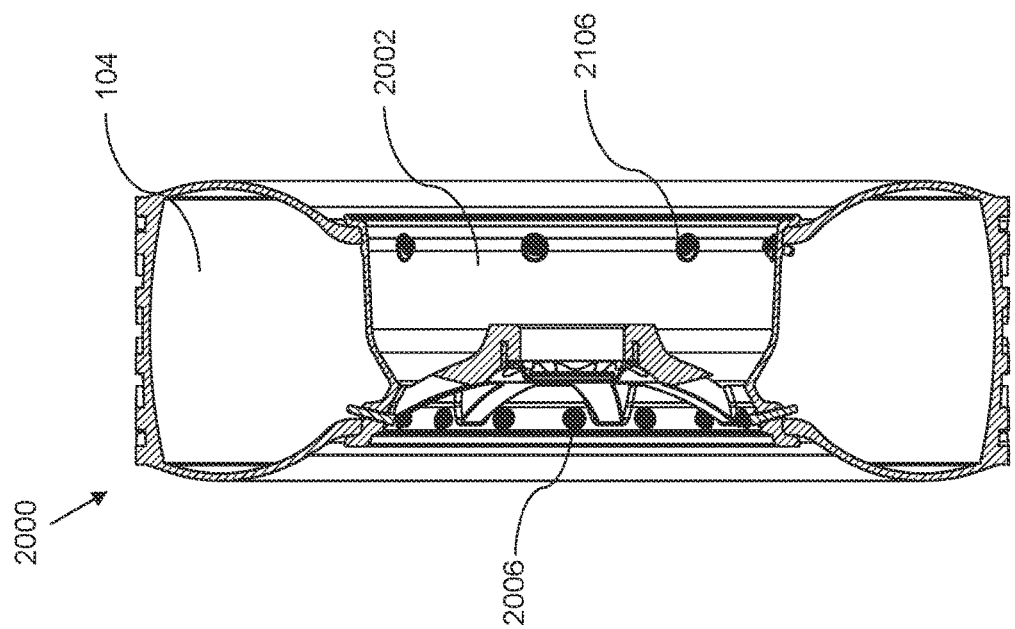
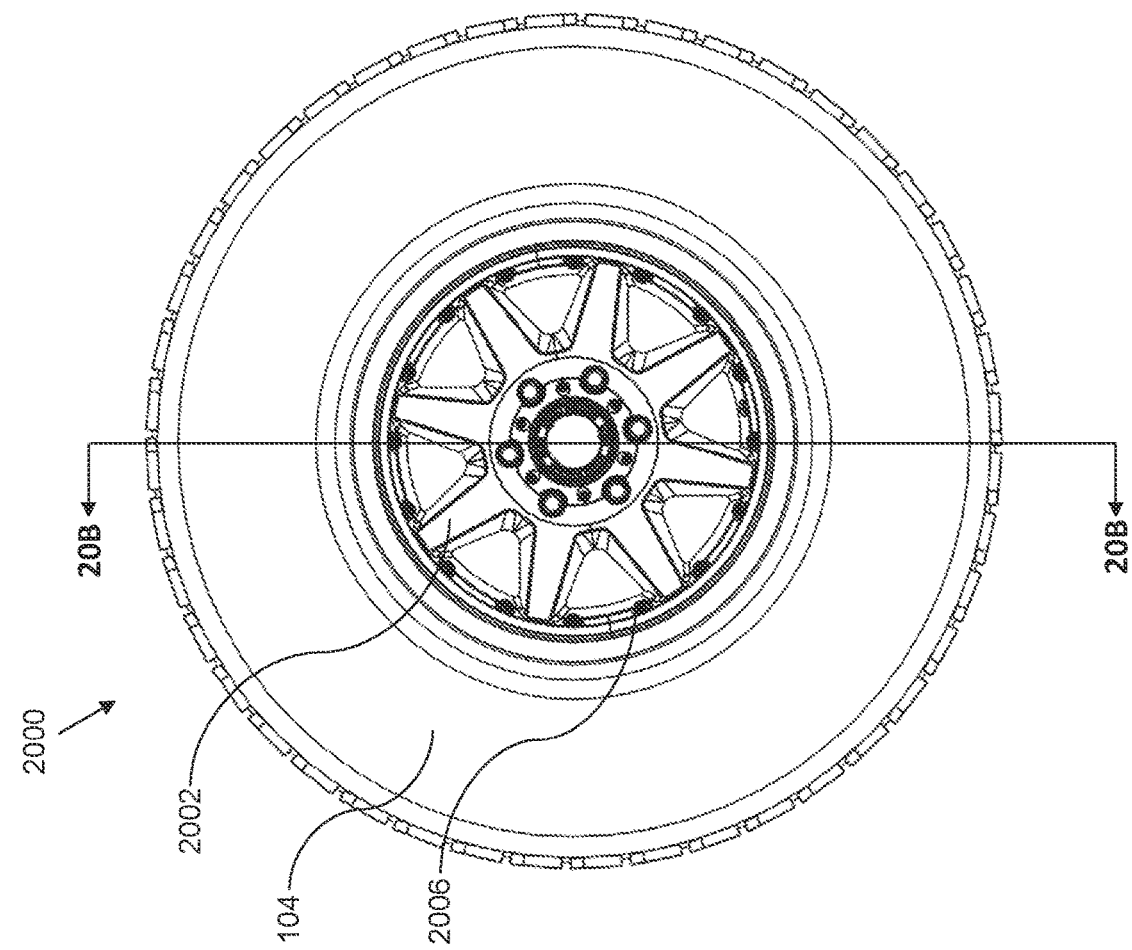

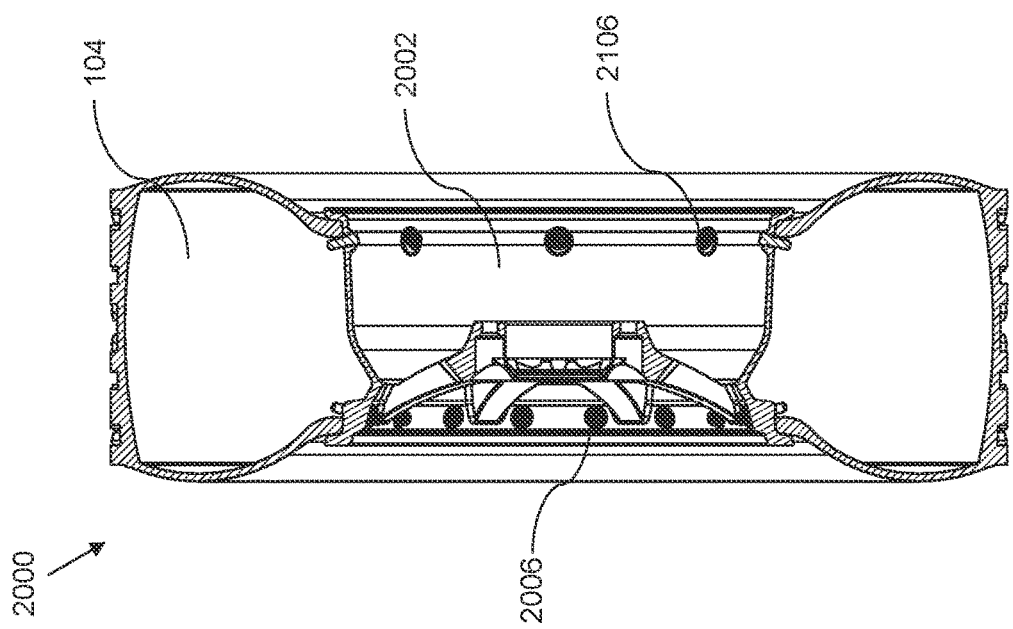
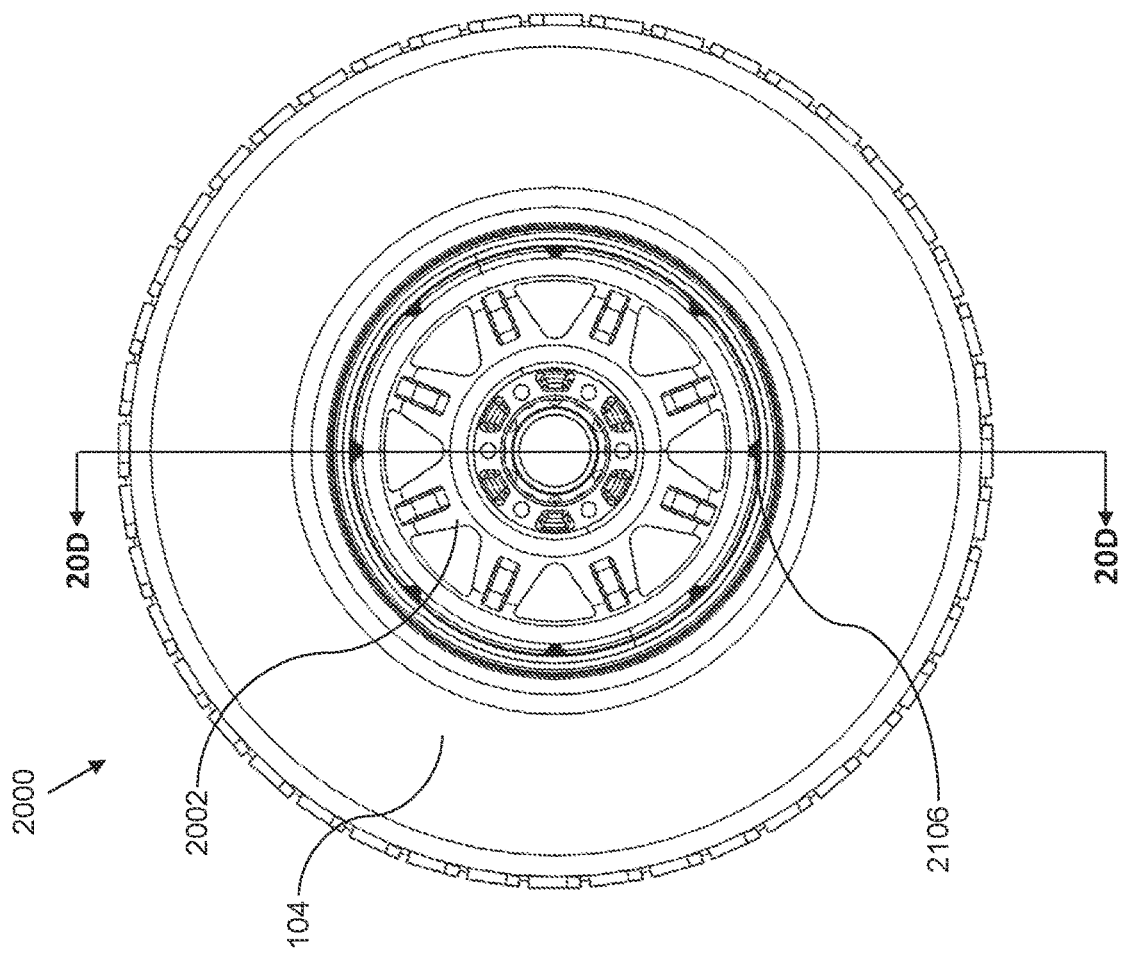

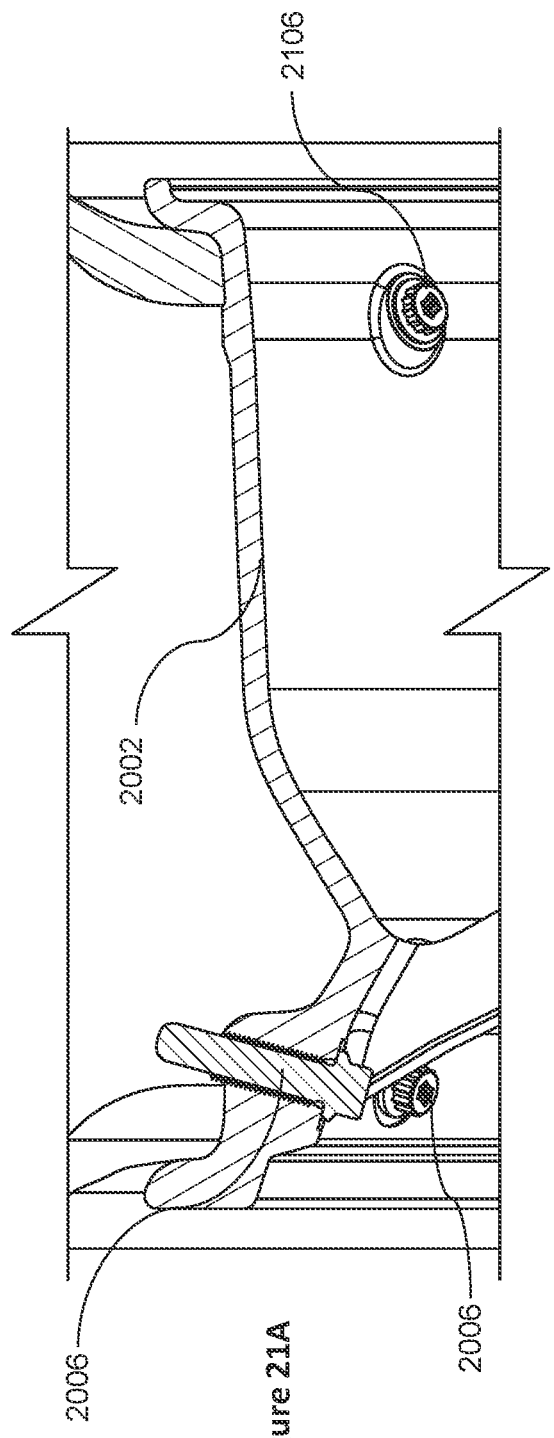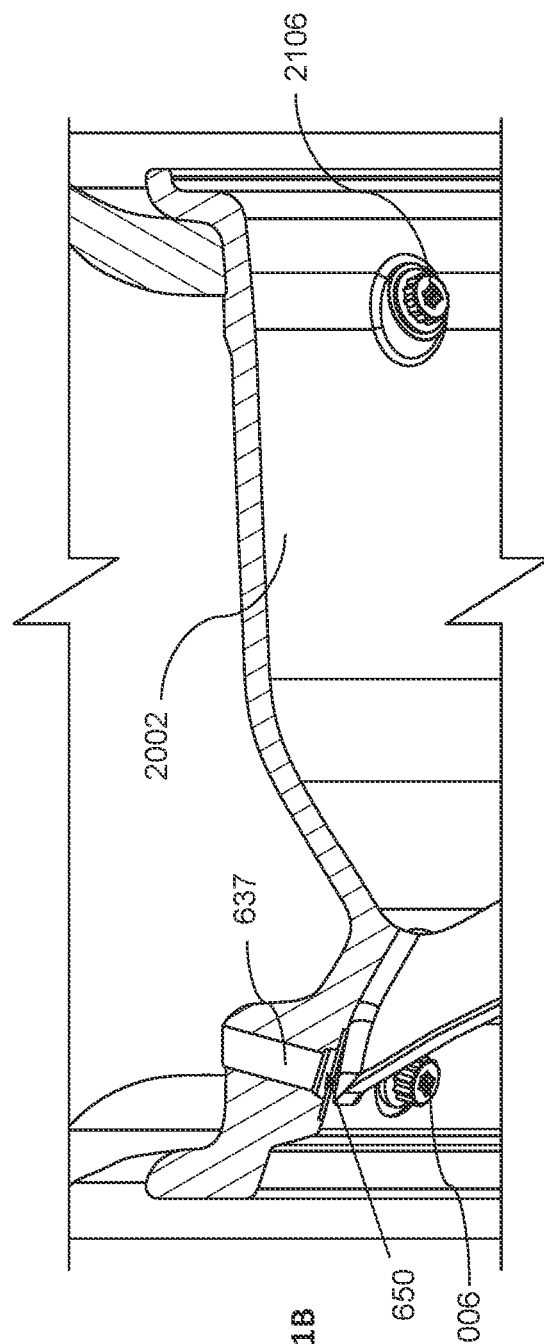

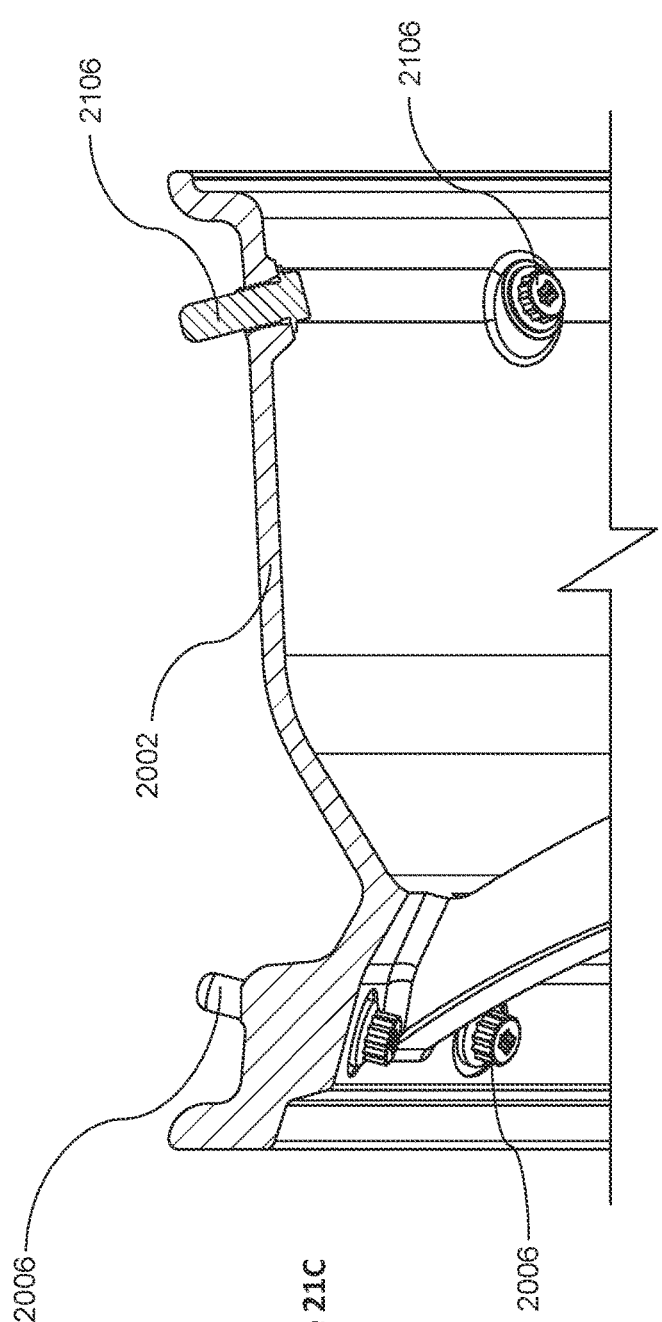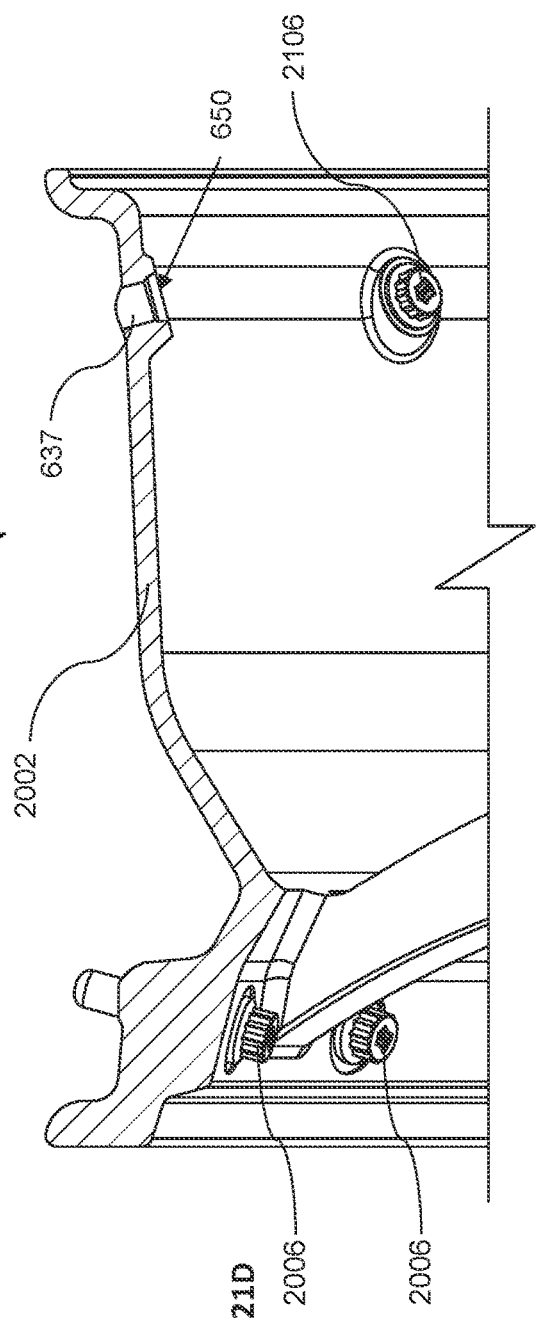

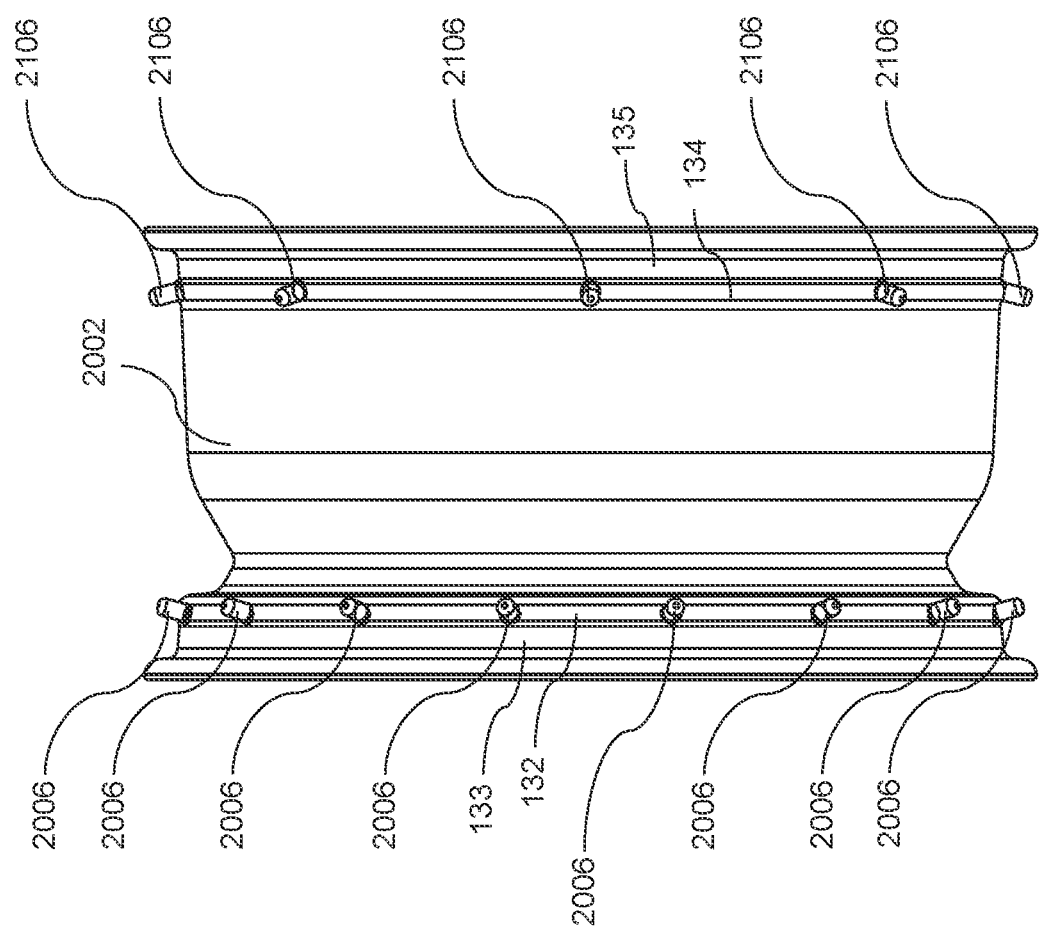

VEHICLE TIRE BEAD RETENTION SYSTEMS, DEVICES, AND METHODS

CROSS-REFERENCE TO RELATED APPLICATIONS

This application is a continuation of U.S. application Ser. No. 17/227,003, titled VEHICLE TIRE BEAD RETENTION SYSTEMS, DEVICES, AND METHODS, filed Apr. 9, 2021, which claims the benefit of U.S. Provisional Application No. 63/150,263, titled VEHICLE TIRE BEAD RETENTION SYSTEMS, DEVICES, AND METHODS, filed Feb. 17, 2021, U.S. Provisional Application No. 63/115,175, titled VEHICLE TIRE BEAD RETENTION SYSTEMS, DEVICES, AND METHODS, filed Nov. 18, 2020, and U.S. Provisional Application No. 63/093,424, titled VEHICLE TIRE BEAD RETENTION SYSTEMS, DEVICES, AND METHODS, filed Oct. 19, 2020. Each of the foregoing applications is hereby incorporated by reference herein in its entirety.

BACKGROUND

Field

The disclosure relates generally to the field of vehicles, and more specifically to vehicle tire retention mechanisms.

SUMMARY

The disclosure herein presents various embodiments of vehicle tire bead retention systems. The systems disclosed herein may be used with a variety of vehicles and wheels but may be most beneficial for vehicles intended for a combination of on-road and off-road driving. In some embodiments, a vehicle tire bead retention system comprises a primary bead retention ridge or hump that is intended to retain a tire bead in position on a rim during normal use, such as on-road use, and a secondary tire bead retention system that is configured to retain the tire bead on the rim during off-road, low-tire-pressure use. The secondary tire bead retention system may be configured to be spaced apart from the tire bead during normal on-road use, and only come into contact with the tire bead when needed, such as when a tire experiences a large sideways force during a low-tire-pressure off-road excursion. Some embodiments include a plurality of secondary bead retention members, which are configured to be removable from the rim, and reinstalled to the rim, without damaging the secondary bead retention system, the tire, or the rim.

According to some embodiments, a wheel assembly comprises: a rim for mounting thereon of a tire, the rim comprising a barrel having a pressurized side and an ambient side, the barrel comprising a bead retention portion that comprises: an annular flange for engaging a longitudinal outer surface of a bead of the tire; an annular bead seat for engaging a radial inner surface of the bead of the tire, the annular bead seat extending longitudinally inward from the flange; a primary bead retention ridge positioned longitudinally behind the bead seat, extending about a circumference of the pressurized side of the barrel, and protruding radially outward beyond at least a portion of the bead seat; and a plurality of receptacles each comprising an inner opening through the primary bead retention ridge, an outer opening through the ambient side of the barrel, and a threaded region between the inner and outer openings; a plurality of secondary bead retention members, each of the plurality of secondary bead retention members being removably coupleable to a receptacle of the plurality of receptacles, each of the plurality of secondary bead retention members comprising: a head shaped for rotational manipulation by a hand tool; a threaded shaft sized to engage the threaded region of a receptacle; and a smooth shaft sized to extend through the inner opening of a receptacle and to extend radially beyond the primary bead retention ridge in an installed position with respect to a receptacle; and a plurality of sealing members each configured to create an airtight seal between a secondary bead retention member of the plurality of secondary bead retention members and a receptacle of the plurality of receptacles in the installed position, wherein the plurality of receptacles are each positioned such that the installed position for each of the plurality of secondary bead retention members comprises the following configuration: the smooth shaft is positioned longitudinally behind the bead seat; the smooth shaft is tilted away from a vertical plane defined by the annular flange by an angle within a range of 10 to 30 degrees; and a distal end of the smooth shaft comprises a radial height above the bead seat that is at least three times a radial height that the primary bead retention ridge extends above the bead seat; and wherein the plurality of secondary bead retention members are not expandable, and are configured to be removable from and reinsertable into the plurality of receptacles without damaging the plurality of secondary bead retention members, the plurality of receptacles, or the tire.

In some embodiments, the wheel assembly further comprises: the tire mounted on the rim with the outer surface of the bead of the tire engaging the annular flange, wherein the plurality of secondary bead retention members are coupled to the plurality of receptacles in the installed position, and wherein the distal end of the smooth shaft of each of the plurality of secondary bead retention members is spaced apart from the bead of the tire. In some embodiments, the rim comprises a longitudinal outboard end and a longitudinal inboard end, wherein the bead retention portion is positioned at the longitudinal outboard end. In some embodiments, the wheel assembly further comprises a second bead retention portion positioned at the longitudinal inboard end, the second bead retention portion comprising: a second annular flange for engaging a longitudinal outer surface of a second bead of the tire; a second annular bead seat for engaging a radial inner surface of the second bead of the tire, the second annular bead seat extending longitudinally inward from the second flange; a second primary bead retention ridge positioned longitudinally behind the second bead seat, extending about a circumference of the pressurized side of the barrel, and protruding radially outward beyond at least a portion of the second bead seat; and a second plurality of receptacles each comprising an inner opening through the second primary bead retention ridge, an outer opening through the ambient side of the barrel, and a threaded region between the inner and outer openings, wherein the wheel assembly further comprises a second plurality of secondary bead retention members, each of the second plurality of secondary bead retention members being removably coupleable to a receptacle of the second plurality of receptacles, each of the second plurality of secondary bead retention members comprising: a head shaped for rotational manipulation by a hand tool; a threaded shaft sized to engage the threaded region of a receptacle; and a smooth shaft sized to extend through the inner opening of a receptacle and to have a distal end of the smooth shaft positioned radially beyond the second primary bead retention ridge and longitudinally behind the second bead seat in an installed position with respect to a receptacle; and wherein the wheel assembly further comprises a second plurality of sealing members each configured to create an airtight seal between a secondary bead retention member of the second plurality of secondary bead retention members and a receptacle of the second plurality of receptacles in the installed position.

According to some embodiments, a wheel assembly comprises: a rim for mounting thereon of a tire, the rim comprising a barrel having a pressurized side and an ambient side, the barrel comprising a bead retention portion that comprises: an annular flange for engaging a longitudinal outer surface of a bead of the tire; an annular bead seat for engaging a radial inner surface of the bead of the tire, the annular bead seat extending longitudinally inward from the flange; a primary bead retention ridge positioned longitudinally behind the bead seat, extending about a circumference of the pressurized side of the barrel, and protruding radially outward beyond at least a portion of the bead seat; and a plurality of receptacles each comprising an inner opening through the primary bead retention ridge, an outer opening through the ambient side of the barrel, and a threaded region between the inner and outer openings; a plurality of secondary bead retention members, each of the plurality of secondary bead retention members being removably coupleable to a receptacle of the plurality of receptacles, each of the plurality of secondary bead retention members comprising: a head shaped for rotational manipulation by a hand tool; and a shaft that comprises threads extending along at least a portion of the shaft, the threads sized to engage the threaded region of a receptacle, wherein the shaft is sized to extend through the inner opening of a receptacle, and to have a distal end of the shaft be positioned radially beyond the primary bead retention ridge and longitudinally behind the bead seat in an installed position with respect to a receptacle; and a plurality of sealing members each configured to create an airtight seal between a secondary bead retention member of the plurality of secondary bead retention members and a receptacle of the plurality of receptacles in the installed position.

In some embodiments, the wheel assembly further comprises: the tire mounted on the rim with the outer surface of the bead of the tire engaging the annular flange, wherein the plurality of secondary bead retention members are coupled to the plurality of receptacles in the installed position, and wherein the distal end of the shaft of each of the plurality of secondary bead retention members is spaced apart from the bead of the tire. In some embodiments, the rim comprises a longitudinal outboard end and a longitudinal inboard end, wherein the bead retention portion is positioned at the longitudinal outboard end. In some embodiments, the wheel assembly further comprises a second bead retention portion positioned at the longitudinal inboard end, the second bead retention portion comprising: a second annular flange for engaging a longitudinal outer surface of a second bead of the tire; a second annular bead seat for engaging a radial inner surface of the second bead of the tire, the second annular bead seat extending longitudinally inward from the second flange; a second primary bead retention ridge positioned longitudinally behind the second bead seat, extending about a circumference of the pressurized side of the barrel, and protruding radially outward beyond at least a portion of the second bead seat; and a second plurality of receptacles each comprising an inner opening through the second primary bead retention ridge, an outer opening through the ambient side of the barrel, and a threaded region between the inner and outer openings, wherein the wheel assembly further comprises a second plurality of secondary bead retention members, each of the second plurality of secondary bead retention members being removably coupleable to a receptacle of the second plurality of receptacles, each of the second plurality of secondary bead retention members comprising: a head shaped for rotational manipulation by a hand tool; and a shaft that comprises threads extending along at least a portion of the shaft, the threads sized to engage the threaded region of a receptacle, wherein the shaft is sized to extend through the inner opening of a receptacle, and to have a distal end of the shaft be positioned radially beyond the second primary bead retention ridge and longitudinally behind the second bead seat in an installed position with respect to a receptacle; and wherein the wheel assembly further comprises a second plurality of sealing members each configured to create an airtight seal between a secondary bead retention member of the second plurality of secondary bead retention members and a receptacle of the second plurality of receptacles in the installed position. In some embodiments, the annular flange defines a vertical plane, and the plurality of receptacles are each positioned such that the installed position of each of the plurality of secondary bead retention members comprises the shaft being positioned at a non-parallel angle to the vertical plane, with the distal end of the shaft positioned further away from the vertical plane than a proximal end of the shaft. In some embodiments, the non-parallel angle is at least 10 degrees. In some embodiments, the non-parallel angle is within a range of 10 to 30 degrees. In some embodiments, the plurality of secondary bead retention members are configured to be removable and re-coupleable to the plurality of receptacles using a hand tool without damaging the plurality of secondary bead retention members or the plurality of receptacles. In some embodiments, the plurality of sealing members comprise O-rings, and the plurality of receptacles each comprise a tapered groove for sealing against one of the O-rings of the plurality of sealing members. In some embodiments, the secondary bead retention members are not expandable. In some embodiments, the shaft of each of the plurality of secondary bead retention members comprises: a threaded portion that comprises the threads; and a smooth portion extending beyond the threaded portion.

According to some embodiments, a wheel assembly comprises: a rim for mounting thereon of a tire, the rim comprising a barrel having a pressurized side and an ambient side, the barrel comprising a bead retention portion that comprises: an annular flange for engaging a longitudinal outer surface of a bead of the tire; an annular bead seat for engaging a radial inner surface of the bead of the tire, the annular bead seat extending longitudinally inward from the flange; a primary bead retention ridge positioned longitudinally behind the bead seat, extending about a circumference of the pressurized side of the barrel, and protruding radially outward beyond at least a portion of the bead seat; and a plurality of receptacles each comprising an inner opening through the primary bead retention ridge and an outer opening through the ambient side of the barrel; a plurality of secondary bead retention members, each of the plurality of secondary bead retention members being removably coupleable to a receptacle of the plurality of receptacles in an installed position, each of the plurality of secondary bead retention members comprising a shaft sized to extend through the inner opening of a receptacle, and to have a distal end of the shaft be positioned radially beyond the primary bead retention ridge and longitudinally behind the bead seat in the installed position; and a plurality of sealing members each configured to create an airtight seal between a secondary bead retention member of the plurality of secondary bead retention members and a receptacle of the plurality of receptacles in the installed position.

In some embodiments, the wheel assembly further comprises one or more retention features configured to selectively retain the plurality of secondary bead retention members in the installed position, wherein the one or more retention features comprises a groove configured to receive a ring or clip. In some embodiments, the wheel assembly further comprises one or more retention features configured to selectively retain the plurality of secondary bead retention members in the installed position, wherein the one or more retention features comprises a thread. In some embodiments, the plurality of secondary bead retention members are not expandable, and wherein the plurality of secondary bead retention members are configured to be removable and re-coupleable to the plurality of receptacles using a hand tool without damaging the plurality of secondary bead retention members or the plurality of receptacles. In some embodiments, the rim comprises a longitudinal outboard end and a longitudinal inboard end, wherein the bead retention portion is positioned at the longitudinal outboard end.

According to some embodiments, a wheel assembly comprises: a rim for mounting thereon of a tire, the rim comprising a barrel having a pressurized side and an ambient side, the barrel comprising a bead retention portion that comprises: an annular flange for engaging a longitudinal outer surface of a bead of the tire; an annular bead seat for engaging a radial inner surface of the bead of the tire, the annular bead seat extending longitudinally inward from the flange; a primary bead retention ridge positioned longitudinally behind the bead seat, extending about a circumference of the pressurized side of the barrel, and protruding radially outward beyond at least a portion of the bead seat; and a plurality of receptacles each comprising an inner opening through the primary bead retention ridge, an outer opening through the ambient side of the barrel, and a threaded region between the inner and outer openings; a plurality of secondary bead retention members, each of the plurality of secondary bead retention members being removably coupleable to a receptacle of the plurality of receptacles, each of the plurality of secondary bead retention members comprising: a head shaped for rotational manipulation by a hand tool; a threaded shaft sized to engage the threaded region of a receptacle; and a smooth shaft sized to extend through the inner opening of a receptacle and to extend radially beyond the primary bead retention ridge when the secondary bead retention member is coupled to a receptacle; and a plurality of sealing members each configured to create an airtight seal between a secondary bead retention member of the plurality of secondary bead retention members and a receptacle of the plurality of receptacles, wherein the plurality of receptacles are each positioned such that, when the plurality of secondary bead retention members are coupled to the plurality of receptacles: each of the smooth shafts is positioned longitudinally behind the bead seat; each of the smooth shafts is tilted away from a vertical plane defined by the annular flange by an angle within a range of 10 to 30 degrees; and a distal end of each of the smooth shafts comprises a radial height above the bead seat that is at least three, four, or five times a radial height that the primary bead retention ridge extends above the bead seat; and wherein the plurality of secondary bead retention members are not expandable, and are configured to be removable from and reinsertable into the plurality of receptacles without damaging the plurality of secondary bead retention members, the plurality of receptacles, or the tire.

According to some embodiments, a wheel assembly comprises: a rim for mounting thereon of a tire, the rim comprising a barrel having a pressurized side and an ambient side, the barrel comprising a bead retention portion that comprises: an annular flange for engaging a longitudinal outer surface of a bead of the tire; an annular bead seat for engaging a radial inner surface of the bead of the tire, the annular bead seat extending longitudinally inward from the flange; a primary bead retention ridge positioned longitudinally behind the bead seat, extending about a circumference of the pressurized side of the barrel, and protruding radially outward beyond at least a portion of the bead seat; and a plurality of receptacles each comprising an inner opening through the primary bead retention ridge, an outer opening through the ambient side of the barrel, and a threaded region between the inner and outer openings; a plurality of secondary bead retention members, each of the plurality of secondary bead retention members being removably coupleable to a receptacle of the plurality of receptacles, each of the plurality of secondary bead retention members comprising: a head shaped for rotational manipulation by a hand tool; a threaded shaft sized to engage the threaded region of a receptacle; and a smooth shaft sized to extend through the inner opening of a receptacle and to extend radially beyond the primary bead retention ridge when the secondary bead retention member is coupled to a receptacle; and a plurality of sealing members each configured to create an airtight seal between a secondary bead retention member of the plurality of secondary bead retention members and a receptacle of the plurality of receptacles, wherein the plurality of receptacles are each positioned such that, when the plurality of secondary bead retention members are coupled to the plurality of receptacles, each of the smooth shafts is positioned longitudinally behind the bead seat.

In some embodiments, the wheel assembly further comprises: the tire mounted on the rim with the outer surface of the bead of the tire engaging the annular flange, wherein the plurality of receptacles are each positioned such that, when the plurality of secondary bead retention members are coupled to the plurality of receptacles and the tire is pressurized to a standard on road tire pressure (such as at least 15 psi) with no external forces applied to the tire along a longitudinal direction, each of the smooth shafts is spaced apart from the bead of the tire. In some embodiments, the rim comprises a first longitudinal end and a second longitudinal end, the first end configured to face away from a car when installed, and the second end configured to face toward the car when installed, wherein the bead retention portion is positioned at the first end. In some embodiments, the wheel assembly further comprises a second bead retention portion positioned at the second end, the second bead retention portion comprising: a second annular flange for engaging a longitudinal outer surface of a second bead of the tire; a second annular bead seat for engaging a radial inner surface of the second bead of the tire, the second annular bead seat extending longitudinally inward from the second flange; a second primary bead retention ridge positioned longitudinally behind the second bead seat, extending about a circumference of the pressurized side of the barrel, and protruding radially outward beyond at least a portion of the second bead seat; and a second plurality of receptacles each comprising an inner opening through the second primary bead retention ridge, an outer opening through the ambient side of the barrel, and a threaded region between the inner and outer openings, wherein the wheel assembly further comprises a second plurality of secondary bead retention members, each of the second plurality of secondary bead retention members being removably coupleable to a receptacle of the second plurality of receptacles, each of the second plurality of secondary bead retention members comprising: a head shaped for rotational manipulation by a hand tool; a threaded shaft sized to engage the threaded region of a receptacle; and a smooth shaft sized to extend through the inner opening of a receptacle and radially beyond the second primary bead retention ridge when the second secondary bead retention member is coupled to a receptacle; and wherein the wheel assembly further comprises a second plurality of sealing members each configured to create an airtight seal between a secondary bead retention member of the second plurality of secondary bead retention members and a receptacle of the second plurality of receptacles, wherein the second plurality of receptacles are each positioned such that, when the second plurality of secondary bead retention members are coupled to the second plurality of receptacles, each of the smooth shafts is positioned longitudinally behind the second bead seat. In some embodiments, the annular flange defines a vertical plane, and the plurality of receptacles are each positioned such that, when the plurality of secondary bead retention members are coupled to the plurality of receptacles, each of the smooth shafts is positioned at a non-parallel angle to the vertical plane, with a distal end of the smooth shaft positioned further away from the vertical plane than a proximal end of the smooth shaft. In some embodiments, the non-parallel angle is at least 10 degrees. In some embodiments, the non-parallel angle is within a range of 10 to 30 degrees. In some embodiments, the plurality of secondary bead retention members are configured to be removable and re-coupleable to the plurality of receptacles using a hand tool without damaging the plurality of secondary bead retention members or the plurality of receptacles. In some embodiments, the plurality of sealing members comprise O-rings, and the plurality of receptacles each comprise a tapered groove for sealing against one of the O-rings of the plurality of sealing members. In some embodiments, the secondary bead retention members are not expandable. According to some embodiments, a wheel assembly kit comprises: the above wheel assembly; and a plurality of plug members, each of the plurality of plug members being removably coupleable to a receptacle of the plurality of receptacles in place of a secondary bead retention member, each of the plurality of plug members comprising: a head shaped for rotational manipulation by a hand tool; a threaded shaft sized to engage the threaded region of a receptacle; and a distal end that is positioned to not extend radially beyond the primary bead retention ridge when the plug member is coupled to a receptacle, wherein each of the plurality of plug members is configured to form an airtight seal against a receptacle using one of the plurality of sealing members or a separate sealing member.

According to some embodiments, a wheel assembly comprises: a rim for mounting thereon of a tire, the rim comprising a barrel having a pressurized side and an ambient side, the barrel comprising a bead retention portion that comprises: an annular flange for engaging a longitudinal outer surface of a bead of the tire; an annular bead seat for engaging a radial inner surface of the bead of the tire, the annular bead seat extending longitudinally inward from the flange; a primary bead retention ridge positioned longitudinally behind the bead seat, extending about a circumference of the pressurized side of the barrel, and protruding radially outward beyond at least a portion of the bead seat; and a plurality of receptacles each comprising an inner opening through the primary bead retention ridge, an outer opening through the ambient side of the barrel, and a threaded region between the inner and outer openings; a plurality of secondary bead retention members, each of the plurality of secondary bead retention members being removably coupleable to a receptacle of the plurality of receptacles, each of the plurality of secondary bead retention members comprising: a head shaped for rotational manipulation by a hand tool; a threaded shaft sized to engage the threaded region of a receptacle; and a length sized such that at least a portion of the secondary bead retention member is configured to extend through the inner opening of a receptacle and to extend radially beyond the primary bead retention ridge; and a plurality of sealing members each configured to create an airtight seal between a secondary bead retention member of the plurality of secondary bead retention members and a receptacle of the plurality of receptacles, wherein the plurality of receptacles are each positioned such that the at least a portion of the secondary bead retention member that extends through the inner opening is positioned longitudinally behind the bead seat.

According to some embodiments, a wheel assembly comprises: a rim for mounting thereon of a tire, the rim comprising a barrel having a pressurized side and an ambient side, the barrel comprising a bead retention portion that comprises: an annular flange for engaging a longitudinal outer surface of a bead of the tire, the annular flange defining a vertical plane; an annular bead seat for engaging a radial inner surface of the bead of the tire, the annular bead seat extending longitudinally inward from the flange; and a plurality of receptacles each comprising an inner opening through the pressurized side of the barrel, an outer opening through the ambient side of the barrel, and a threaded region between the inner and outer openings; a plurality of bead retention members, each of the plurality of bead retention members being removably coupleable to a receptacle of the plurality of receptacles, each of the plurality of bead retention members comprising: a head shaped for rotational manipulation by a hand tool; a threaded shaft sized to engage the threaded region of a receptacle; and a smooth shaft sized to extend through the inner opening of a receptacle and to extend radially beyond the bead seat when the bead retention member is coupled to a receptacle; and a plurality of sealing members each configured to create an airtight seal between a bead retention member of the plurality of bead retention members and a receptacle of the plurality of receptacles, wherein the plurality of receptacles are each positioned such that, when the plurality of bead retention members are coupled to the plurality of receptacles, each of the smooth shafts is positioned at a non-parallel angle to the vertical plane, with a distal end of the smooth shaft positioned closer to the vertical plane than a proximal end of the smooth shaft, and with the distal end of the smooth shaft suspended radially above a portion of the annular bead seat.

In some embodiments, the wheel assembly further comprises: the tire mounted on the rim with the outer surface of the bead of the tire engaging the annular flange, wherein the plurality of receptacles are each positioned such that, when the plurality of bead retention members are coupled to the plurality of receptacles and the tire is pressurized to a standard on road tire pressure (such as at least 15 psi) with no external forces applied to the tire along a longitudinal direction, each of the smooth shafts is engaged with and at least partially compresses an inner surface of the bead of the tire. In some embodiments, the plurality of bead retention members are configured to be removable and re-coupleable to the plurality of receptacles using a hand tool without damaging the plurality of bead retention members or the plurality of receptacles. In some embodiments, the bead retention members are not expandable. In some embodiments, the bead retention portion of the barrel further comprises: a bead retention ridge positioned longitudinally behind the bead seat, extending about a circumference of the pressurized side of the barrel, and protruding radially outward beyond at least a portion of the bead seat, wherein the plurality of receptacles are positioned such that at least a portion of each inner opening passes through the bead retention ridge.

According to some embodiments, a wheel assembly comprising: a rim for mounting thereon of a tire, the rim comprising a barrel having a pressurized side and an ambient side, the barrel comprising a bead retention portion that comprises: an annular flange for engaging a longitudinal outer surface of a bead of the tire; an annular bead seat for engaging a radial inner surface of the bead of the tire, the annular bead seat extending longitudinally inward from the flange; and a plurality of receptacles each comprising an inner opening through the pressurized side of the barrel, an outer opening through the ambient side of the barrel, and a pocket between the inner opening and outer opening; a plurality of bead retention members, each of the plurality of bead retention members being rotatably coupleable to a receptacle of the plurality of receptacles and having a first rotational orientation and a second rotational orientation, each of the plurality of bead retention members comprising: a head shaped for rotational manipulation by a hand tool; a shaft extending from the head and defining a rotational axis; and a protrusion extending from the shaft in a direction other than parallel to the rotational axis; and a plurality of sealing members each configured to create an airtight seal between a bead retention member of the plurality of bead retention members and a receptacle of the plurality of receptacles, wherein the plurality of receptacles are each positioned such that: when the plurality of bead retention members are in the first rotational orientation, the protrusion of each of the plurality of bead retention members extends through the inner opening of a receptacle with a distal end of the protrusion positioned radially beyond the annular bead seat, and when the plurality of bead retention members are in the second rotational orientation, the distal end of the protrusion of each of the plurality of bead retention members is positioned within the pocket of the of the receptacle.

In some embodiments, the protrusion extends from the shaft in a direction that is perpendicular to the rotational axis. In some embodiments, the annular flange defines a vertical plane, and the rotational axis is perpendicular to the vertical plane. In some embodiments, the bead retention portion of the barrel further comprises: a bead retention ridge positioned longitudinally behind the bead seat, extending about a circumference of the pressurized side of the barrel, and protruding radially outward beyond at least a portion of the bead seat, wherein the plurality of receptacles are positioned such that at least a portion of each inner opening passes through the bead retention ridge, and wherein the protrusion of the bead retention member does not extend radially beyond the bead retention ridge when in the second rotational orientation.

According to some embodiments, a wheel assembly comprises: a rim for mounting thereon of a tire, the rim comprising a barrel having a pressurized side and an ambient side, the barrel comprising inboard and outboard bead retention portions that each comprise: an annular flange for engaging a longitudinal outer surface of a bead of the tire; an annular bead seat for engaging a radial inner surface of the bead of the tire, the annular bead seat extending longitudinally inward from the flange; a primary bead retention ridge positioned longitudinally behind the bead seat, extending about a circumference of the pressurized side of the barrel, and protruding radially outward beyond at least a portion of the bead seat; and a plurality of receptacles each comprising an inner opening through the primary bead retention ridge, an outer opening through the ambient side of the barrel, and a threaded region between the inner and outer openings; a plurality of secondary bead retention members, each of the plurality of secondary bead retention members being removably coupleable to a receptacle of the plurality of receptacles, each of the plurality of secondary bead retention members comprising: a head shaped for rotational manipulation by a hand tool; a threaded shaft sized to engage the threaded region of a receptacle; and a smooth shaft sized to extend through the inner opening of a receptacle and to extend radially beyond the primary bead retention ridge when the secondary bead retention member is coupled to a receptacle; and a plurality of sealing members each configured to create an airtight seal between a secondary bead retention member of the plurality of secondary bead retention members and a receptacle of the plurality of receptacles, wherein the plurality of receptacles are each positioned such that, when the plurality of secondary bead retention members are coupled to the plurality of receptacles, each of the smooth shafts is positioned longitudinally behind the bead seat.

In some embodiments, the plurality of secondary bead retention members comprises: a plurality of outboard secondary bead retention members; and a plurality of inboard secondary bead retention members having a different size than the plurality of outboard secondary bead retention members. In some embodiments, the outboard bead retention portion comprises a larger number of receptacles than the inboard bead retention portion. In some embodiments, the plurality of receptacles of the outboard bead retention portion are spaced closer together than the plurality of receptacles of the inboard bead retention portion.

According to some embodiments, a rim for mounting thereon of a tire comprises: a barrel having a pressurized side and an ambient side, the barrel comprising a bead retention portion that comprises: an annular flange for engaging a longitudinal outer surface of a bead of the tire; an annular bead seat for engaging a radial inner surface of the bead of the tire, the annular bead seat extending longitudinally inward from the flange; a primary bead retention ridge positioned longitudinally behind the bead seat, extending about a circumference of the pressurized side of the barrel, and protruding radially outward beyond at least a portion of the bead seat; and a plurality of receptacles each comprising an inner opening through the primary bead retention ridge, an outer opening through the ambient side of the barrel, a threaded region between the inner and outer openings, and a groove for engaging a sealing member.

According to some embodiments, a wheel assembly comprises: a rim for mounting thereon of a tire, the rim comprising a barrel having a pressurized side and an ambient side, the barrel comprising a bead retention portion that comprises: an annular flange for engaging a longitudinal outer surface of a bead of the tire; an annular bead seat for engaging a radial inner surface of the bead of the tire, the annular bead seat extending longitudinally inward from the flange; a primary bead retention ridge positioned longitudinally behind the bead seat, extending about a circumference of the pressurized side of the barrel, and protruding radially outward beyond at least a portion of the bead seat; and a plurality of receptacles each comprising an inner opening through the primary bead retention ridge and an outer opening through the ambient side of the barrel; a plurality of secondary bead retention members, each of the plurality of secondary bead retention members being removably coupleable to a receptacle of the plurality of receptacles, each of the plurality of secondary bead retention members comprising a shaft sized to extend through the inner opening of a receptacle and to extend radially beyond the primary bead retention ridge when the secondary bead retention member is coupled to a receptacle; one or more retention features configured to selectively retain the plurality of secondary bead retention members in an installed position with respect to the plurality of receptacles; and a plurality of sealing members each configured to create an airtight seal between a secondary bead retention member of the plurality of secondary bead retention members and a receptacle of the plurality of receptacles, wherein the plurality of receptacles are each positioned such that, when the plurality of secondary bead retention members are coupled to the plurality of receptacles in the installed position, each of the shafts is positioned longitudinally behind the bead seat.

In some embodiments, the one or more retention features comprises a snap ring. In some embodiments, the one or more retention features comprises a thread. In some embodiments, the one or more retention features comprises one or more of: a clip, a snap ring, a retaining ring, an e-clip, a circlip, a spring, a ball lock mechanism, a detent mechanism, a cam lock mechanism, a feature sized for a friction fit, or a magnet. According to some embodiments, a method of mounting a tire to the wheel assembly comprises: obtaining the wheel assembly; obtaining a tire; mounting the tire to the rim with a longitudinal outer surface of a bead of the tire engaging the annular flange of the rim; and manipulating the plurality of bead retention members into the installed position.

According to some embodiments, a rim for mounting thereon of a tire comprises: a barrel having a pressurized side and an ambient side, the barrel comprising a bead retention portion that comprises: an annular flange for engaging a longitudinal outer surface of a bead of the tire; an annular bead seat for engaging a radial inner surface of the bead of the tire, the annular bead seat extending longitudinally inward from the flange; a primary bead retention ridge positioned longitudinally behind the bead seat, extending about a circumference of the pressurized side of the barrel, and protruding radially outward beyond at least a portion of the bead seat; a plurality of receptacles each comprising an inner opening through the primary bead retention ridge, an outer opening through the ambient side of the barrel, and a groove for engaging a sealing member; and one or more retention features configured to selectively retain a plurality of secondary bead retention members in an installed position with respect to the plurality of receptacles.

In some embodiments, the one or more retention features comprises a groove for insertion therein of a snap ring. In some embodiments, the one or more retention features comprises a thread. In some embodiments, the one or more retention features comprises one or more of: a spring, a ball lock mechanism, a detent mechanism, a cam lock mechanism, a feature sized for a friction fit, a magnet, or a groove for insertion therein of a clip, a snap ring, a retaining ring, an e-clip, or a circlip. According to some embodiments, a method of manufacturing the rim comprises: obtaining an unfinished rim; creating the plurality of receptacles; and creating the one or more retention features.

For purposes of this summary, certain aspects, advantages, and novel features of the inventions are described herein. It is to be understood that not necessarily all such advantages may be achieved in accordance with any particular embodiment of the inventions. Thus, for example, those skilled in the art will recognize that the inventions may be embodied or carried out in a manner that achieves one advantage or group of advantages as taught herein without necessarily achieving other advantages as may be taught or suggested herein.

BRIEF DESCRIPTION OF THE DRAWINGS

The foregoing and other features, aspects, and advantages of the present inventions are described in detail below with reference to the drawings of various embodiments, which are intended to illustrate and not to limit the inventions. The drawings comprise the following figures in which:

FIG. 1A is an outboard view of an embodiment of a wheel assembly having primary and secondary bead retention mechanisms.

FIG. 1B is a cross-sectional view of the wheel assembly of FIG. 1A.

FIG. 5C is an end view of a plug member that can be used with the wheel assembly of FIG. 1A.

FIG. 5D is a side view of the plug member of FIG. 5C.

FIG. 7A is an outboard view of another embodiment of a wheel assembly having primary and secondary bead retention mechanisms.

FIG. 7B is a cross-sectional view of the wheel assembly of FIG. 7A.

FIG. 15A is an end view of a secondary bead retention member of the wheel assembly of FIG. 12A.

FIG. 15B is a side view of the secondary bead retention member of FIG. 15A.

FIG. 20A is an outboard view of another embodiment of a wheel assembly having primary and secondary bead retention mechanisms.

FIG. 20B is a cross-sectional view of the wheel assembly of FIG. 20A.

FIG. 20C is an inboard view of the wheel assembly of FIG. 20A.

FIG. 20D is another cross-sectional view of the wheel assembly of FIG. 20A.

FIGS. 21A-21D are enlarged cross-sectional view of the wheel assembly of FIG. 20A, with one secondary bead retention members being hidden in FIGS. 21B and 21D.

FIG. 22 is a side view of the rim and bead retention mechanisms of the wheel assembly of FIG. 20A.

DETAILED DESCRIPTION OF THE EMBODIMENTS

Figure 2:
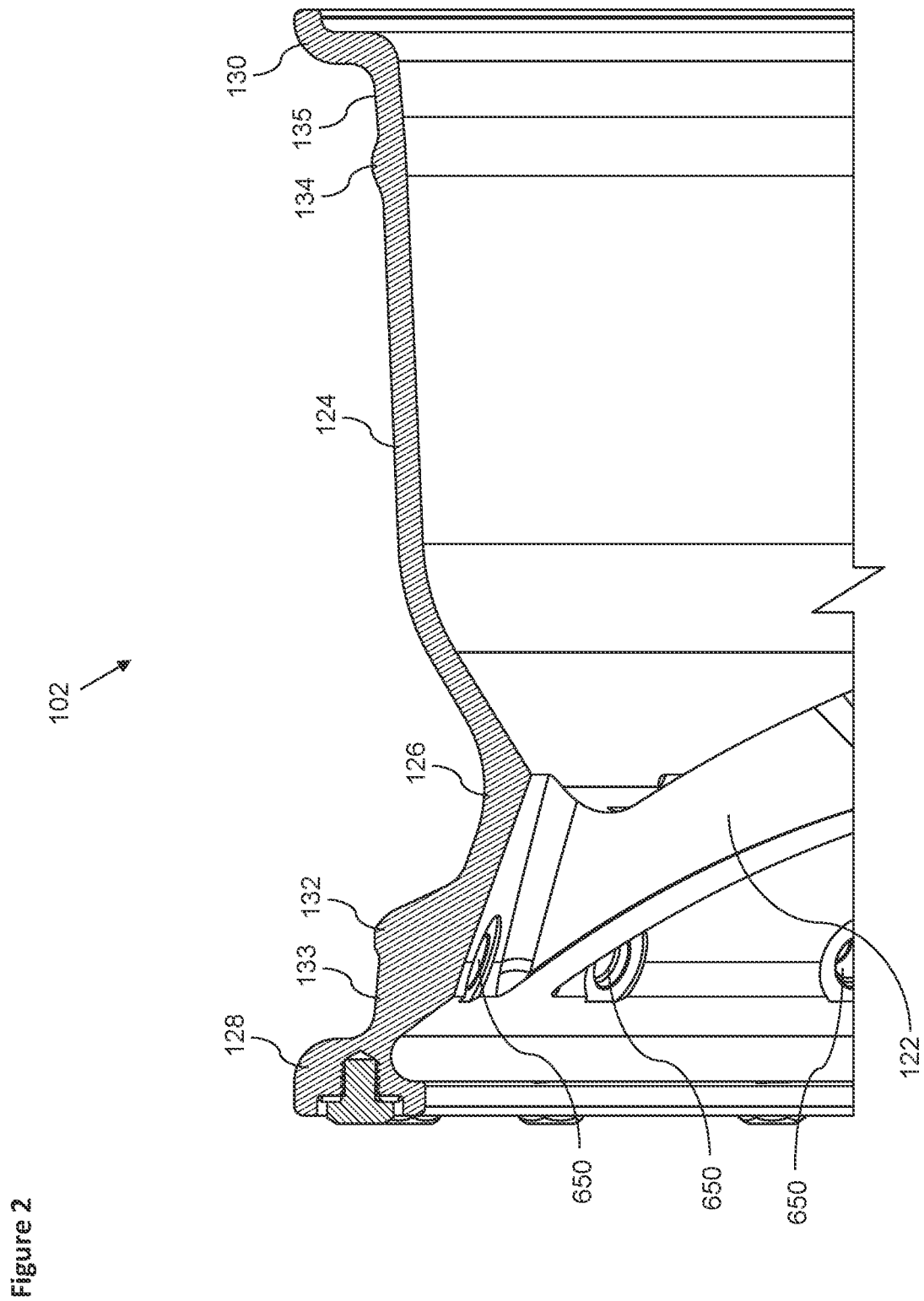
FIG. 2 is an enlarged cross-sectional view of the rim of the wheel assembly of FIG. 1A.

Although several embodiments, examples, and illustrations are disclosed below, it will be understood by those of ordinary skill in the art that the inventions described herein extend beyond the specifically disclosed embodiments, examples, and illustrations and includes other uses of the inventions and obvious modifications and equivalents thereof. Embodiments of the inventions are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for their desirable attributes or is essential to practicing the inventions herein described.

Vehicles often use wheels having pneumatic tires attached to a generally cylindrical rim. The tire typically seals to the rim at an outboard tire bead and an inboard tire bead. In on-road operation, the tire is often pressurized to a relatively high pressure, such as 30 to 40 psi, which helps to keep the tire beads sealed against the rim. A tire used in typical on-road situations only experiences relatively small sideways forces (e.g., forces directed generally parallel to the axis of rotation of the tire, such as during turning). This combination of relatively high internal pressure and relatively low sideways forces on the tire leads to a relatively small risk of having the tire beads come unmounted from the bead seats of the rim. That said, as an additional safety measure, some wheel rims intended for typical on-road use will still include a ridge, hump, or bump positioned behind the rim's bead seats that is intended to help retain the tire beads on the bead seat if they do experience an unusually large sideways force and/or if the tire pressure is lower than desired. Such bead retention ridges or humps cannot withstand significant sideways forces on the tire bead, however. One reason for this is that the ridge or hump needs to be low enough or small enough that the tire bead can be pressed over the ridge or hump during installation or removal of the tire.

During off-road excursions, particularly in sandy, uneven, and/or rocky terrain, it can be desirable to reduce the pressure within a tire, such as to within a range of 10 to 20 psi. A reduction in pressure in the tire can increase the amount of tire tread in contact with the terrain, such as by increasing the tread contact patch size, and thus help to maintain a solid grip on the train. A reduction in pressure can also sometimes help to prevent punctures in the tire. One downside of reducing the tire pressure, however, is that there is less internal pressure helping to maintain the tire's beads in contact with the rim's bead seats. Further, a sandy, rocky, and/or uneven environment in an off-road situation may tend to introduce higher sideways forces onto the tire (e.g., forces directed generally along the axis of rotation of the tire, such as force F shown in FIG. 1B). This combination of higher sideways forces and lower tire pressure can lead to disengaging one or both of the tire's beads from the rim's bead seats, likely disabling the vehicle until the wheel can be replaced and/or repaired.

Specialized off-road rims have been developed that mechanically lock one or both of the tire's beads onto the rim, thus retaining the beads in place even when the tire is pressurized to only a very low pressure and subjected to high sideways forces. Such specialized off-road rims have various problems, however. For example, the mechanical locking mechanisms can be tricky to use, have specific bolt tightening or torqueing procedures that are easy to conduct incorrectly, and/or the like, which can lead to such mechanisms failing and leaving a vehicle stranded off-road. Further, even when such mechanisms are installed or adjusted appropriately, they may not be approved for on-road use, and thus must be limited to only off-road use. In such a situation, if an owner of the vehicle wishes to use the vehicle both on-road and off-road, the owner will need to have two sets of wheels: one for on-road use and one for off-road use. Such a situation can lead to unnecessary expense and wasted time.

The disclosure herein presents various embodiments of tire bead retention systems that solve the problems described above, among other benefits. For example, some embodiments comprise a rim that includes a primary bead retention mechanism intended to be sufficient for retaining the tire bead during tire installation and/or in most on-road situations, and a secondary bead retention mechanism intended to not contact the tire in typical on-road situations, and to only come into play in off-road situations where the tire pressure has been reduced and high sideways forces on the tire are being experienced. Such a bead retention mechanism may also be referred to as a passive bead retention mechanism. In some embodiments, the secondary bead retention mechanism may be configured to contact the tire in normal on-road situations; however, such a design may in some cases be less desirable than a design where the secondary bead retention mechanism does not contact the tire in normal on-road situations.

Some embodiments disclosed herein comprise a plurality of bead retention members that are movably and/or removably coupled to a wheel rim. In an installed position, the bead retention members desirably extend radially into the pressurized interior cavity of the tire, and are positioned adjacent to, but not in contact with, the bead of the tire. In some embodiments, the bead retention members are secondary bead retention members that extend through a primary bead retention hump or ridge, and function essentially to increase an effective height of the primary bead retention ridge or hump. Having a higher bead retention ridge or hump may make it impossible to install or remove tires, however. Various embodiments disclosed herein solve that problem by making the secondary bead retention members removable, rotatable, and/or movable with respect to the rim such that the tire bead only needs to pass over the primary bead retention ridge or hump during installation and removal. Although several embodiments disclosed herein are described as using a secondary bead retention member in combination with a primary bead retention ridge or hump (such as the type of bead retention hump found on a standard on-road rim), the secondary bead retention members may also be used in rims having other designs. For example, some rims may not have a primary bread retention ridge or hump, some rims may have a non-standard primary bead retention ridge or hump (see, for example, rim 1802 of FIG. 17), and some rims may utilize other primary bead retention methods.

It should be noted that, although various embodiments disclosed herein are described as comprising a primary bead retention hump or ridge, and a plurality of secondary bead retention members that pass through or are located adjacent to the primary bead retention hump or ridge, some embodiments may not include a primary bead retention hump or ridge, and may only use the components described herein as the secondary bead retention members to perform bead retention functions. In such an embodiment, although the secondary bead retention members are referred to herein as "secondary", there may be no "primary" bead retention mechanism and/or the air pressure within the tire may be considered the primary bead retention method.

Example Bead Retention Mechanisms and Wheel Anatomy

FIGS. 1A, 1B, and 2 illustrate one example of a wheel assembly 100 having primary and secondary bead retention mechanisms. FIG. 1A is an outboard view of the wheel assembly 100, FIG. 1B is a cross-sectional view of the wheel assembly 100, and FIG. 2 is an enlarged cross-sectional view of a portion of the rim 102 of the wheel assembly 100. This section describes the bead retention system in general, along with some general wheel anatomy used in later descriptions. More details of the bead retention system are given in later sections below.

The wheel assembly 100 comprises a rim 102 and a tire 104 mounted thereon. The rim 102 is configured to rotate about a longitudinal axis 103 when installed on a vehicle. The wheel assembly 100 further comprises a plurality of secondary bead retention members 106 extending from an ambient pressure side of the rim 102 to an internal pressurized side of the rim 102. The tire 104 comprises two sidewalls 108 extending between a tread 110 and outboard and inboard tire beads 105 and 107, respectively. The rim 102 further comprises a center disc 120 that comprises a center portion configured to mount to a vehicle and a plurality of spokes 122 that extend radially outward to a barrel 124. The rim further comprises a hole 125 for a valve core to be positioned therethrough.

In this embodiment, the wheel assembly 100 comprises 16 separate secondary bead retention members 106 that are spaced angularly apart about a circumference of the barrel 124. For example, the secondary bead retention members 106 may be evenly spaced apart by angle 127, which may be, for example, approximately 22.5°. Some embodiments may not necessarily space the secondary bead retention members 106 evenly apart, however, and some embodiments may include more or fewer secondary bead retention members (such as, for example, at least 4, 6, 8, 10, 12, 14, 16, 18, 20, 22, 24, 26, 28, or 30). In some embodiments, it can be desirable for angle 127 to be relatively small, such as no greater than 15, 20, 25, or 30 degrees. This can be desirable, for example, because a typical sideways force experienced in an off-road situation (e.g., force F of FIG. 1B) is only applied to a relatively small portion of the tire, such as within approximately one quadrant of the tire.

Turning to FIG. 2, FIG. 2 illustrates a variety of features of the cross-sectional shape of the barrel 124 of the rim 102. Starting at the outboard end (the left side, as oriented in FIG. 2), the barrel 124 comprises an annular outboard flange 128 extending radially outward, and an annular outboard bead seat 133 extending longitudinally away from the outboard flange 128. As shown in FIG. 1B, the outboard flange 128 and outboard bead seat 133 are configured to have the outboard bead 105 of the tire 104 positioned against them, desirably forming an airtight seal. Returning to FIG. 2, the barrel 124 further comprises an annular outboard primary bead retention ridge, hump, or bump 132. The primary bead retention ridge or hump 132 is positioned behind the bead seat 133, and desirably extends radially outward of at least a portion of the bead seat 133. Desirably, the bead retention ridge or hump 132 extends radially a sufficient amount to keep the outboard bead 105 from disengaging the bead seat 133 during normal on-road use, but does not extend radially enough to inhibit installation or removal of the tire from the rim.

With continued reference to FIG. 2, the barrel 124 further comprises a plurality of secondary bead retention member receptacles 650 that extend from the ambient side of the rim 102 (e.g., below the sectioned portion of the barrel 124 as oriented in FIG. 2) to the pressurized side of the rim 102 (e.g., above the sectioned portion of the barrel 124 as oriented in FIG. 2), and through the bead retention ridge or hump 132. The secondary bead retention member receptacles 650 are discussed in greater detail below.

Behind the primary bead retention ridge or hump 132 is the drop center 126. The drop center 126 extends radially inwardly and is positioned to facilitate easier installation and/or removal of the tire 104 without having to unnecessarily stretch the beads 105 and 107 of the tire 104.

The inboard side of the barrel 124 (the right side, as oriented in FIG. 2) comprises similar features to the outboard side. Specifically, the inboard side comprises an annular inboard flange 130, an annular inboard bead seat 135, and an annular inboard primary bead retention ridge or hump 134. In this embodiment, the inboard side of the barrel 124 does not include any secondary bead retention features. This can be desirable, for example, because the types of sideways forces a tire will experience in a typical off-road excursion may be much greater along the direction that would tend to disengage the outboard bead 105 from the rim (e.g., along the direction of force F shown in FIG. 1B) than in the opposite direction that would tend to disengage the inboard bead 107 from the rim. That said, the techniques disclosed herein are not limited to only being used with the outboard side of a rim, and some rims may utilize the techniques disclosed herein on both the outboard side and the inboard side of the rim and/or only on the inboard side of the rim. Further, although the examples herein are shown with an automobile wheel, the techniques described herein could also be used on other types of wheels, such as wheels for motorcycles, ATV's, industrial/tractor wheels, and/or the like.

Although FIG. 2 illustrates the anatomy of one specific example of a rim, various other types of rims may utilize the bead retention features disclosed herein. For example, the techniques disclosed herein may be used with steel rims, aluminum rims, one-piece rims, multi-piece rims, rims with or without hubcaps, and/or the like.

Example Wheel Assembly

Figure 3A:
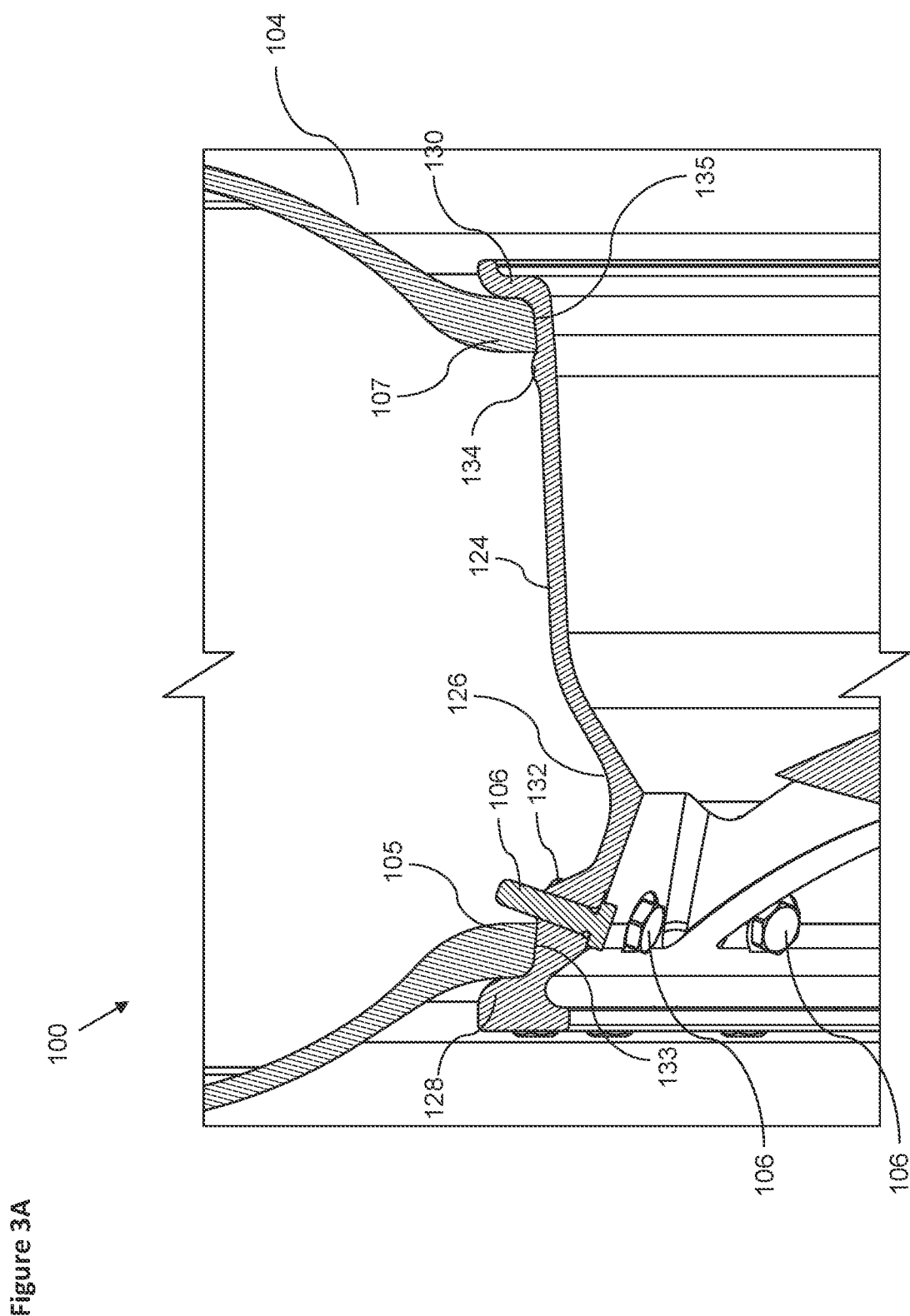
FIG. 3A is an enlarged cross-sectional view of the wheel assembly of FIG. 1A.
Figure 3B:
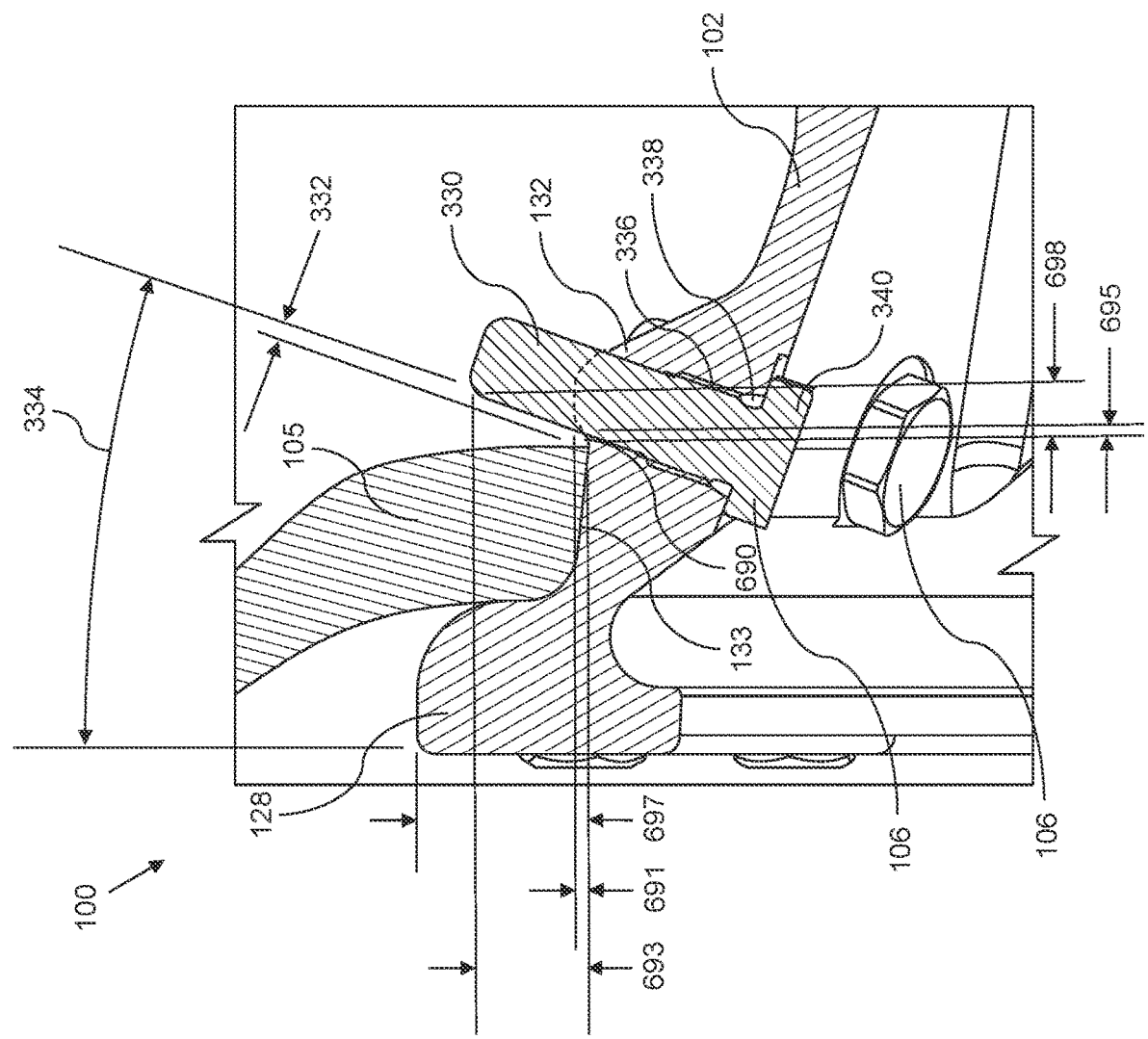
FIG. 3B is a further enlarged cross-sectional view of the wheel assembly of FIG. 1A.
Figure 4:
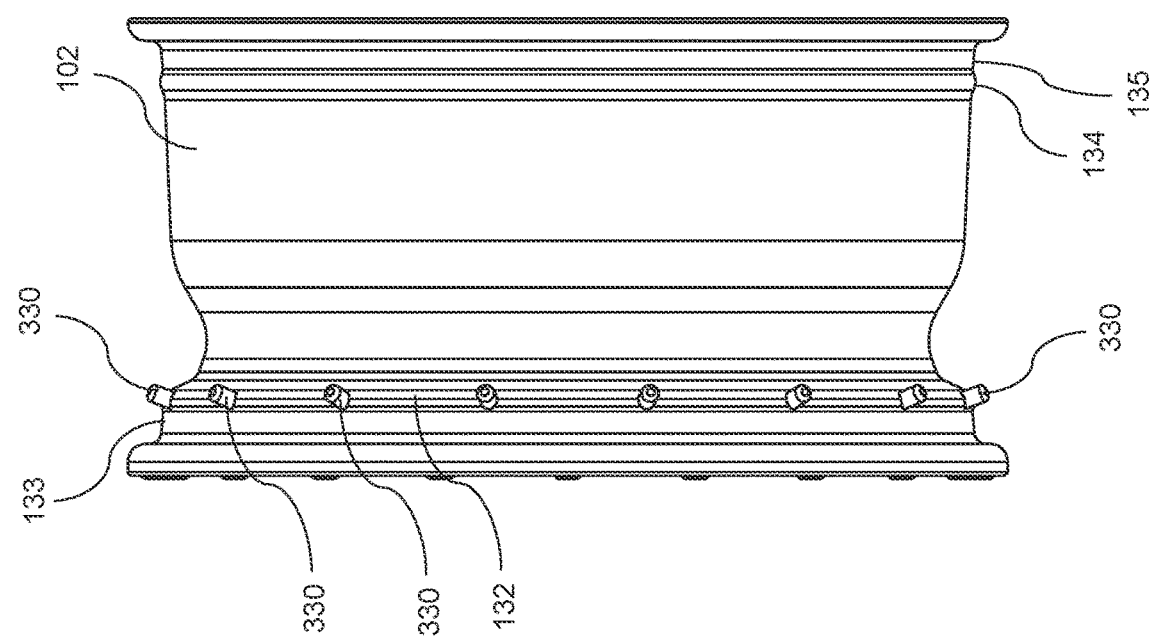
FIG. 4 is a side view of the rim and bead retention mechanisms of the wheel assembly of FIG. 1A.
Figure 5B:
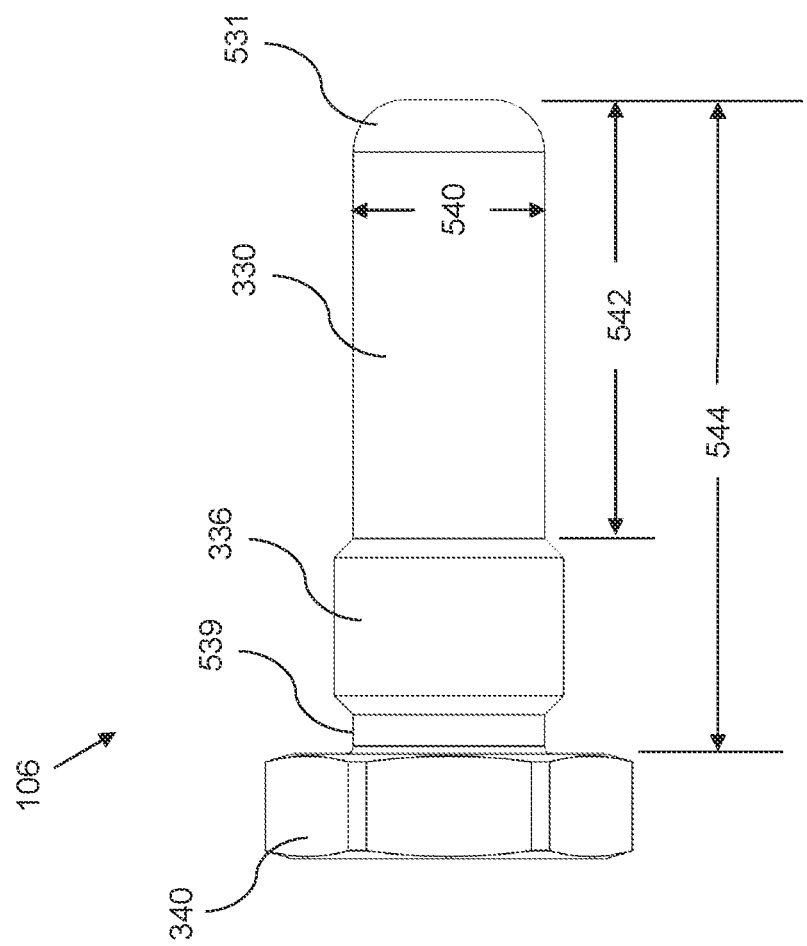
FIG. 5B is a side view of the secondary bead retention member of FIG. 5A.
Figure 5A:
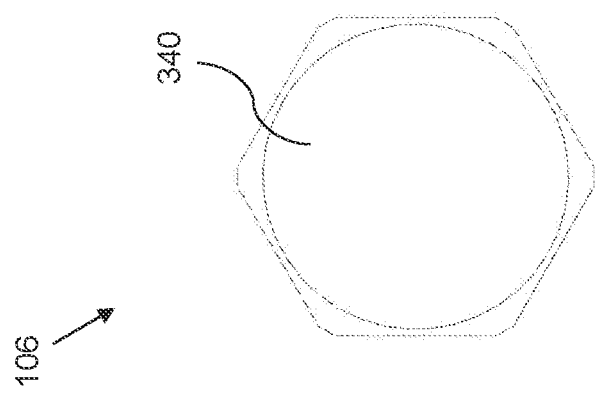
FIG. 5A is an end view of a secondary bead retention member of the wheel assembly of FIG. 1A.
Figure 6:
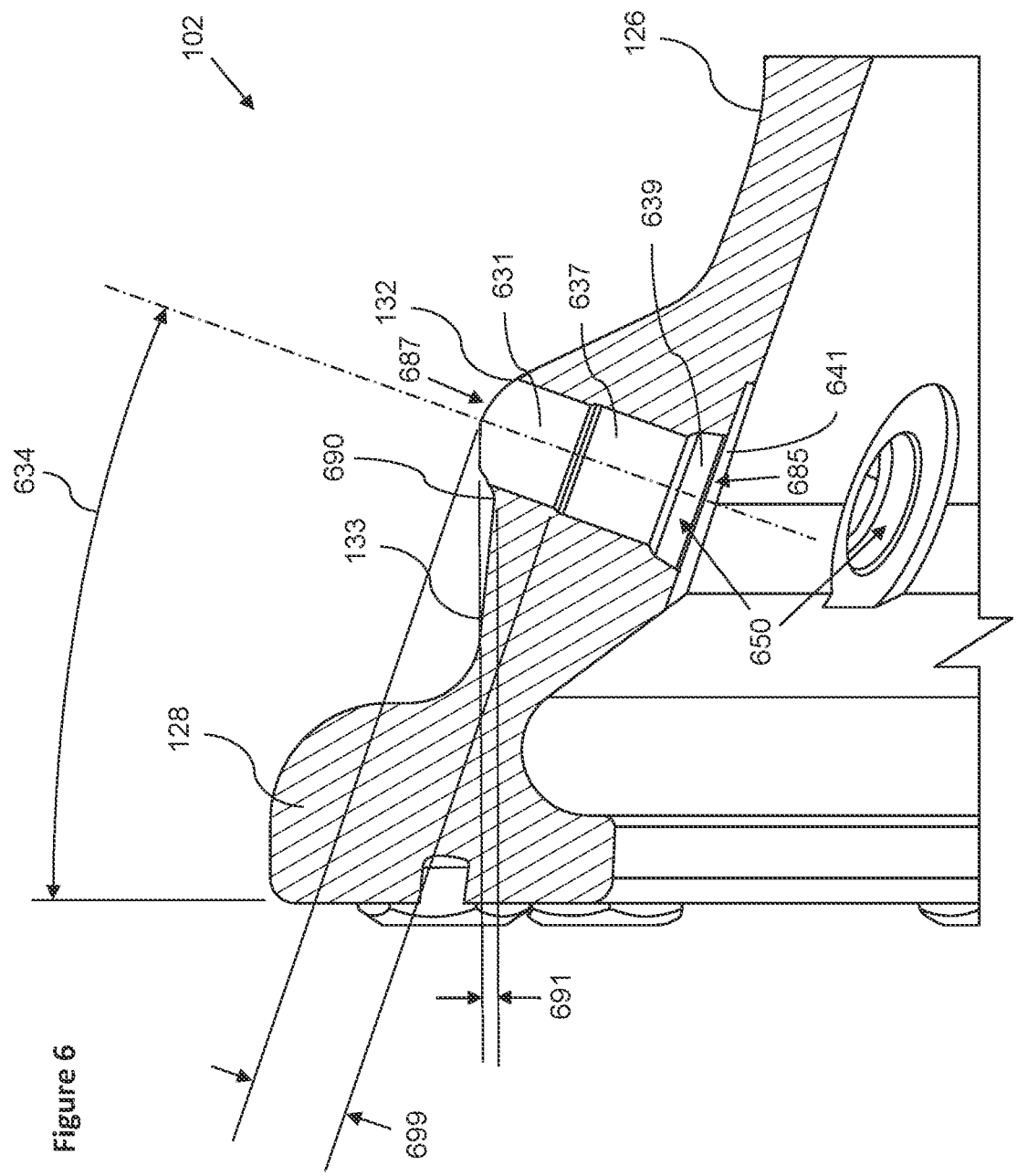
FIG. 6 is an enlarged cross-sectional view of the rim of the wheel assembly of FIG. 1A.

FIGS. 1A-6 illustrate a first example embodiment of a wheel assembly 100 comprising primary and secondary bead retention systems. As discussed above, FIGS. 1A and 1B illustrate side and cross-sectional views of the wheel assembly 100, respectively, and FIG. 2 illustrates an enlarged cross-sectional view of the rim 102. FIG. 3A illustrates an enlarged cross-sectional view of the wheel assembly 100, and FIG. 3B illustrates a further enlarged cross-sectional view of an outboard side of the wheel assembly 100. FIG. 4 illustrates the rim 102 having a plurality of secondary bead retention members coupled thereto. FIGS. 5A and 5B illustrate end and side views, respectively, of a secondary bead retention member 106. FIGS. 5C and 5D illustrate end and side views, respectively, of an optional plug 506. FIG. 6 illustrates an enlarged cross-sectional view of an outboard portion of the rim 102.

With reference to FIGS. 1A and 1B, as discussed above, the wheel assembly 100 comprises a rim 102 having a tire 104 mounted thereto. The tire 104 comprises an outboard bead 105 and an inboard bead 107. In the installed position illustrated in FIG. 1B, the outboard bead 105 is desirably in contact with the annular outboard flange 128 and annular outboard bead seat 133 of the rim barrel 124 (shown in FIG. 2). Further, the inboard bead 107 is desirably in contact with the annular inboard flange 130 and annular inboard bead seat 135.

Turning to FIG. 3A, FIG. 3A shows an enlarged cross-sectional view of the tire 104 mounted to the barrel 124 of the rim 102. In normal on-road use, the beads 105, 107 of the tire 104 are desirably retained by and sealed against flanges 128, 130 and bead seats 133, 135, using air pressure within the tire 104. In some embodiments, the primary bead retention ridges or humps 132, 134 may be in contact with an inner side of the beads 105, 107; however, some embodiments may not have the primary bead retention ridges or humps 132, 134 in contact with the beads 105, 107 in normal use. For example, the pressure within the tire 104 may be sufficient to keep the beads 105, 107 in place against the flanges 128, 130 and bead seats 133, 135 without anything other than air pressure pressing against the longitudinal inside sides of the beads 105, 107. However, the primary bead retention ridges or humps 132, 134 may still perform at least a couple functions. For example, the primary bead retention ridges or humps 132, 134 may help to maintain the beads 105, 107 in place on the rim during installation of the tire 104, before the tire has been pressurized. As another example, the primary bead retention ridges or humps 132, 134 may help to mechanically retain the beads 105, 107 in position on the rim in response to at least some sideways forces on the tire, particularly when the pressure in the tire is lower than it should be. Importantly, however, regardless of whether the primary bead retention ridges or humps 132, 134 are intended to be in contact with the beads 105, 107 during normal use, the primary bead retention ridges or humps 132, 134 may not be sufficient to retain the beads 105, 107 in place in response to the significant sideways forces that may be experienced in off-road excursions, especially when the pressure in the tire has been reduced below a normal on-road tire pressure.

In order to address such situations, the wheel assembly 100 further comprises a plurality of secondary bead retention members 106. This embodiment includes 16 secondary bead retention members 106 spaced angularly apart about the outboard portion of the barrel 124 of the rim 102. A portion of the secondary bead retention members 106 desirably extends into the pressurized cavity of the tire 104 behind the outboard bead 105. By positioning such bead retention members 106 behind the outboard bead 105, the wheel assembly 100 can withstand much higher sideways forces applied to the tire 104 (such as force F illustrated in FIG. 1B) without disengaging the outboard bead 105 from the bead seat 133.

As an example, testing was conducted on two wheels similar to the wheel 100, but one with secondary bead retention members 106, and one without. In this test, each wheel was mounted to a truck, pressurized to approximately 10 psi, and positioned adjacent to a wooden block that was affixed to the ground and stood above the ground by approximately ⅔ of the sidewall 108 height from the ground to the outboard flange 128. The rim was then pulled sideways against the wooden block, simulating force F of FIG. 1B. For the wheel without secondary bead retention members 106, the outboard bead 105 of the tire 104 was easily "debeaded" (i.e. pulled away from the bead seat 133, over the primary bead retention ridge or hump 132, and into the drop center 126), with a force of approximately 860-1000 pounds applied. A sideways force of 860-1000 pounds or more could easily be experienced in an off-road situation, and such a result would disable the vehicle if it happened in an off-road situation. On the other hand, in conducting the same test on the wheel with the secondary bead retention members 106, the outboard bead 105 of the tire 104 was unable to be "debeaded." Instead, the sidewall 108 and tread 110 elastically deformed somewhat, until the wheel 100 eventually jumped over the block (in response to a sideways force of approximately 5500 pounds), and the sidewall 108 and tread 110 rebounded into their normal shape. Such a result would be ideal in an off-road situation, because the vehicle would not be disabled and could continue driving normally.

Turning now to FIG. 3B, FIG. 3B illustrates a further enlarged cross-sectional view of an outboard portion of the rim 102 that includes the outboard annular flange 128, the outboard annular bead seat 133, the outboard primary bead retention ridge or hump 132, and two of the secondary bead retention members 106. The cross-sectional view of FIG. 3B is taken through a middle of one of the secondary bead retention members 106 in order to show additional detail of a secondary bead retention member 106 and how it interacts with the rim 102.

The secondary bead retention member 106 comprises a head 340, a threaded region 336, and a smooth region, post, or pin 330. The head 340 is desirably configured to be rotationally manipulated by a hand tool, such as a wrench, socket, screwdriver, and/or the like. In this embodiment, the head 340 comprises a plurality of external flats configured to be manipulated by a wrench, socket, or the like, but other embodiments may use different arrangements (such as the cap heads of members 706 and 1206 of FIGS. 10A-10B and 15A-15B discussed below). The threaded region 336 desirably comprises an external thread that engages a corresponding internal thread of the rim 102 in order to retain the secondary bead retention member 106 in place with respect to the rim 102. Desirably, a sealing gland 338 is formed between the secondary bead retention member 106 and the rim 102, in order to pneumatically seal the junction between the secondary bead retention member 106 and rim 102. Although not shown in FIG. 3B, an O-ring or other seal may be positioned within the sealing gland 338. In some embodiments, the seal between the secondary bead retention member 106 and the rim 102 may utilize an SAE Straight Thread O-Ring Port or O-Ring Boss (ORB) in accordance with standard SAE J1926-1. Such a sealing arrangement can be better than a compression seal (e.g., if there were a compression seal positioned between the head 340 and spot face 641), for example, because there can be less cycle loading on the seal and/or the retention member 106, helping to increase fatigue life and reduce the risk that a pneumatic leak develops over time.

The smooth region 330 of the secondary bead retention member 106 desirably protrudes through an opening in the primary bead retention ridge or hump 132 and extends radially into the pressurized cavity formed by the tire and rim. The smooth region 330 may alternatively be referred to as a post, a pin, a smooth retention region, a protruding member, and/or the like. Although it is not necessarily required for post 330 to comprise a smooth shape or surface texture, it can be desirable for the posts 330 to be smooth and devoid of threads, such as to reduce the risk of damaging the tire bead 105 if the tire bead 105 is forced against one or more of the posts 330 by a large sideways force on the tire (such as force F of FIG. 1B).

As shown in FIG. 3B, the post 330 desirably extends radially inwardly at a non-parallel angle 334 with respect to a vertical plane defined by the annular flange 128. In this embodiment, the angle 334 is desirably approximately 20°, however, other angles may be used, such as, for example, an angle within a range of 5° to 35°, 10° to 30°, 15° to 25°, and/or the like. Further, in some embodiments, the angle 334 may be 0° or approximately 0°, corresponding to the posts 330 extending generally parallel to the vertical plane defined by the flange 128.

In the embodiment of FIG. 3B, the nonparallel angle 334 is positioned such that a distal end of the post 330 is longitudinally further away from the vertical plane than a proximal end of the post 330. Stated another way, the post 330 is desirably tilted or angled away from the vertical plane and thus the tire bead 105. Although some embodiments may tilt the post 330 differently, it can be desirable to have the post 330 tilt away from the tire bead 105 as shown in FIG. 3B. For example, it may be desirable to only have the tire bead 105 come into contact with the post 330 under relatively extreme forces that would otherwise cause the bead 105 to disengage the bead seat 133 and be pulled over the primary bead retention ridge or hump 132 if the post 330 were not there. Leading up to such a situation, the longitudinal innermost portion of the bead 105 would typically be stopped by the longitudinal outermost portion of the primary bead retention ridge or hump 132 that begins at inflection point 690. As described below with reference to FIG. 6, inflection point 690 is the point at which the rim surface transitions from the annular bead seat 133 to the primary bead retention hump or ridge 132. Although illustrated as a single point in the cross-section of FIG. 3B, the inflection point 690 is in reality a circle that extends about the circumference of the rim 102.

As additional force is applied to the tire, the bead 105 may use the inflection point 690 (and/or the adjacent outboard portion of the primary bead retention hump or ridge 132) as somewhat of a pivot point that causes a portion of the bead 105 above the longitudinal innermost point that is in contact with the inflection point 690 to rotate counterclockwise with respect to the orientation of FIG. 3B. If the post 330 extended straight upward (e.g. parallel to the vertical plane), then the bead 105 may come into contact with the post 330 before the secondary retention function of the post 330 is necessary, which may not be desirable. In addition, it could be possible that repeated engagement and disengagement between the bead 105 and post 330 in situations where the additional retention function of the post 330 is not necessary may lead to fatigue or other repetitive damage to the bead 105, which could lead to premature failure of the tire. Accordingly, it can be desirable to angle the secondary retention members 106 such that the protruding posts 330 are tilted away from the tire bead 105 and desirably would tend to come into contact with the tire bead 105 only when necessary to prevent the tire bead 105 from passing over the primary bead retention ridge or hump 132. Not all embodiments disclosed herein are required to have the posts 330 tilted to such an extent, however.

Although the angle 334 is measured to an outer surface of the post 330, the angle 334 may alternatively be measured to a centerline of the secondary retention member 106, such as the axis of rotation of the threaded region 336. The position of this measurement does not make a difference with the present embodiment, because the post 330 is desirably a cylindrical post that is centered on the axis of rotation of the secondary retention member 106. However, alternative embodiments may have a post design that is not necessarily cylindrical and/or is not necessarily centered on the axis of rotation of the threaded region 336. In such a case, it may be desirable to measure angle 334 to the axis of rotation of the threaded region 336.

FIG. 3B further illustrates that the post 330 of the secondary retention member 106 is desirably spaced apart from the tire bead 105 in the normal or unstressed position (e.g., the position the tire bead 105 is in when normally pressurized and not subject to a significant side load such as force F of FIG. 1B). In some embodiments, the secondary retention members may alternatively be referred to as passive tire bead retention members or part of a passive tire bead retention system. This is because, as described elsewhere herein, it can be desirable for the retention members 106 to only come into contact with the tire bead when needed, and to not normally be in contact with the tire bead.

The amount that the post 330 can be spaced apart from the tire bead 105 can be measured or described in various ways. For example, dimension 332 illustrates the distance the post 330 is spaced apart from the tire bead 105 perpendicular to an axis of rotation of the post 330. Dimension 332 may, for example, be approximately 3 millimeters. In some embodiments, dimension 332 is desirably no less than 1, 2, 3, 4, or 5 millimeters. In some embodiments, dimension 332 is desirably within a range of 1 to 10, 2 to 5, or 2 to 7 millimeters. In some tires, the tire bead 105 may have at least some flashing leftover from the manufacturing process that extends inboard from the inboard wall of the tire bead 105. In such an embodiment, dimension 332 can be measured from the post 330 to the inboard wall of the tire bead 105, disregarding the flashing. It should be noted that, in some tires, such as tires with particularly thick tire beads or particularly thick flashing, it may be possible that the flashing contacts the post 330, while the inboard wall of the tire bead 105 is still spaced apart from the post 330.

The distance that the post 330 is spaced apart from the tire bead 105 may alternatively be described as the longitudinal distance between the longitudinally innermost point of the tire bead 105 and the longitudinally outermost point at which the post 330 protrudes from the rim 102. This dimension is shown as dimension 695 in FIG. 3B. Dimension 695 may, for example, be approximately 3 millimeters. In some embodiments, dimension 695 is desirably no less than 1, 2, 3, 4, or 5 millimeters. In some embodiments, dimension 695 is desirably within a range of 1 to 10, 2 to 5, or 2 to 7 millimeters.

The distance that the post 330 is spaced apart from the tire bead 105 may alternatively be described as the longitudinal distance between the longitudinally innermost point of the tire bead 105 and the distal end of the post 330 at the point where the smooth cylindrical surface 330 transitions into rounded distal tip 531 (see FIG. 5B). This dimension is shown as dimension 698 in FIG. 3B. Dimension 698 may, for example, be approximately 10 millimeters. In some embodiments, dimension 698 is desirably no less than 5, 8, 10, 12 or 15 millimeters. In some embodiments, dimension 698 is desirably within a range of 5 to 20, 5 to 30, or 10 to 20 millimeters.

As described above, and with further reference to FIG. 3B, it can also be desirable for the post 330 to extend radially beyond the primary bead retention ridge or hump 132. FIG. 3B illustrates in hidden lines the radial extent or height of the primary bead retention ridge or hump 132. The height or extent of this ridge or hump is illustrated as dimension 691, which is measured as the radial distance between the radial outermost point of the ridge or hump 132 and the inflection point 690. In some embodiments, dimension 691 is approximately 1 millimeter, but may also be other sizes. Dimension 693 illustrates the radial extension or height of the radially outermost point of the post or pin 330 above the inflection point 690. Height 693 may be approximately, for example, 13 millimeters. In some embodiments, height 693 may desirably be no less than 5, 8, 10, 12, or 15 millimeters. In some embodiments, height 693 may be desirably within a range of 5 to 20 millimeters, 10 to 20 millimeters, or 10 to 30 millimeters. In some embodiments, a ratio of height 693 to height 691 is approximately 13:1. In some embodiments, it can be desirable for the ratio of height 693 to height 691 to be at least 1.5:1, 2:1, 3:1, 4:1, 5:1, 8:1, 10:1, or 12:1, or 15:1. In some embodiments, it can be desirable for the ratio of height 693 to 691 to be within a range of 5:1 to 15:1, 10:1 to 15:1, or 10:1 to 20:1.

In some embodiments, the height 693 of the post or pin 330 can alternatively be defined as a percentage or ratio of the height 697 of the flange 128. The height 697 of the flange 128 is also shown as measured from the inflection point 690. The height 697 may, for example, be approximately 19 millimeters, although other heights may also be used. In some embodiments, the height 693 of post or pin 330 is approximately 70% of height 697. In some embodiments, it can be desirable for the height 693 to be at least 40%, 50%, 60%, 70%, or 80% of the height 697. In some embodiments, it can be desirable for the height 693 to be within a range of 40 to 90%, 50 to 70%, or 60 to 80%, of the height 697, and/or the like. In some embodiments, it can be desirable for the height 693 to be less than the height 697 of the flange 128, or at least no greater than the height 697. One benefit of this is that, if the posts 330 extended radially inwardly too far, they could affect the ability of a "run flat" tire to be used when "flat."

For embodiments of wheels disclosed herein that include a primary bead retention ridge or hump, unless otherwise specified, the radial height of the flange 128, post 330, and/or primary bead retention ridge or hump 132 is measured with respect to the inflection point 690. As mentioned above, however, some embodiments of bead retention mechanisms disclosed herein may be used with a rim that does not include a primary bead retention ridge or hump 132. In such embodiments, the radial heights discussed herein, unless otherwise specified, are measured from the longitudinal outermost point at which the post 330 extends through the rim 102.

FIG. 4 illustrates an external view of the rim 102 with a plurality of posts 330 of secondary retention members extending therefrom. In this view, eight of the 16 total posts 330 are shown. FIG. 4 further shows that each of the posts 330 is extending through the primary retention ridge or hump 132. It should be noted that, although the opening through which posts 330 extend is, in this embodiment, completely within the primary bead retention ridge or hump 132, other embodiments may position and/or size the opening through which posts 330 extend differently. For example, at least a portion of the opening through which the posts 330 extend may be positioned longitudinally in front of or behind the primary bead retention ridge 132. It may be desirable not to position the opening in front of the primary bead retention ridge 132, however, because this may lead to the posts 330 engaging the bead of the tire during normal on-road use, when the additional retention functions of the posts 330 may not be necessary. It may be desirable in some embodiments to have larger (e.g., larger diameter) posts 330 that can for example, handle higher shear stresses, and such an embodiment may be a situation where it may be desirable to have the opening through which the posts 330 extend at least partially behind the primary bead retention hump or ridge 132.

As can be seen more clearly in FIG. 4, the inboard side of the rim 102 comprises a primary bead retention hump or ridge 134 adjacent inboard bead seat 135 but does not include any secondary bead retention members. This may be desirable, for example, because the types of sideways forces experienced by a tire in an off-road situation may be more likely to be directed toward dislodging the outboard bead than the inboard bead. However, it is possible to include a secondary bead retention system as disclosed herein on the inboard side of the rim.

Example Bead Retention Members

Turning now to FIGS. 5A and 5B, FIGS. 5A and 5B illustrate end and side views, respectively, of one of the secondary bead retention members 106 of wheel assembly 100. As discussed above, the secondary bead retention member 106 comprises a head 340, a threaded region 336, and a smooth post or pin 330. FIG. 5B further shows that the secondary bead retention member 106 comprises a groove 539 between the head 340 and threaded region 336 for insertion therein of an elastomer O-ring or other seal. Also, FIG. 5B illustrates that the smooth pin or post 330 further comprises a rounded and/or blunt end 531 at a distal end of the post 330. It may be desirable to include a rounded or blunt end 531, such as, for example, to avoid or limit the chances of puncturing the tire when the tire is forced against one or more of the posts 330 in response to a significant sideways force on the tire. In this embodiment, the rounded end 531 desirably comprises a radius of approximately 2.5 millimeters. In some embodiments, it can be desirable for the rounded end 531 to comprise a radius of at least 2, 3, 4, or 5 millimeters.

FIG. 5B further illustrates various dimensions of the secondary bead retention member 106. Length 544 illustrates the length from the underside of the head 340 to the distal end of the post 330. Length 542 illustrates the length from the end of the threaded region 336 to the distal end of the post 330. Finally, diameter 540 illustrates the diameter of the main cylindrical region of the post 330. In some embodiments, the diameter 540 is approximately 9.27 millimeters. In some embodiments, it can be desirable for the diameter 540 to be at least 5, 7, 9, or 10 millimeters. It can be desirable for the diameter 540 to be relatively large, for example, to increase the shear and/or bending handling capability of the post 330 in order to not deform or break the post 330 in response to a significant side load being applied to the tire. This can be an important consideration, because, although a plurality of secondary bead retention members 106 are included (in this case 16, but other numbers may be used), the sideways force introduced on a tire in an off-road situation is not generally going to be evenly distributed around the circumference of the tire. Instead, the force will more likely be focused on a relatively small region of the tire, such as focused primarily within one quadrant of the tire. Accordingly, the sideways force applied to the tire may need to be resisted by only a few secondary bead retention members 106, with the highest force applied to likely only one or two of the secondary bead retention members 106. To help resist such forces, it can also be desirable for at least a portion of the smooth post surface 330 to engage a corresponding interior surface in the rim, such as smooth region 631 illustrated in FIG. 6, and discussed in greater detail below. For example, it may be desirable to have a relatively close slip fit between post 330 and the interior surface 631, such as a nominal total diametral clearance of approximately 0.05 millimeters. In some embodiments, the diameters of surfaces 330 and 631 are desirably maintained within relatively tight tolerances, such that the total diametral clearance will be within a range of approximately 0.05 to 0.15 millimeters.

With continued reference to FIG. 5B, length 542 of the posts 330 may, for example, be approximately 21 millimeters. Length 542 may in some embodiments desirably be at least 15, 20, or 25 millimeters. In some embodiments, length 542 may desirably be within a range of 10 to 25, 15 to 25, or 15 to 30 millimeters. Length 544 may, for example, be approximately 32 millimeters. Length 544 man some embodiments desirably be at least 20, 30, or 40 millimeters. In some embodiments, length 544 may desirably be within a range of 20 to 50, 25 to 45, or 20 to 40 millimeters. In some embodiments, length 542 and/or length 544 may be configured to achieve one or more of the ratios of height 693 to height 697 discussed above with reference to FIG. 3B.

The secondary bead retention member 106 illustrated in FIGS. 5A and 5B is desirably a rigid member formed from steel, aluminum, titanium, or another relatively rigid material that comprises sufficient strength to resist the bending and/or shear loads placed on the pins 330 by the tire bead in response to a significant sideways force on the tire. Further, the secondary bead retention member 106 and/or the post 330 is desirably a rigid member that is not expandable, compressible, stretchable, and/or the like. For example, an alternative technique to help retain a tire bead could be to utilize a member that expands radially when tightened into the rim, similar to how a rivet operates, expanding the outer surface of such member into contact with and/or compressing the tire bead. Such a design would have multiple drawbacks, however. For example, using a radially expanding member that operates like a rivet is a relatively permanent operation that is not easily removable, and/or may not be removable without destroying the retention member and/or the rim itself. Further, expanding such a member into contact with the tire bead may not be desirable, especially for a wheel that is intended to be used both off-road and on-road. Such a design may put unnecessary stress on the bead of the tire during on-road use, and may not even be allowed under applicable regulations.

Although the secondary bead retention member 106 of FIG. 5B is illustrated and described as having both a threaded region 336 and a smooth post or pin 330, some embodiments may extend the threaded region 336 for a longer distance and/or may not even include a smooth post or pin 330. For example, some embodiments may include the threaded region 336 extending all the way or substantially most of the way to the distal end of the secondary bead retention member 106. Although, as described above, it may be desirable in some embodiments to have the region of the secondary bead retention member that will come into contact with the tire in some off road conditions be smooth, it may also be acceptable in some situations to have the portion of the secondary bead retention member that may contact the tire be a threaded portion. For example, if the number, size, positioning, and/or the like of the secondary bead retention members is configured such that no damage will be caused to the tire when pulled against the threaded region of the secondary bead retention members (or no more than negligible damage), then having a fully threaded secondary retention member may lead to a easier to manufacture and/or lower cost assembly. Further, some embodiments may not even include a threaded region, and may retain the secondary bead retention member to the rim using different retention features. For example, as discussed in greater detail below with reference to FIGS. 24A-24D, the secondary bead retention member may be retained using clips, snap rings, springs, and/or various other retention features or mechanisms.

Turning now to FIGS. 5C and 5D, FIGS. 5C and 5D illustrate an optional plug 506 that may be used in place of the secondary bead retention members 106 in the wheel assembly 100. The plug 506 is desirably similar in design to the secondary bead retention member 106, and the same reference numbers are used to refer to the same or similar features. A main difference in the plug 506, however, is that the plug 506 comprises shorter lengths 542 and 544. Desirably, the lengths 544 and 542 are configured such that the plug 506 either does not even include a post 330 or the post 330 is short enough that the distal end 531 of the post 330 does not extend radially beyond the primary bead retention hump or ridge 132.

The plugs 506 may be desirable, for example, to be used in place of the secondary bead retention members 106 when the additional bead retention functionality of the secondary bead retention members 106 is not desired. For example, a user may wish to use the wheel assembly 100 on a vehicle that is intended only for on-road use and has no need for the additional bead retention functionality of the secondary bead retention members 106. In such a case, the user may choose to use plugs 506 instead of secondary bead retention members 106, which can enable easier installation and removal of tires, because the plugs 506 do not need to be removed to remove or install a tire. Another use case could be if a user does not want the secondary bead retention functionality installed most of the time, but wants the ability to easily switch over to having the secondary bead retention functionality when the user goes on an off-road trip. In such a case, the user could relatively easily swap out the plugs 506 with secondary bead retention members 106, re-inflate the tire, and be ready to go relatively quickly without having to take their vehicle to a specialized tire shop to dismount and reinstall the tire.

Example Rim Structure to Accommodate Bead Retention Members

FIG. 6 is an enlarged cross-sectional view of the outboard bead portion of the rim 102 that illustrate additional details of the features configured for accommodating the secondary bead retention members 106 and/or plugs 506. The rim 102 comprises a plurality of secondary bead retention member receptacles 650 positioned about the circumference of the rim. Each of the receptacles 650 desirably comprises a smooth region 631, a retention feature 637 (in this embodiment, a threaded region 637), and an O-ring groove 639. The receptacles 650 may also comprise a spot face 641 which may, for example, be desirable to produce a flat surface for the head 340 to be tightened down against when the surface through which the receptacles 650 are formed is a generally concave curved surface.

The groove 639 is desirably shaped to cooperate with groove 539 of the secondary bead retention member 106 to form the sealing gland 338 shown in FIG. 3B. The threaded region 637 is desirably configured to mate with threaded region 336 of the secondary bead retention member 106. The smooth region 631 is desirably sized to form a relatively close fit to the smooth post 330 of secondary retention member 106, such as a slip fit arrangement, as described above. This can be desirable, for example, to help resist dislodging of the bead of the tire from the bead seat without having to rely only on a bending moment that would otherwise be generated at the junction between the proximal end of the post 330 and the distal end of the threaded region 336 of the secondary bead retention member 106. Stated another way, having a smooth region 631 positioned beyond the threaded region 637, and that is sized to contact the post 330 of secondary retention member 106 at least when the tire bead is forced against post 330, can be desirable to help the post 330 resist greater forces without breaking.

In some embodiments, a height 699 of the smooth region 631 is defined as the height 699 measured parallel to the central axis of the threaded region 637 and measured from the distal end of the threaded region 637 to the distal-most point of the smooth region 631 that intersects the central axis. In some embodiments, height 699 is approximately 10 millimeters. In some embodiments, height 699 is desirably at least 5, 8, 10, or 15 millimeters. In some embodiments, height 699 is at least 100% of a diameter of the smooth region 631 and/or diameter 540 of post 330. In some embodiments, height 699 is at least 70, 80, 90, 100, or 110% of a diameter of the smooth region 631 and/or diameter 540 of post 330. In some embodiments, height 699 is at least 45% of length 542 of post 330 (shown in FIG. 5B). In some embodiments, height 699 is at least 30, 40, 50, or 60% of length 542 of post 330.

It should be noted that, although the embodiment of FIG. 6 includes a smooth region 631 configured to cooperate with smooth region 330 of the secondary bead retention members, some embodiments may not include such a smooth region 631. For example, some embodiments may extend the threaded region 637 through to the inner hole or opening 687. As another example, some embodiments may include a non-threaded region, similar to smooth region 631, but not designed to be a relatively close fit to the secondary bead retention member. As another example, some embodiments of secondary bead retention members may include smooth region or pin 330, but may be sized such that the smooth region or pin 330 only extends into the pressurized cavity of the wheel and does not necessarily radially engage a corresponding surface in receptacles 650.

FIG. 6 further illustrates inflection point 690. In this embodiment, the annular bead seat 133 extends longitudinally behind the flange 128 in a tapered fashion. Stated another way, the annular bead seat 133 is not cylindrical, but is rather a tapered shape from proximal to distal ends of the annular bead seat 133. In an embodiment of a rim that does not include a primary bead retention ridge or hump 132, the annular surface of the bead seat 133 may extend longitudinally back away from the flange 128 until it intersects the drop center 126. In this embodiment, which does include a primary bead retention ridge or hump 132, the annular bead seat 133 extends longitudinally away from the flange 128 in a radially inwardly tapered fashion until the surface of the rim starts curving radially outwardly to form the primary bead retention ridge or hump 132. The point at which the radial outer surface of the rim 102 starts transitioning radially outwardly to form the primary bead retention ridge or hump 132 is defined as the inflection point 690. Although illustrated as a single point in this cross-sectional view, the inflection point 690 desirably comprises a circular shape about the circumference of the rim. The inflection point 690 may be used to define various dimensions, as discussed above with reference to FIG. 3B, and as discussed below with reference to FIG. 6.

The primary bead retention ridge or hump 132 may comprise a radial height labeled as dimension 691 in FIG. 6. As discussed above, dimension 691 is the radial height from inflection point 690 to the radial outermost point of the primary bead retention ridge or hump 132. It should be noted that the primary bead retention hump or ridge 132 may not necessarily need to extend radially outward further than every portion of the bead seat 133. Rather, the primary bead retention ridge or hump 132 desirably extends radially outward further than at least a portion of the annular bead seat 133, such as at least the tapered inward portion of the bead seat 133 that is positioned closest to the primary bead retention hump or ridge 132. This can be an important distinction, because the shape of the tire bead may comprise a tapered shape and/or may conform to the tapered shape of the annular bead seat 133, which may mean that in practice at least a portion of the radial inner surface of the tire bead is positioned radially outward further than the primary bead retention ridge or hump 132. As long as at least a portion of the tire bead's radial inner surface is positioned radially inward of the primary bead retention hump or ridge 132, however, the primary bead retention hump or ridge 132 can perform its function of at least partially resisting movement of the tire bead longitudinally away from the flange 128.

With continued reference to FIG. 6, it can be seen that the receptacle 650 extends through the wall of the rim 102 from a hole 685 on the ambient pressure side of the rim 102, to a hole 687 through the pressurized side of the rim 102. Desirably, no portion of the interior hole 687 extends into the annular bead seat 133. Stated another way, desirably, the hole 687 is positioned completely behind the inflection point 690, or at least does not have any portion positioned in front of the inflection point 690. Some embodiments may have at least a portion of the hole 687 positioned in front of the inflection point 690. It can be desirable to keep the entire hole 687 behind inflection point 690, however, because it can be desirable to keep the post 330 of the secondary retention member 106 spaced apart from the bead of the tire during normal on-road usage.

FIG. 6 further illustrates that the secondary bead retention member receptacles 650 are tilted back from the vertical plane defined by flange 128 by angle 634. Similar to the discussion above of angle 334 shown in FIG. 3B, angle 634 may be approximately 20°, but may also take any of the other angles or ranges discussed above with respect to angle 334. One benefit of the structure shown in FIG. 6 (and/or in FIGS. 11 and 16 discussed below) is that an existing wheel rim, such as a rim that is already approved under appropriate regulations for on-road use, may be modified by adding receptacles 650 (such as by drilling, milling, tapping, and/or the like) to convert the rim into a rim that includes the secondary bead retention features disclosed herein.

Various embodiments disclosed herein can utilize various retention features to selectively retain the secondary bead retention members in an installed position with respect to the rim. In the embodiment of FIG. 6, retention feature 637 is represented by a threaded region, which is configured to receive mating retention feature 336 (also represented as a threaded region). As described below with reference to FIG. 24C, another example of a retention feature 2437 is represented by a groove for receiving a another retention feature such as a snap ring, clip, retaining ring, e-clip, circlip and/or the like. In various embodiments, the retention features 637, 2437, and other retention features disclosed herein and illustrated in the drawings may be modified to accommodate various other methods of selectively retaining secondary bead retention members with respect to a rim. For example, the retention features may include differently sized threads and/or grooves, and the retention features may include one or more cavities for accommodating a ball lock mechanism, detent mechanism, and/or the like.

Example Alternative Rim

Figure 17:
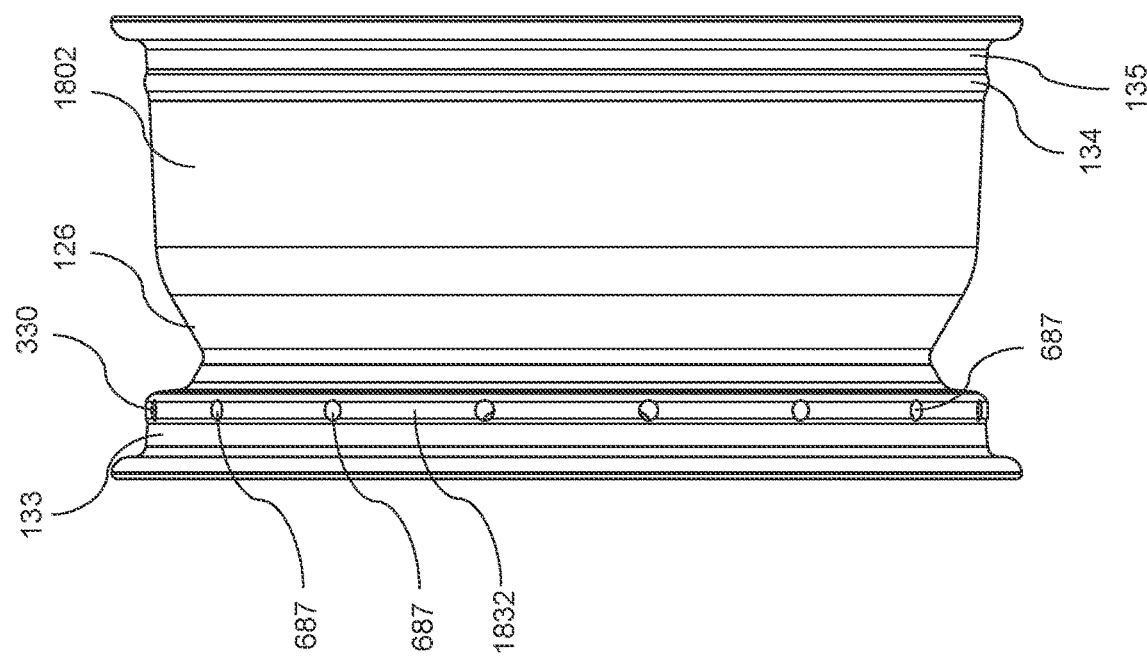
FIG. 17 is a side view of another embodiment of a rim for use in a wheel assembly having primary and secondary bead retention mechanisms.
Figure 18:
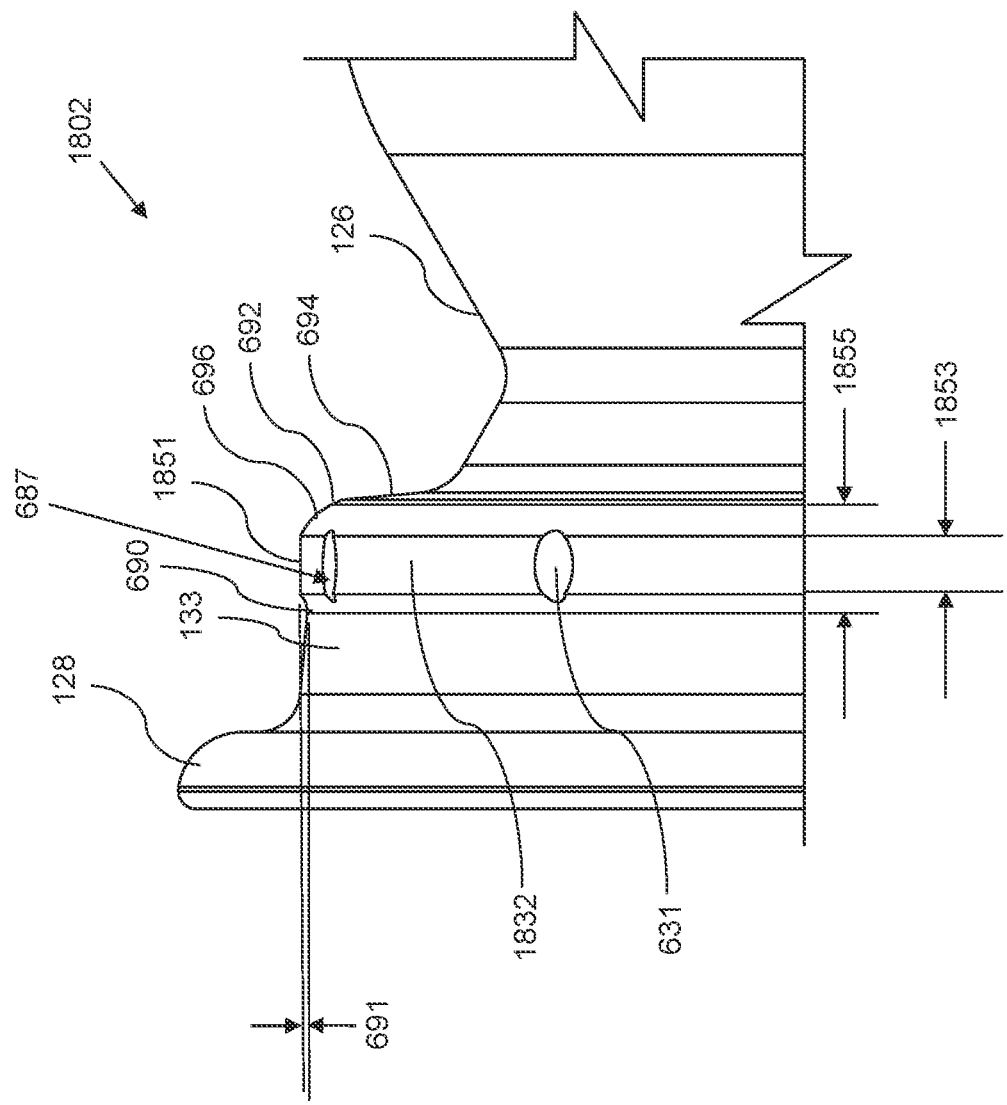
FIG. 18 is an enlarged side view of a portion of the rim of FIG. 17.
Figure 19:
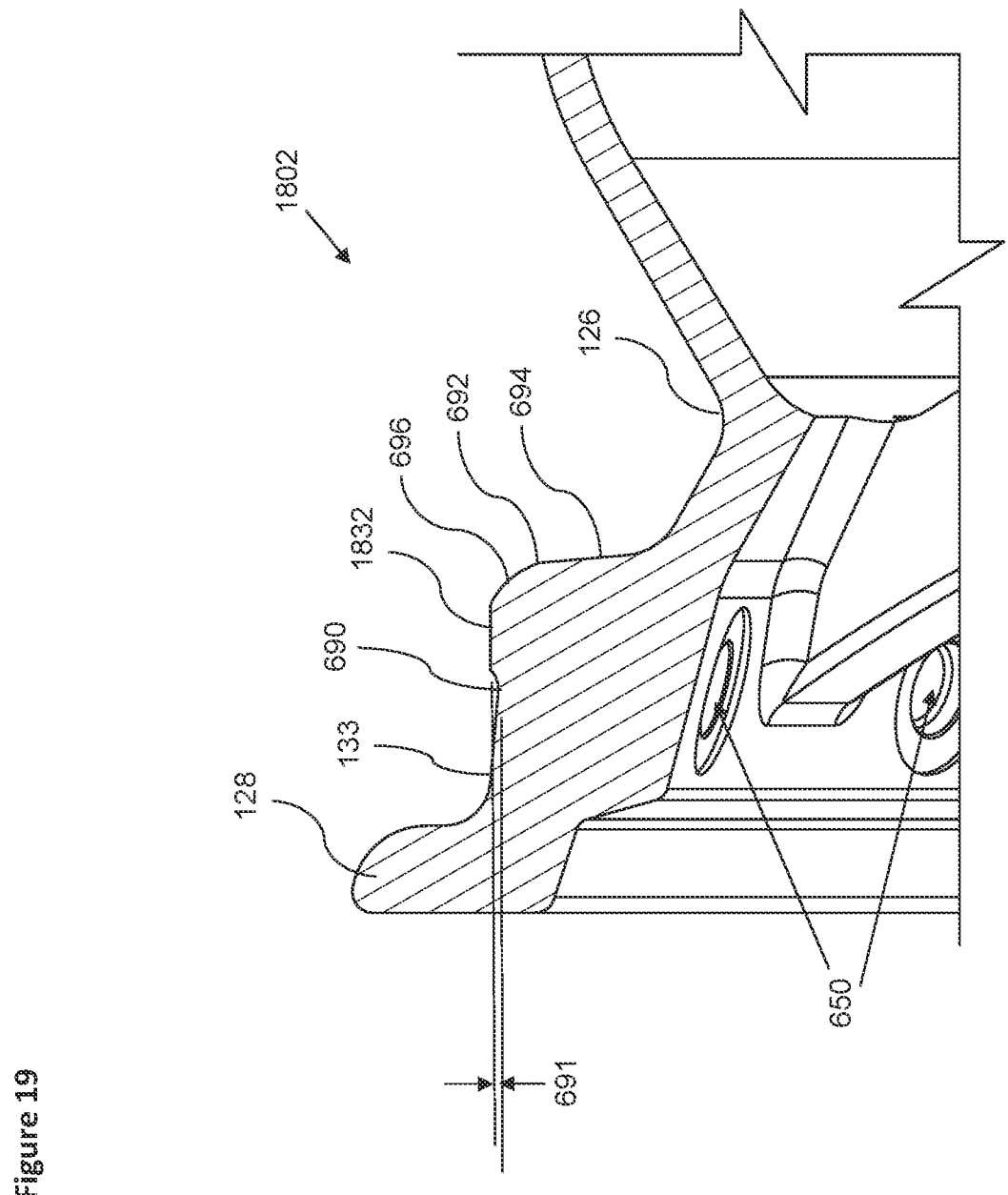
FIG. 19 is an enlarged cross-sectional view of the rim of FIG. 17.

FIGS. 17-19 illustrate an alternative embodiment of a rim 1802 that can be used in a wheel assembly similar to various wheel assemblies disclosed herein. For example, rim 1802 may be used in place of rim 102 of the wheel assembly 100 illustrated in FIGS. 1A and 1B. FIG. 17 is a side view of the rim 1802, FIG. 18 is an enlarged side view of an outboard portion of the rim 1802, and FIG. 19 is an enlarged cross-sectional view of an outboard portion of the rim 1802. Similar reference numbers are used to refer to similar features, such as similar features of the rim 102 described above. Any features of the rim 1802 that are similar to features of the rim 102 may take any of the dimensions, ratios, and the like discussed above with reference to the rim 102. For efficiency, the following description of rim 1802 focuses on differences between rim 1802 and rim 102, and any discussion above with respect to other features of rim 102 is incorporated by reference herein.

With reference to FIG. 17, the rim 1802 comprises similar features to the rim 102, including an annular inboard bead seat 135, an annular inboard primary bead retention ridge or hump 134, an annular outboard bead seat 133, and a drop center 126. The rim 1802 further comprises a plurality of secondary bead retention member receptacles 650 (see FIG. 19), which may be sized, configured, and positioned similarly to as in rim 102. The main difference between rim 1802 and rim 102 is that rim 1802 comprises a wider outboard primary bead retention ridge or hump 1832 than the outboard primary bead retention ridge or hump 132 of rim 102. One benefit of such a wider bead retention hump 1832 is that there may be more rim material positioned inboard of the holes 687 through which the secondary bead retention members protrude, which may be desirable from a strength standpoint when the secondary bead retention members may have significant inboard-directed forces applied against them in an off-road situation.

With reference to FIG. 18, the primary bead retention hump 1832 desirably comprises a flat or cylindrically shaped outer surface 1851 that comprises a width 1853. The rim 102 also comprises such a surface, but with a narrower width. In some embodiments, the surface 1851 is centered or approximately centered with respect to the openings 687 that protrude through the pressurized side of the rim 1802. The surface 1851 does not necessarily need to be centered with respect to the holes 687, however. Further, in some embodiments, the surface 1851 may not be cylindrical, and may alternatively be tapered, rounded, and/or the like.

In some embodiments, the holes 687 through which secondary bead retention members can protrude are desirably positioned longitudinally entirely within the primary bead retention hump 1832. The longitudinal extent of the primary bead retention hump 1832 may be defined as width 1855, which is the longitudinal distance between outboard inflection point 690 and inboard inflection point 692. The outboard inflection point 690, similar to as described above, is the point at which the rim surface transitions from the annular bead seat 133 to the primary bead retention hump or ridge 1832. Similarly, the inboard inflection point 692 is the point at which the rim surface transitions from the primary bead retention hump or ridge 1832 to the outboard wall 694 of the drop center 126. More specifically, in this embodiment, inboard inflection point 692 is between convex radiused area 696 of the primary bead retention hump or ridge 1832 and outboard wall 694 of the drop center 126. In some embodiments, width 1855 is at least 150% of the longitudinal width of the openings 687. In some embodiments, width 1855 is at least 120%, 130%, 140%, 160%, 170% or more of the longitudinal width of the openings 687. Further, in some embodiments, width 1853 is at least 80% of the longitudinal width of the openings 687. In some embodiments, width 1853 is at least 60%, 70%, 90%, or 100% of the longitudinal width of the openings 687.

Additional Example Wheel Assembly

FIGS. 7A through 11 illustrate another embodiment of a wheel assembly 700, and various components thereof. The wheel assembly 700 is similar in many respects to the wheel assembly 100 described above, and the same reference numbers are used to refer to the same or similar features. For efficiency, the following description focuses primarily on the differences from wheel assembly 100.

FIG. 7A illustrates an outboard view of the wheel assembly 700, and FIG. 7B illustrates a cross-sectional view thereof. The wheel assembly 700 includes a tire 104 mounted to a rim 702. The rim 702 is similar in many respects to the rim 102 of wheel assembly 100, except that the spokes 122 are arranged differently and a different secondary bead retention technique is utilized. Specifically, secondary bead retention members 706, discussed in more detail below, are used instead of secondary bead retention members 106.

One difference in the secondary bead retention members 706 is that secondary bead retention member 706 are configured to be normally engaged with and/or in contact with the tire bead 105, even when the tire is inflated to a normal on-road inflation pressure and there is no significant sideways load (such as force F shown in FIG. 7B) applied to the tire. Another difference is that the wheel assembly 700 comprises 12 secondary bead retention members 706 instead of the 16 secondary bead retention members 106 of wheel assembly 100. As discussed above, however, various numbers of secondary bead retention members may be used, and the techniques disclosed herein are not limited to these specific numbers. One reason fewer secondary bead retention members may be used in the embodiment of FIG. 7A, however, is that by keeping the secondary bead retention members 706 in contact with the tire bead 105 at all times, any sideways forces F may tend to be spread out or shared more among the secondary bead retention members 706 than in a situation where the secondary bead retention members are positioned to not always be in contact with the bead 105.

Figure 8A:
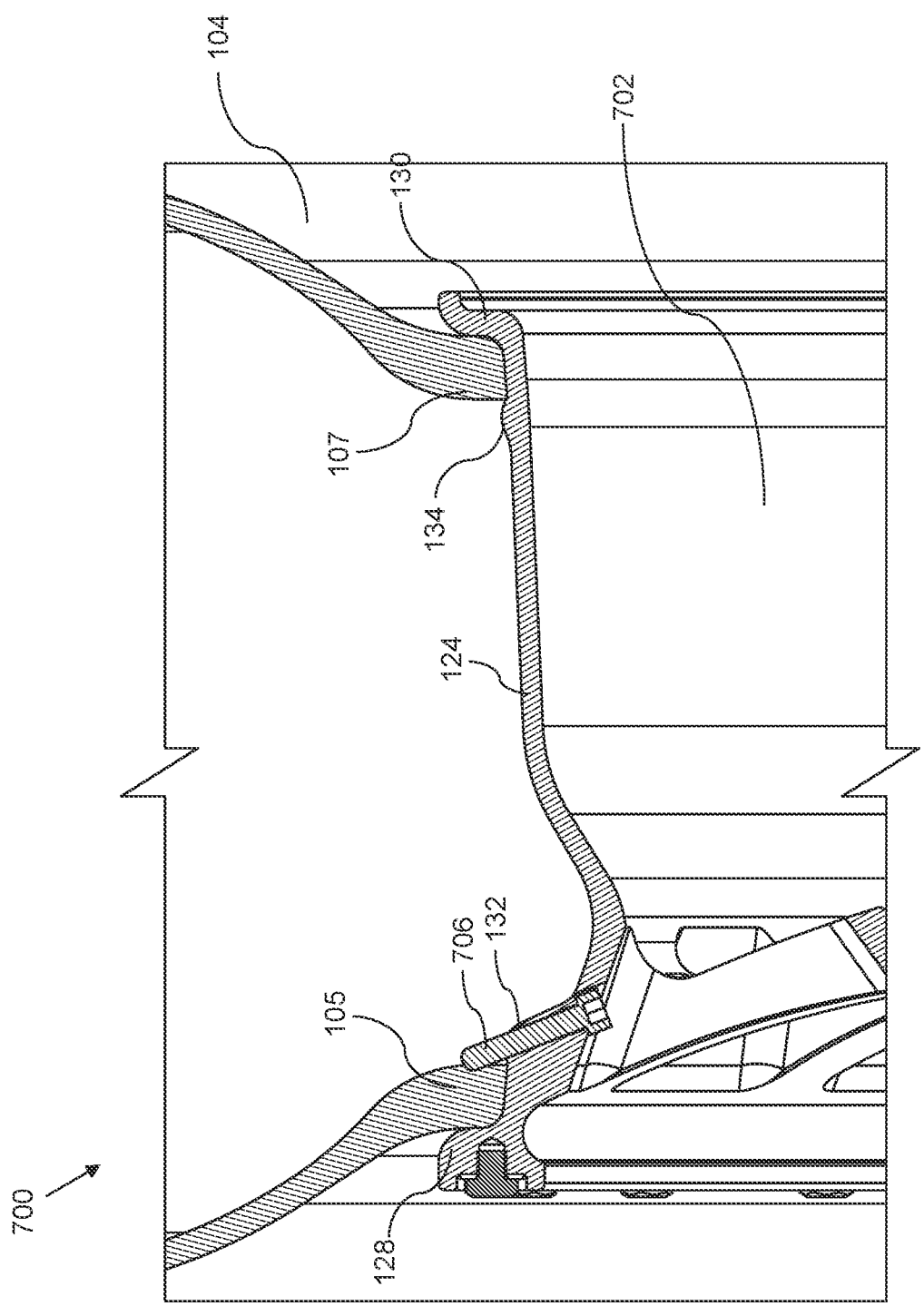
FIG. 8A is an enlarged cross-sectional view of the wheel assembly of FIG. 7A.

As noted above, although the bead retention members 706 are referred to as "secondary" bead retention members, this does not necessarily mean that every embodiment needs to have two or more types of mechanical bead retention techniques used. For example, with reference to FIG. 8A, which is an enlarged cross-sectional view of the wheel assembly 700, this rim 702 still comprises a primary bead retention hump or ridge 132, like the rim 102 discussed above. However, some embodiments may not include the primary bead retention ridge or hump 132, and the "secondary" bead retention members 706 may be the only mechanical feature used to maintain the bead 105 in position. Further, in an embodiment as shown in FIG. 8A that does include the primary bead retention ridge or hump 132, that primary bead retention ridge or hump may only be used to retain the bead 105 in instances when the tire has not yet been pressurized and the secondary bead retention members 706 have not yet been installed. Stated another way, the primary bead retention ridge or hump 132 may be utilized as a temporary bead retention technique when installing a tire, with the secondary bead retention members 706 performing all or most of any mechanical bead retention function once installed.

Figure 8B:
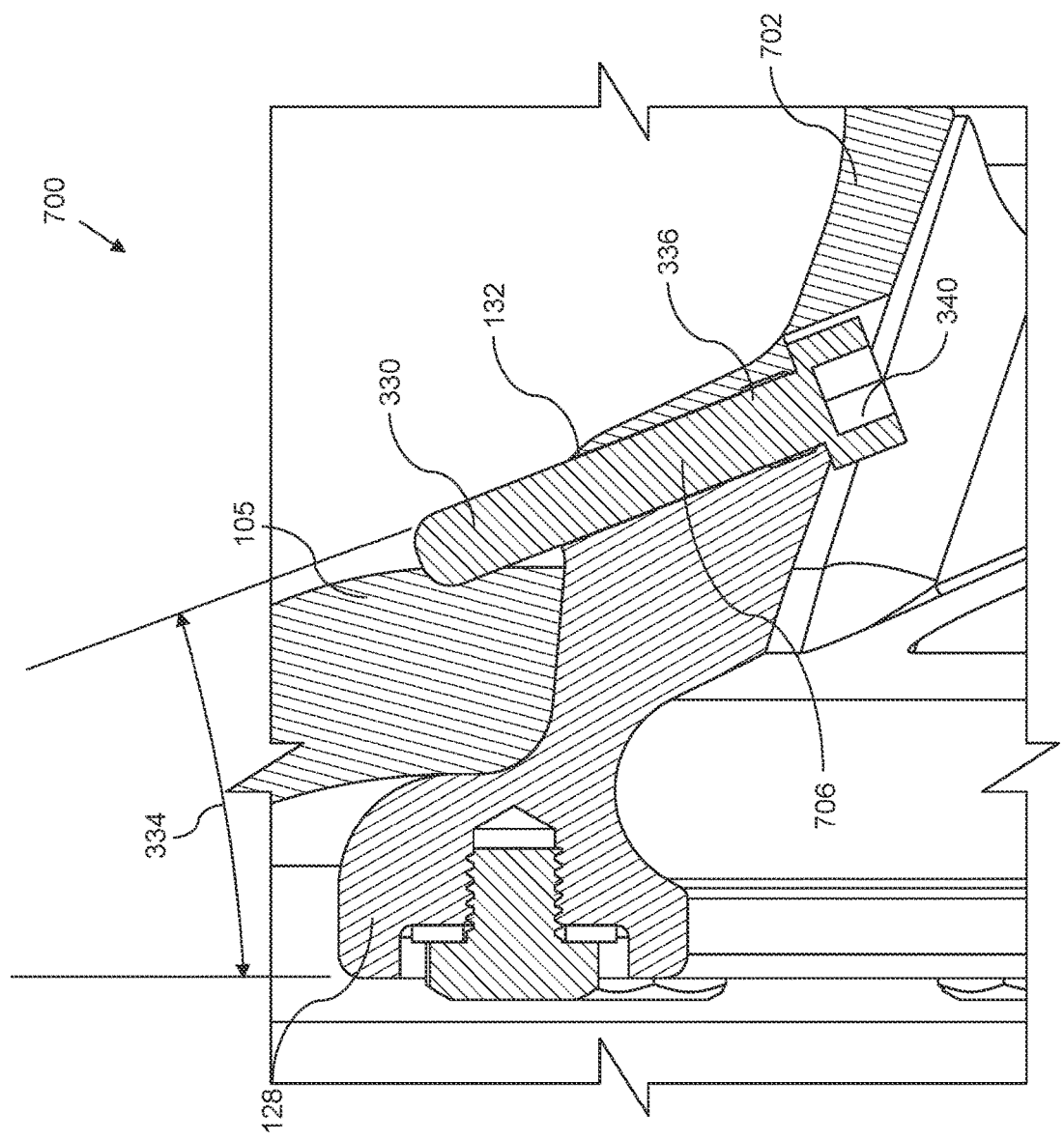
FIG. 8B is a further enlarged cross-sectional view of the wheel assembly of FIG. 7A.

FIG. 8B is a further enlarged cross-sectional view of the outboard bead portion of the wheel assembly 700. This view illustrates that the secondary bead retention members 706, comprise a head 340, threaded region 336, and smooth shaft or post 330, similarly to the secondary bead retention members 106 described above. One difference in the head 340 design is that the head 340 of FIG. 8B is a cap head comprising internal features configured to work with a hex key instead of external features configured to work with a wrench or socket.

Another difference shown in FIG. 8B is that angle 334 is now tilted toward the tire bead 105 and the vertical plane defined by flange 128 instead of away from the tire bead 105 and vertical plane. This can be desirable, for example, to enable the distal end of the protruding shaft 330 to engage an inner surface of the tire bead 105. Although the cross-sectional view of FIG. 8B illustrates the distal end of the protruding shaft 330 intersecting a portion of the tire bead 105, in reality the tire bead 105 desirably comprises a compressible material, such as rubber, and would be compressed such that it conforms to, or at least partially conforms to, the shape of the distal end of the shaft 330. In this embodiment, the angle 334 is desirably approximately 20°, however, other angles may be used, such as, for example, an angle within a range of 5° to 35°, 10° to 30°, 15° to 25°, and/or the like.

The embodiment of FIG. 8B that compresses the tire bead 105 against the flange 128 with the shaft 330 can be desirable, for example, in order to more positively retain the bead 105 in longitudinal position against the flange 128, and also potentially to help resist relative rotation about the longitudinal axis of the tire bead 105 with respect to the flange 128. Contacting the tire bead 105 with the secondary retention member 706 may, however, not be desirable in many situations. For example, as discussed above with reference to the wheel assembly 100, it can be desirable to not have the posts 330 contact the tire bead 105 during normal use when a large sideways force has not been applied to the tire. This can be desirable, for example, to avoid potential damage to the tire during normal use. Further, contacting the bead of the tire 104 during normal on-road use may not be acceptable under certain regulations, and thus may in some cases be limited to only off-road use and not able to be used with a vehicle that is intended to be used both on-road and off-road.

In some embodiments, a shorter set of secondary retention members 706 may also be provided, such that a user can swap the secondary retention members 706 of FIG. 8B out with shorter retention members that do not contact the tire bead 105 in normal use. The shorter retention members may act like the plugs 506 of FIG. 5D, in that they are configured to not extend radially beyond the primary bead retention ridge or hump 132. The shorter retention members may alternatively act more like the retention members 106 of FIG. 3B, in that they still extend radially beyond the primary bead retention ridge or hump 132, but without contacting the tire bead 105 during normal use.

Although not shown in FIG. 8B, the rim 702 and secondary retention member 706 may include a sealing gland 338 similar to as shown in FIG. 3B to accommodate an elastomer O-ring seal or other seal in order to create an airtight seal between the rim 702 and secondary retention member 706. In an alternative embodiment, the secondary retention members 706 may be configured such that they can form an airtight seal against the rim 702 even when they are not screwed all the way in. For example, the rim 702 may comprise a cylindrical groove extending along the axis of rotation of the threaded region 336 that enables one or more O-rings coupled to the secondary retention member 706 to move axially within the groove and seal in various locations. Such an embodiment may be desirable, for example, to enable a user to drive the secondary retention members 706 all the way in to contact the tire bead when going on an off-road excursion, but to back off the secondary retention members 706 such that they do not contact the tire bead when in typical on-road situations.

Figure 9:
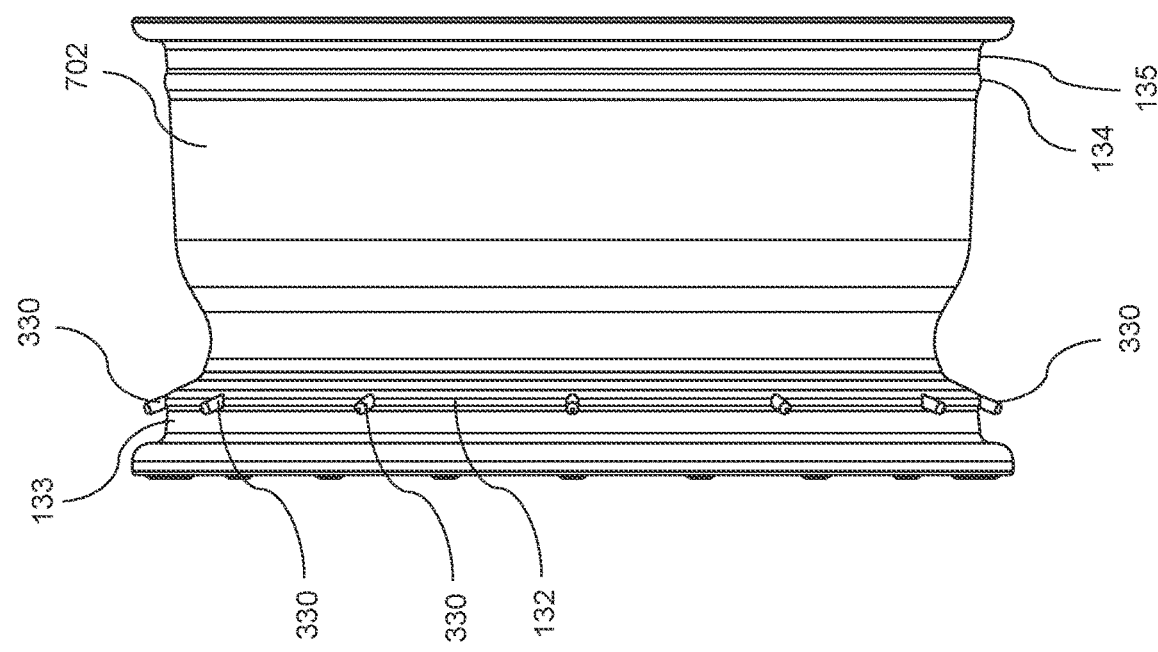
FIG. 9 is a side view of the rim and bead retention mechanisms of the wheel assembly of FIG. 7A.

FIG. 9 illustrates an exterior view of the rim 702 having seven of the shafts 330 of secondary retention members 706 protruding therethrough. Specifically, the shafts 330 are protruding through the primary bead retention hump or ridge 132.

Figure 10B:
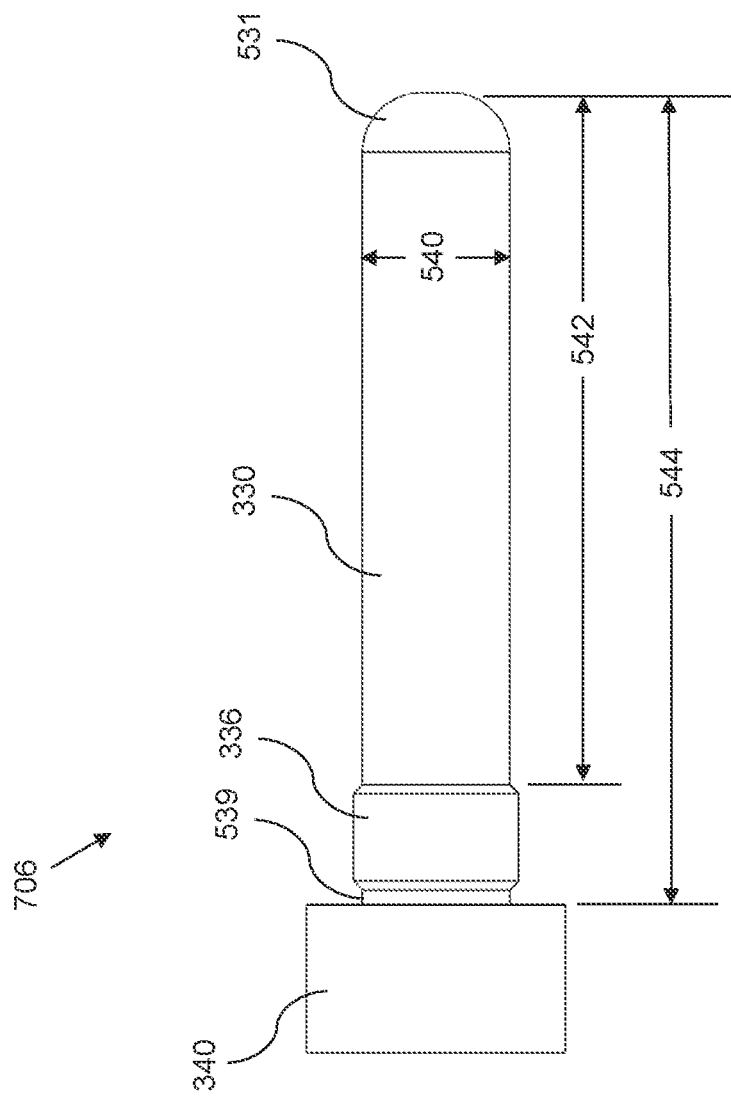
FIG. 10B is a side view of the secondary bead retention member of FIG. 10A.
Figure 10A:
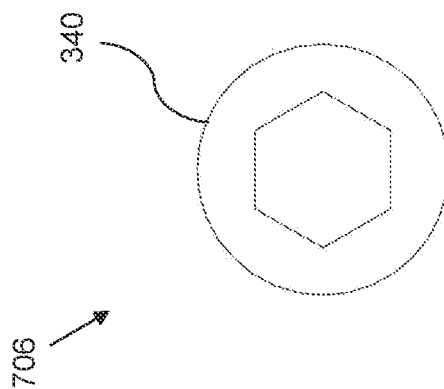
FIG. 10A is an end view of a secondary bead retention member of the wheel assembly of FIG. 7A.

FIGS. 10A and 10B illustrate end and side views, respectively, of the secondary bead retention member 706. Similar to the secondary bead retention member 106, the secondary bead retention member 706 comprises a head 340, threaded region 336, and smooth pin, post, or shaft 330. Further, the shaft 330 comprises a rounded and/or blunt distal end 531. In this embodiment, the diameter 540 of the shaft 330 is somewhat smaller than the diameter 540 of secondary retention member 106, although the diameter may be the same or larger in some embodiments. One reason the diameter 540 of FIG. 10B may be able to be smaller than the diameter 540 of FIG. 5B is that more of the sideways load introduced on the tire by force F of FIG. 7B may be borne by a compression load into shaft 330 as opposed to a tension load, which may not require as much cross-sectional area of the post 330.

With continued reference to FIG. 10B, the lengths 542 and 544 are desirably longer than those lengths in FIG. 5B. This may be desirable, for example, because the angle of secondary retention members 706 may require the opening in the rim into which the retention member 706 is inserted be positioned further radially inward than the openings for secondary retention members 106. The lengths 542 and 544 may be adjusted to specific applications, such as to control an amount of compression of the tire bead 105. Further, in some embodiments, the lengths 542 and 544 may be shortened such that the distal end of the shaft 330 does not contact the tire bead 105 during normal use. This could convert the wheel assembly 700 into a wheel assembly that operates more like the wheel assembly 100. However, as discussed above, it may still be more desirable to have the shaft 330 tilted away from the tire bead instead of toward the tire bead, and thus the wheel assembly 100 may be more desirable in some embodiments if it is desired for the shaft 330 to not contact the tire bead in normal operation.

Figure 11:
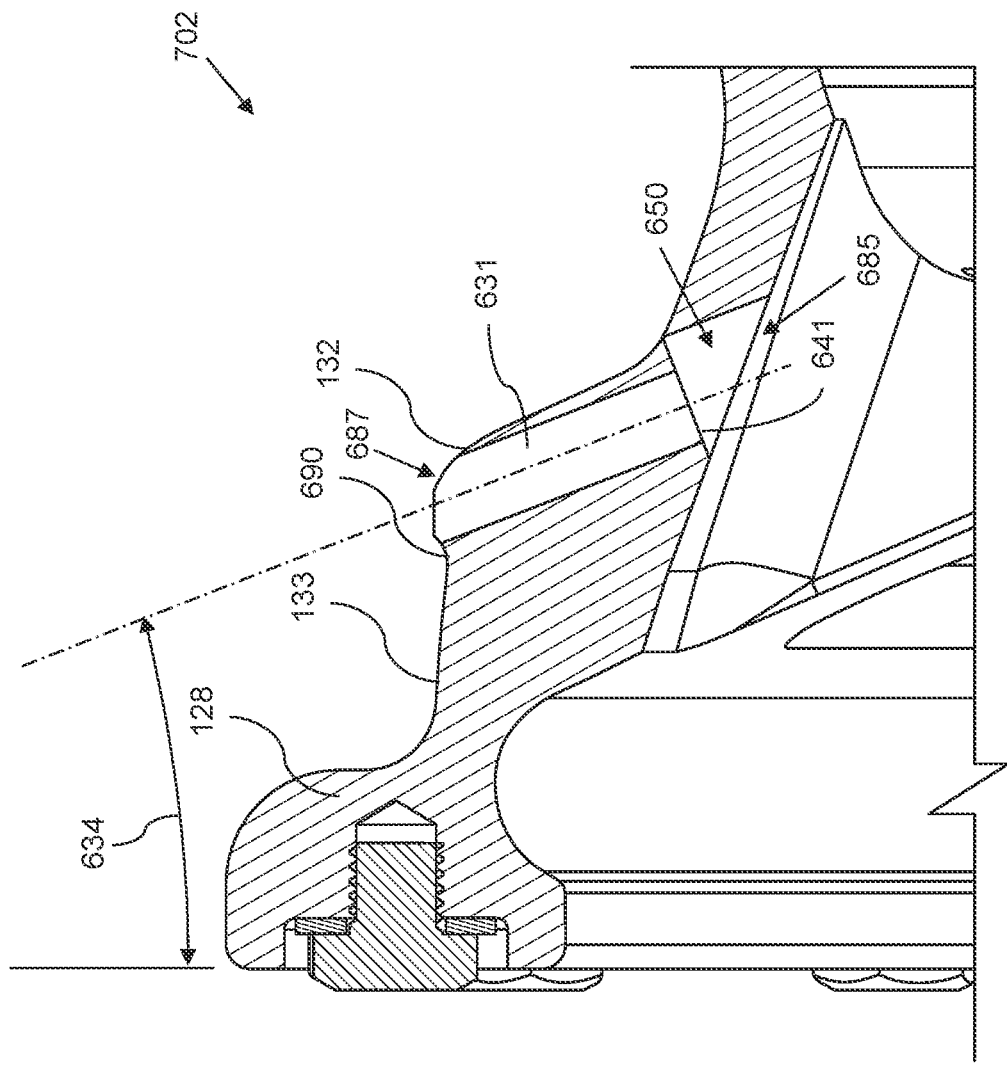
FIG. 11 is an enlarged cross-sectional view of the rim of the wheel assembly of FIG. 7A.

FIG. 11 illustrates an enlarged cross-sectional view of the outboard bead area of the rim 702. Similar to the embodiment of FIG. 6, the rim 702 comprises a plurality of secondary bead retention member receptacles 650 positioned about the circumference of the rim 702. One difference in FIG. 11, however, is that angle 634 is tilted toward the flange 128 instead of away from the flange 128, and corresponds to the angle 334 of FIG. 8B discussed above. Although not explicitly shown in FIG. 11, the receptacle 650 may further include a threaded region 637 and O-ring groove 638 as discussed above with reference to FIG. 6. Similarly to the embodiment of FIG. 6, the interior hole 687 through which the shaft 330 will pass is positioned behind inflection point 690. This is not necessarily required, however, and some embodiments may position the longitudinal outermost portion of hole 687 at the inflection point 690 or in front of the inflection point 690.

Additional Example Wheel Assembly

FIGS. 12A through 16 illustrate another embodiment of a wheel assembly 1200 comprising tire bead retention features. The wheel assembly 1200 is similar in many respects to the wheel assembly 100 discussed above, and the same reference numbers are used to refer to the same or similar features. For efficiency, the below discussion focuses primarily on differences between the wheel assembly 1200 and wheel assembly 100.

Figure 12B:
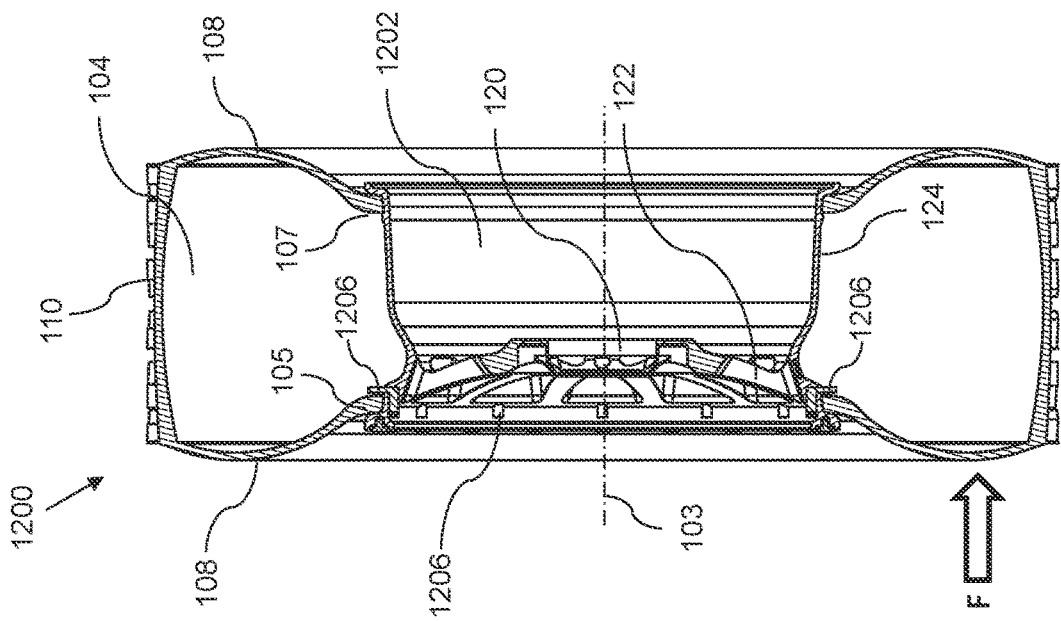
FIG. 12B is a cross-sectional view of the wheel assembly of FIG. 12A.
Figure 12A:
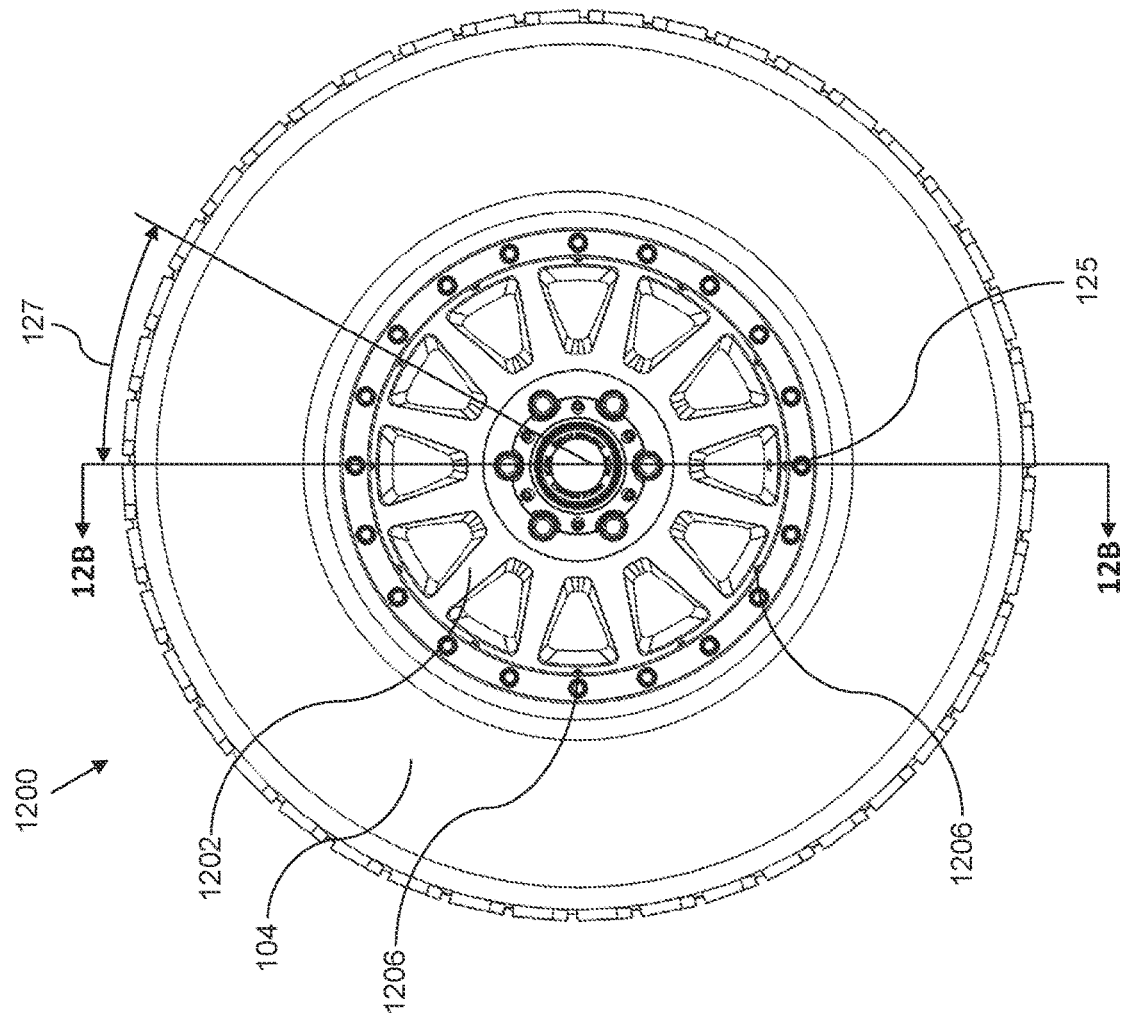
FIG. 12A is an outboard view of another embodiment of a wheel assembly having primary and secondary bead retention mechanisms.

FIG. 12A illustrates an outboard view of the wheel assembly 1200, and FIG. 12B illustrates a cross-sectional view thereof. The wheel assembly comprises a tire 104 mounted to a rim 1202. The rim 1202 is similar in many respects to the rim 102 of FIG. 1B, and also the rim 702 of FIG. 7B, except that different secondary bead retention members 1206 are utilized. This embodiment utilizes a similar layout as the embodiment of FIG. 7A, in that it comprises twelve secondary bead retention members 1206 evenly spaced about the circumference of the rim 1202 by angle 127 (which, in this embodiment is desirably 30 degrees, but may also take other values). Other embodiments may use more or fewer secondary bead retention members 1206, and/or the secondary bead retention members 1206 may be spaced apart differently.

Figure 13A:
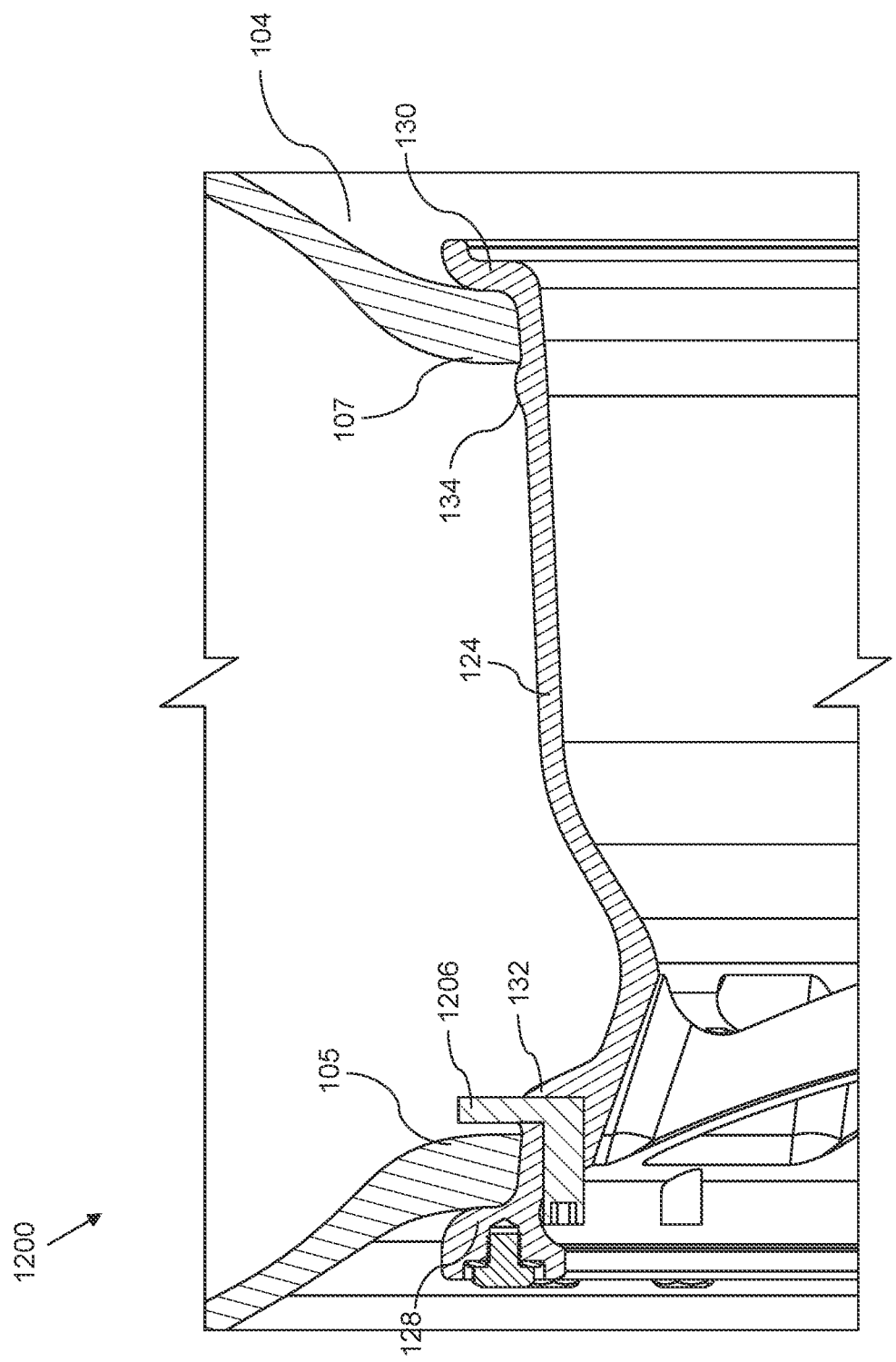
FIG. 13A is an enlarged cross-sectional view of the wheel assembly of FIG. 12A.
Figure 13B:
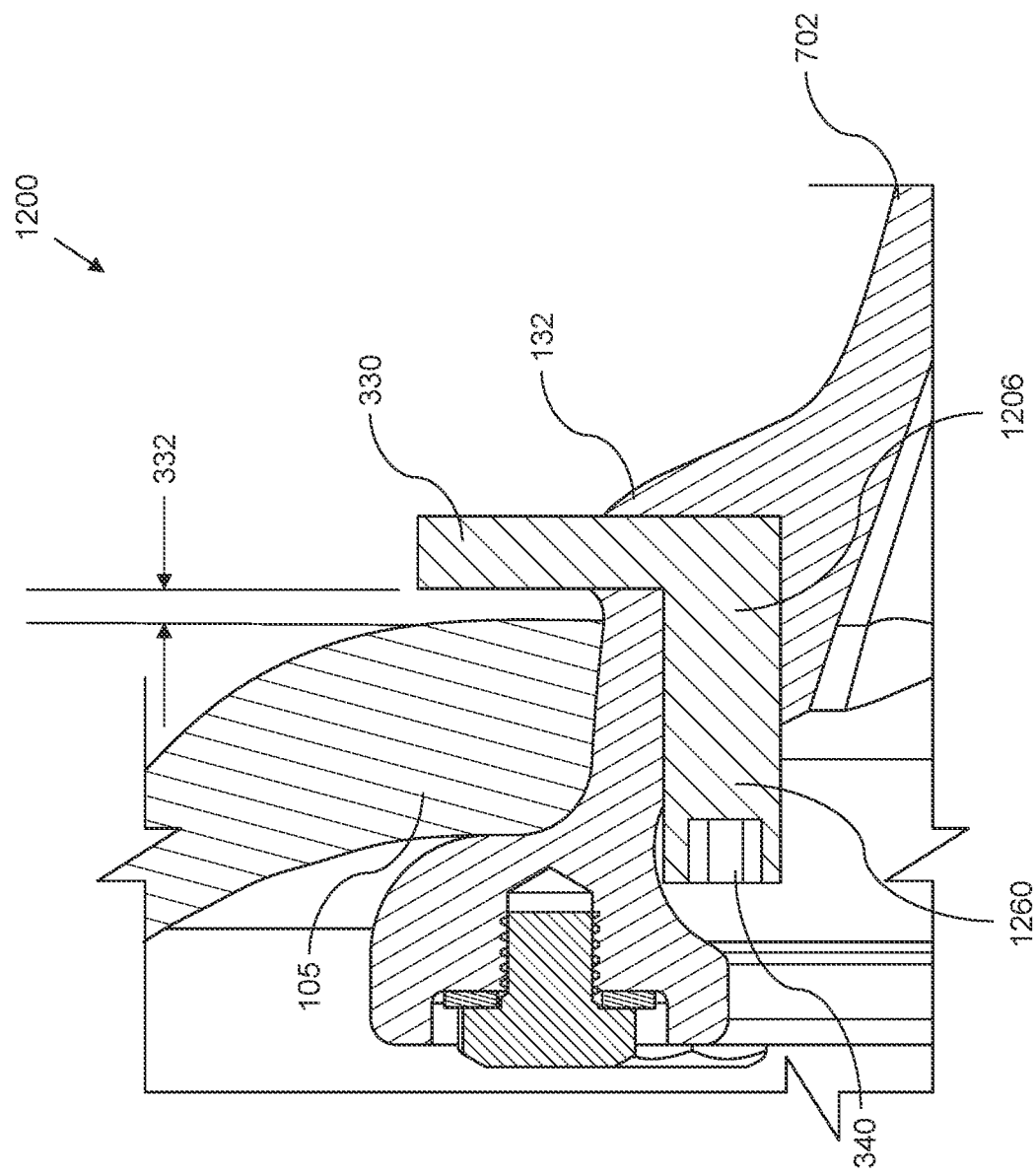
FIG. 13B is a further enlarged cross-sectional view of the wheel assembly of FIG. 13A.

FIGS. 13A and 13B illustrate enlarged cross-sectional views of the wheel assembly 1200. As can be seen in FIG. 13B, the secondary bead retention member 1206 comprises a post, shaft, or other protruding member 330 extending radially outward from the primary bead retention hump or ridge 132 and spaced apart from the tire bead 105 by dimension 332. Dimension 332 may take any of the values discussed above with respect to dimension 332 shown in FIG. 3B. Further, some embodiments may position post 330 such that it is tilted away from the tire bead 105, like the post 330 of FIG. 3B. In such a case, the positioning of the post 330 with respect to the tire bead 105 may take any of the dimensions shown in FIG. 3B and described above.

One difference from the embodiment shown in FIG. 3B, however, is that post 330 is not in line with the rotational axis of the head 340 of secondary retention member 1206. Instead, the secondary retention member 1206 comprises a cylindrical shaft 1260 extending from the head 340 and rotationally coupled to a cavity of the rim 702. The post 330 extends from a distal end of the shaft 1260 in a direction other than parallel to the rotational axis of shaft 1260 (in this case, perpendicular to the axis of rotation of shaft 1260, although other embodiments may protrude in a different direction). As further described below, this arrangement can allow the posts 330 to be rotated out of the way of the tire bead 105 to enable removal and installation of the tire without having to remove the secondary retention members 1206 from the rim 702.

Figure 14B:
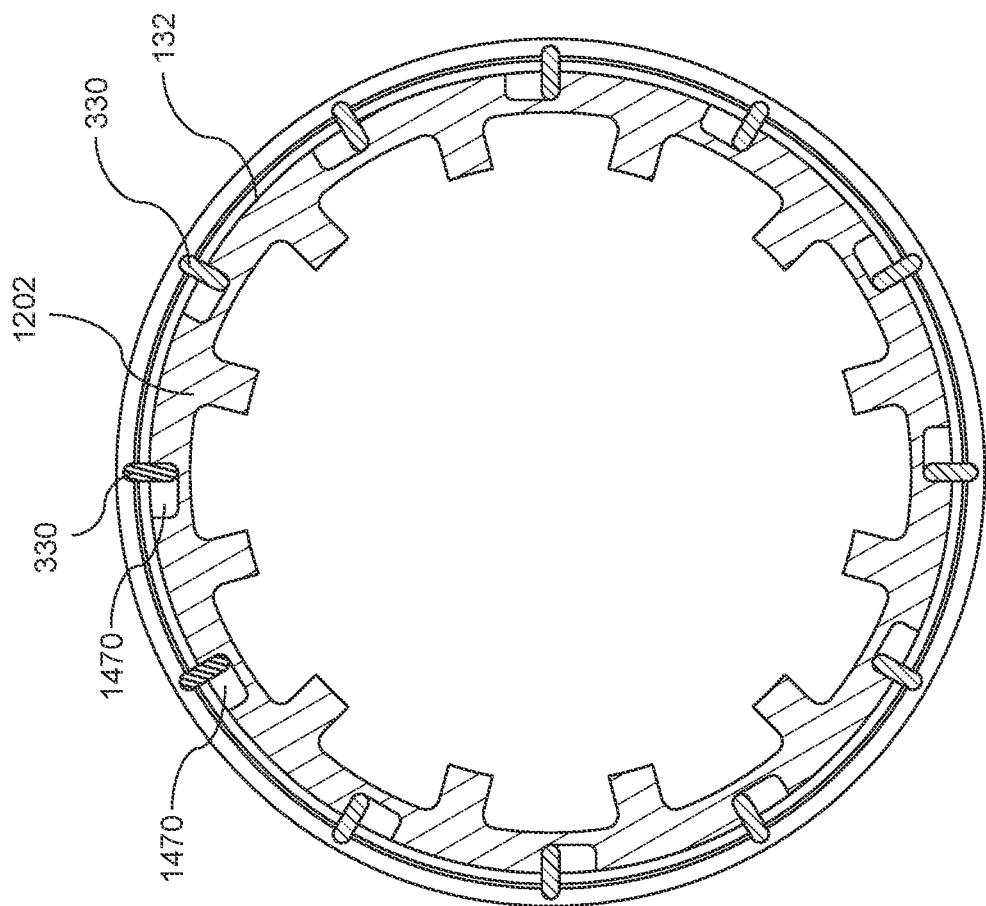
FIG. 14B is a cross-sectional view of the rim and bead retention mechanisms of the wheel assembly of FIG. 12A.
Figure 14A:
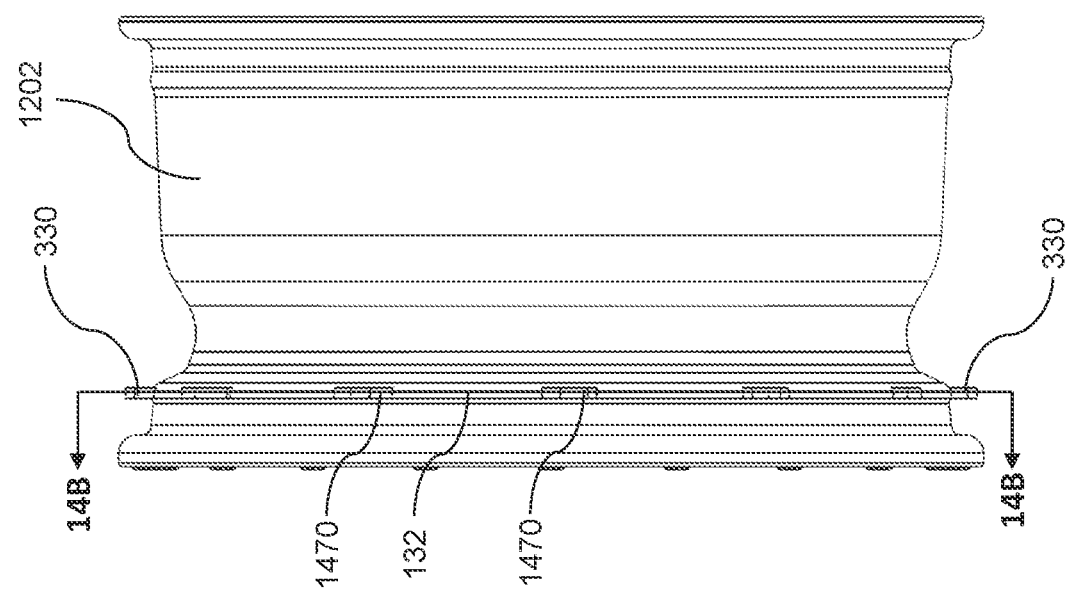
FIG. 14A is a side view of the rim and bead retention mechanisms of the wheel assembly of FIG. 12A.
Figure 14C:
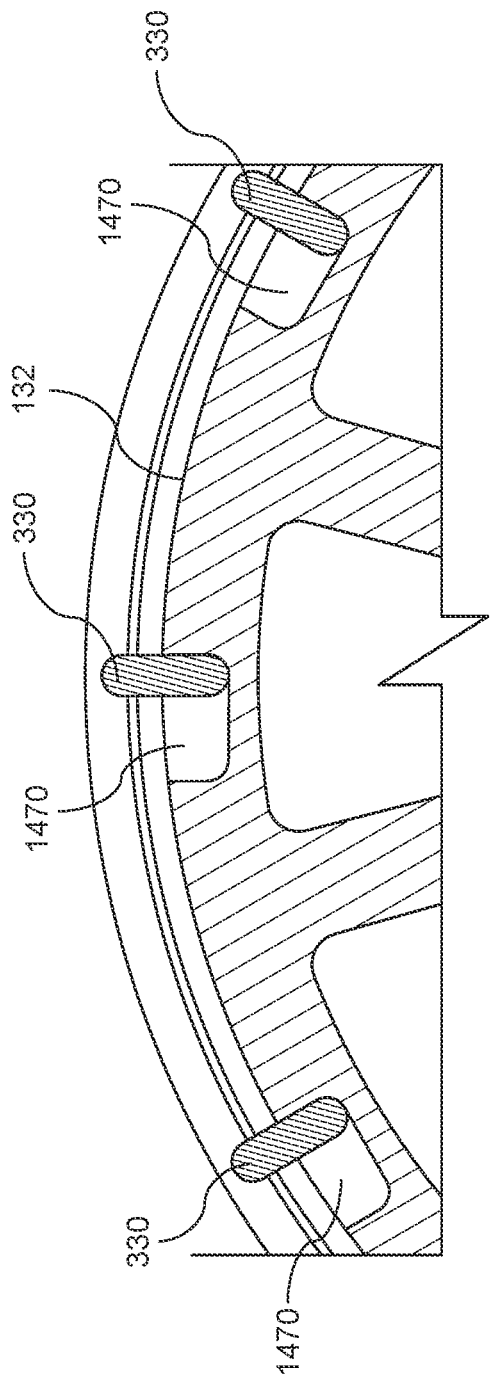
FIG. 14C is an enlarged view of the cross-sectional view of FIG. 14B.
Figure 14D:
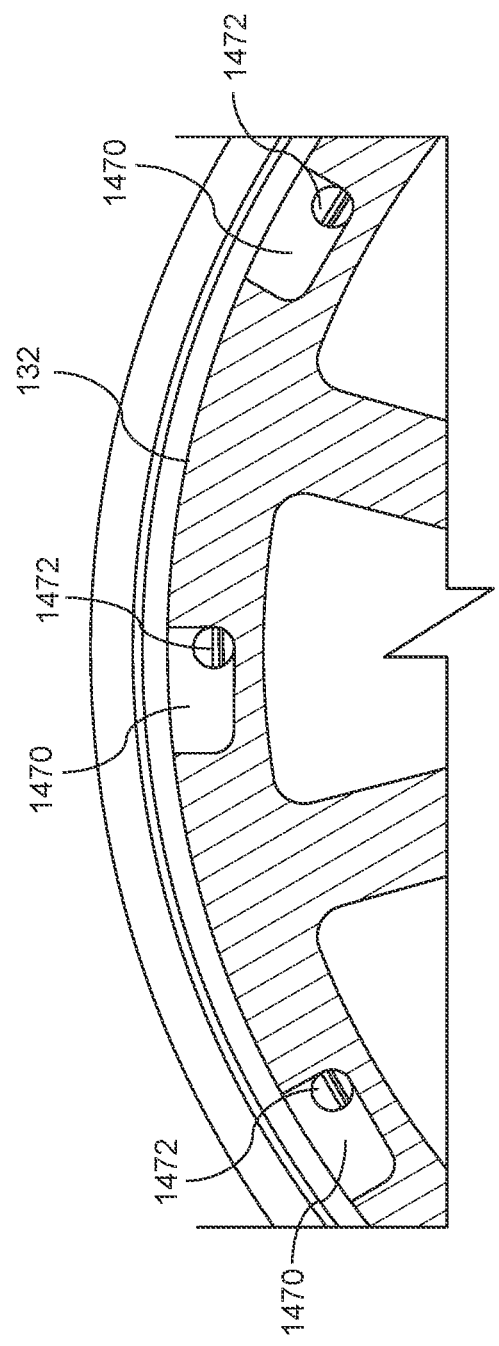
FIG. 14D is an enlarged view of the cross-sectional view of FIG. 14B, with the secondary bead retention members removed.

FIG. 14A illustrates an exterior view of the rim 1202 and seven of the posts 330 of the secondary retention members 1206 extending therefrom. FIG. 14B illustrates a cross-sectional view of the rim of FIG. 14A, and FIG. 14C illustrates an enlarged version of the cross-sectional view of FIG. 14B. Further, FIG. 14D illustrates a similar cross-sectional view to FIG. 14C, but with the secondary retention members 1206 removed.

As shown in FIGS. 14A through 14D, the rim 1202 desirably comprises a plurality of pockets 1470 for positioning therein of the protrusions or posts 330 of the secondary retention members 1206. FIGS. 14A through 14C illustrate the protrusions 330 in an expanded position (meaning the distal ends of the protrusions 330 extend radially outward beyond the primary bead retention ridge or hump 132). In use, the protrusions 330 can be rotated about an axis defined by holes 1472 shown in FIG. 14D, causing the distal ends of the protrusions 330 to rotate into the pockets 1470 to a contracted position, thus lowering the distal ends of the protrusions 330 below the radial outermost edge of the primary retention ridge or hump 132. In such a position, a tire can be removed from or installed on the rim similar to as if the secondary retention members 106 of wheel assembly 100 were removed from the rim. After a tire is installed onto the rim, the heads 340 of the secondary retention members 1206 can be used to rotate the distal ends of the posts 330 back into the expanded position shown in FIG. 14B.

FIGS. 15A and 15B illustrate end and side views, respectively, of the secondary bead retention members 1206. These figures illustrate the shaft 1260, an axis 1261 about which the shaft 1260 can rotate when installed in the rim 1202, and the shaft or protrusion 330 extending perpendicularly to the rotational axis 1261. In some embodiments, the shaft 1260 and/or the overall secondary bead retention member 1206 may be referred to as a rotatable pin, rotatable member, and/or the like.

Figure 16:
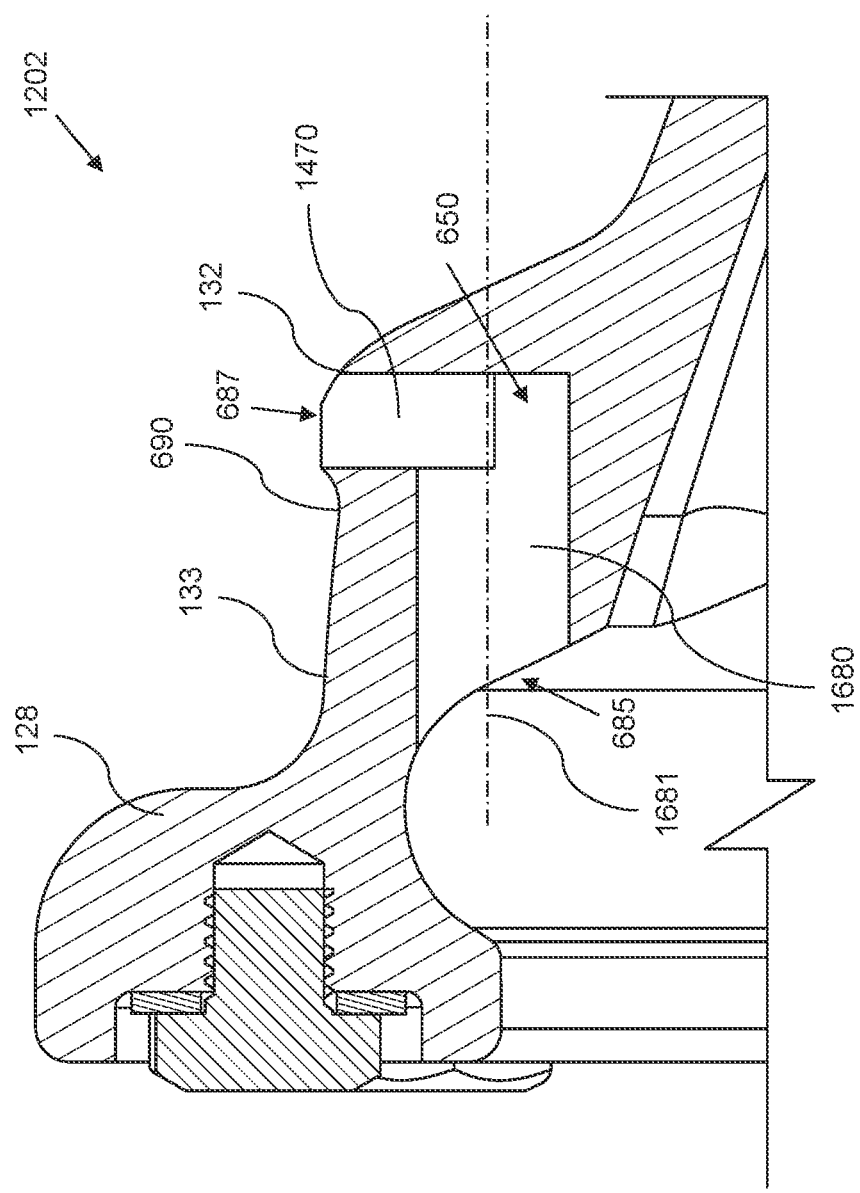
FIG. 16 is an enlarged cross-sectional view of the rim of the wheel assembly of FIG. 12A.

FIG. 16 illustrates an enlarged cross-sectional view of the outboard bead retention area of rim 1202. FIG. 16 illustrates axis 1681 defined by cylindrical surface 1680 (corresponding to hole 1472 of FIG. 14D) that can enable the secondary bead retention members 1206 to rotate about axis 1681 (which may desirably be coincident with axis 1261 of the secondary bead retention members 1206).

As with the embodiments shown in FIGS. 6 and 11, the embodiment of FIG. 16 also comprises a hole 685 through the ambient air pressure side of the rim 1202, and a hole 687 through the pressurized side of the rim 1202. One difference, however, is that the holes 685 and 687 of FIG. 16 are not in line with one another as they are in FIGS. 6 and 11. In this embodiment, the hole 687 is still desirably positioned behind the inflection point 690 between the annular bead seat 133 and primary bead retention hump or ridge 132, although the hole 687 may be positioned differently, similarly to as described above.

Although not shown in these figures, it may be desirable for the shaft 1260 shown in FIG. 15B to comprise one or more grooves for positioning therein of one or more sealing members, such as O-rings. The sealing members may be configured to seal against the internal surface 1680 shown in FIG. 16 in order to create and airtight seal between the secondary retention members 1206 and the rim 1202 regardless of the position that post 330 is in.

Additional Example Wheel Assembly

FIGS. 20A through 20D illustrate an additional embodiment of a wheel assembly 2000. The wheel assembly 2000 is similar in many respects to other wheel assemblies disclosed herein, including wheel assembly 100 of FIG. 1A, and the same or similar reference numbers are used to refer to the same or similar features. For efficiency, the present description of wheel assembly 2000 focuses primarily on differences from other wheel assemblies disclosed herein. Any features, dimensions, ratios, and/or the like discussed elsewhere in this description in association with other embodiments of wheel assemblies may also apply to the wheel assembly 2000, and/or the wheel assembly 2000 may be modified to include such elements.

One difference from the wheel assembly 100 is that the wheel assembly 2000 comprises secondary bead retention members on both the outboard side (secondary bead retention members 2006) and on the inboard side (secondary bead retention members 2106). Any of the features, dimensions, ratios, and/or the like discussed elsewhere in this description in association with secondary bead retention members positioned on the outboard side of a wheel may also apply to the inboard secondary bead retention members 2106 of wheel assembly 2000.

FIGS. 20A and 20C illustrate outboard and inboard views, respectively, of the wheel assembly 2000. FIGS. 20B and 20D illustrate cross-sectional views of the wheel assembly 2000, with the cross-section of FIG. 20B taken through the center of two outboard secondary bead retention members 2006, and the cross-section of FIG. 20D taken through the center of two inboard secondary bead retention members 2106. In some embodiments, the outboard and inboard secondary bead retention members may be the same in design and/or may utilize the same number of bead retention members at either side. It can be desirable, however, to have different designs for the outboard and inboard secondary bead retention members 2006, 2106 and/or to utilize a different number and/or distribution of inboard secondary bead retention members 2106 than outboard secondary bead retention members 2006. For example, the wheel assembly 2000 desirably comprises 16 outboard secondary bead retention members 2006 but only eight inboard secondary bead retention members 2106. Having fewer inboard secondary bead retention members 2106 may be desirable, for example, because the magnitudes of forces experienced by the tire 104 in an off-road situation may tend to be higher coming from the outboard side than the inboard side. Other numbers of inboard secondary bead retention members 2106 may be used, however, including less than, the same as, or more than the outboard secondary bead retention members 2006.

FIGS. 21A through 21D illustrate enlarged cross-sectional views showing more detail of the secondary bead retention members 2006, 2106 passing through the rim 2002. FIG. 21A is an enlarged cross-sectional view of FIG. 20B, and FIG. 21B illustrates the same enlarged cross-sectional view, but with one of the outboard secondary bead retention members 2006 hidden in order to show more detail of the receptacle 650 of the rim 2002. Likewise, FIG. 21C is an enlarged cross-sectional view of FIG. 20D, and FIG. 21D is a similar enlarged cross-sectional view, but with one of the inboard secondary bead retention members 2106 hidden in order to show detail of the receptacle 650 of the rim 2002. One difference in the design of the rim 2002 from the rim 102 of wheel assembly 100 is that the receptacles 650 of the rim 2002 desirably comprise a threaded region 637 that passes through the rim 2002 to the pressurized side of the rim 2002, instead of the receptacles 650 also including a smooth region 631 as shown in FIG. 6. Not including the smooth region 631 may, for example, make the rim 2002 more efficient to manufacture and/or have structural benefits.

FIGS. 21A and 21C also show that the designs of the outboard secondary bead retention members 2006 are in this embodiment different than the designs of the inboard secondary bead retention members 2106. For example, one difference is that the outboard secondary bead retention members 2006 are significantly longer than the inboard secondary bead retention members 2106. One reason for this is that the thickness of the rim 2002 at the points where each of these secondary bead retention members passes through is different. Desirably, the portion of the outboard secondary bead retention member 2006 and inboard secondary bead retention member 2106 that extends or protrudes into the pressurized region of the wheel from the rim 2002 comprises a similar or same shape and size. This is not required, however, and in some embodiments the portion that protrudes into the pressurized area of the wheel may be different in shape and/or size from the outboard side to the inboard side.

FIG. 22 is a side view of the rim 2002 showing a plurality of outboard secondary bead retention members 2006 and inboard secondary bead retention members 2106 protruding therethrough. Specifically, at least the smooth pin or post region 330 (see FIGS. 23B and 23D) is protruding from the rim 2002. FIG. 22 also shows how the outboard secondary bead retention members 2006 protrude through the outboard primary bead retention ridge or hump 132, and the inboard secondary bead retention members 2106 protrude through the inboard primary bead retention ridge or hump 134. The positioning of the inboard secondary bead retention members 2106 with respect to the inboard bead seat 135 and/or primary bead retention ridge or hump 134 may be similar to or the same as any of the descriptions given elsewhere in this disclosure with reference to the positioning of outboard secondary bead retention members with respect to the outboard bead seat 133 and/or primary bead retention ridge or hump 132.

Figure 23B:
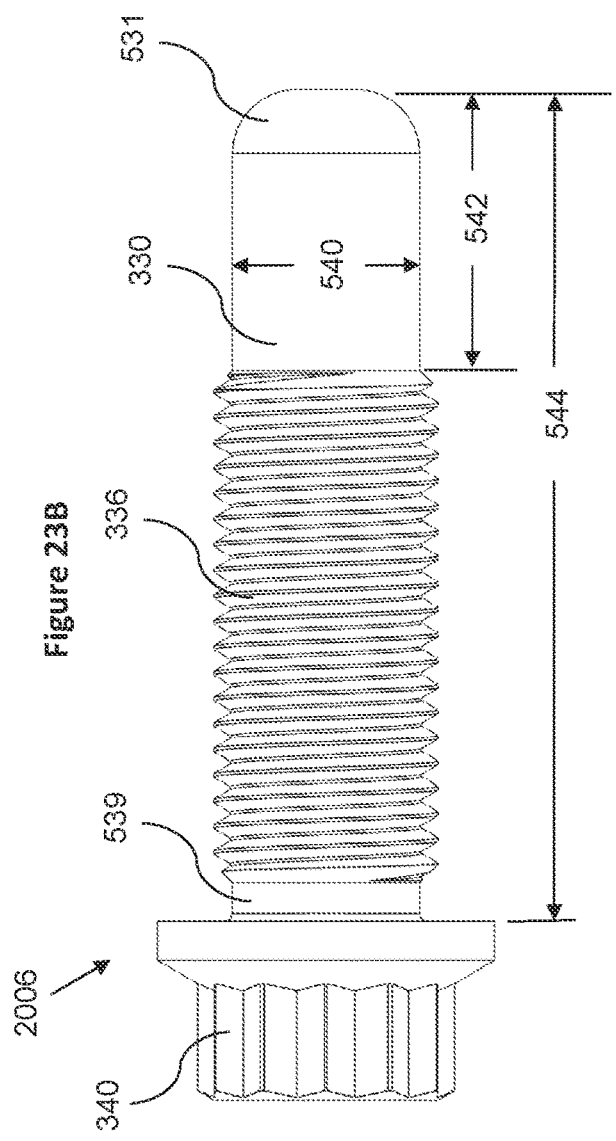
FIGS. 23A and 23B are end and side views, respectively, of an outboard secondary bead retention member of the wheel assembly of FIG. 20A.
Figure 23A:
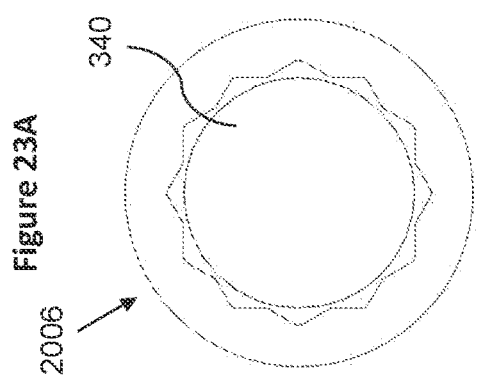
Figure 23D:
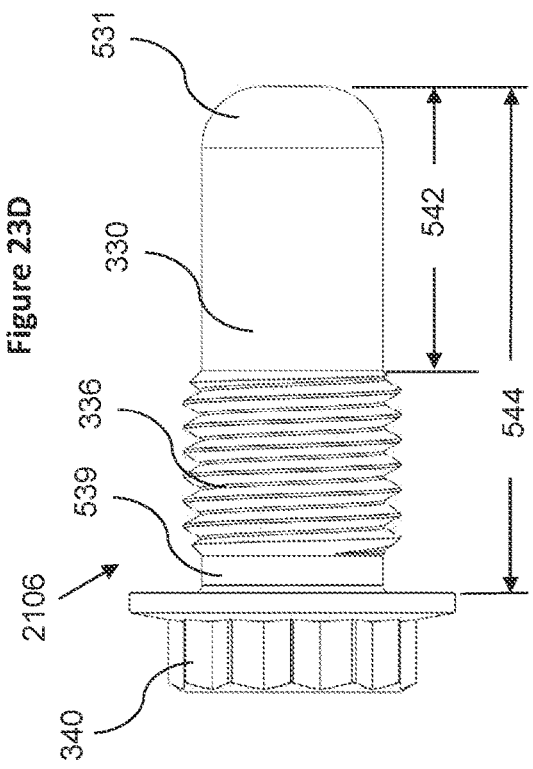
FIGS. 23C and 23D are end and side views, respectively, of an inboard secondary bead retention member of the wheel assembly of FIG. 20A.
Figure 23C:
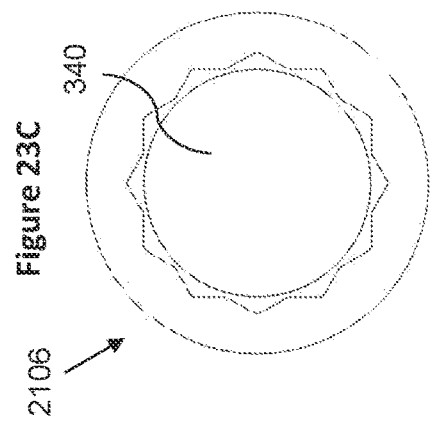

FIGS. 23A and 23B illustrate end and side views, respectively, of the outboard secondary bead retention member 2006. FIGS. 23C and 23D illustrate end and side views, respectively, of the inboard secondary bead retention member 2106. The designs of the secondary bead retention members 2006, 2106 are similar to that of the secondary bead retention members 106 shown in FIGS. 5A and 5B. One difference is that the head 340 of secondary bead retention members 2006 and 2106 comprises a 12 point bolt head instead of a hex bolt head. Other types of bolt heads or techniques for enabling removal and installation of the secondary bead retention members may also be used. Another difference is that the threaded region 336 of the outboard secondary bead retention member 2006 is longer than the threaded region 336 of the secondary bead retention member 106, corresponding to the rim 2002 having a threaded region 637 through to the pressurized side of the rim 2002 instead of having a smooth region 631 as shown in FIG. 6.

Additional Example Bead Retention Members

Figure 24A:
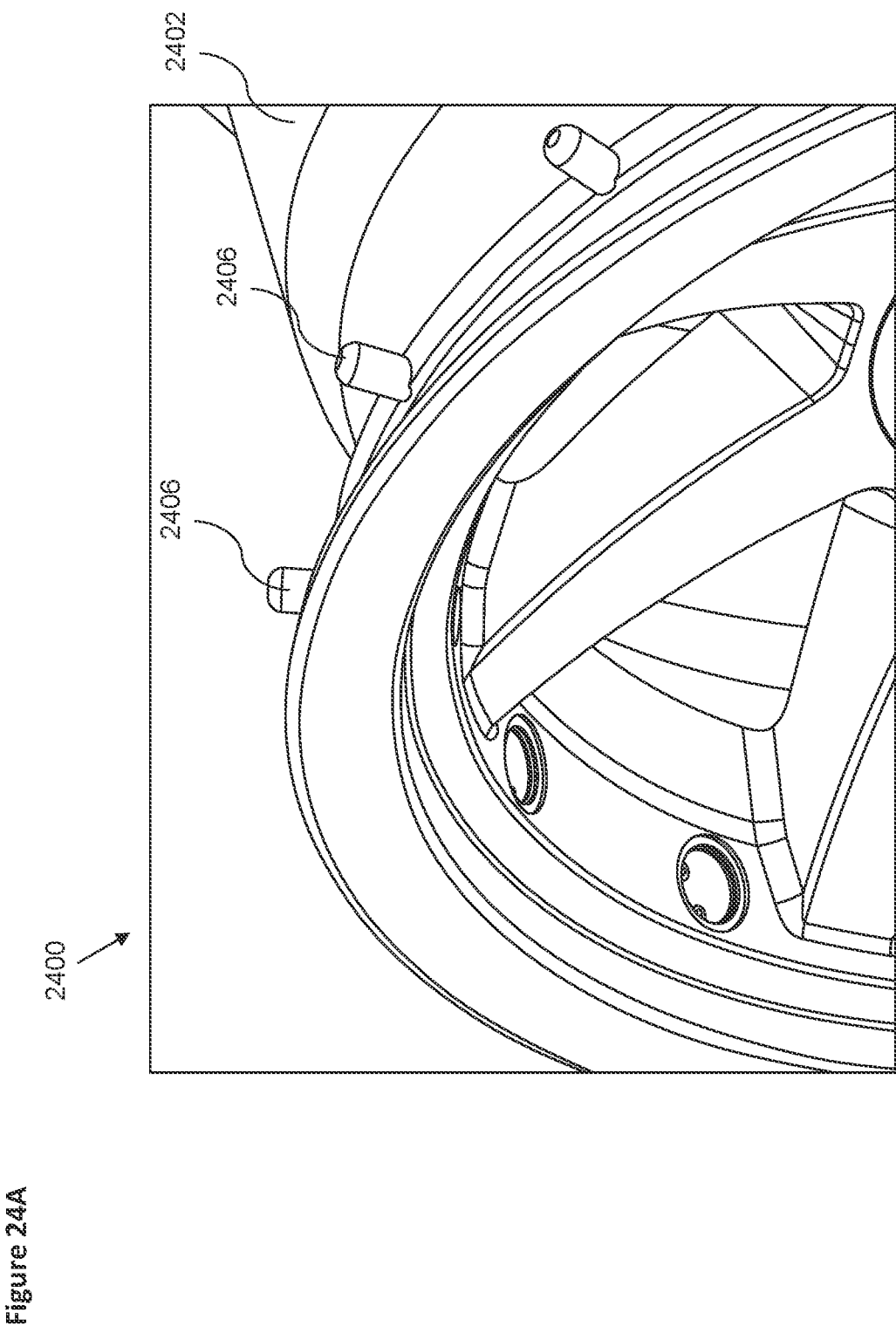
FIGS. 24A and 24B are detail perspective views of another embodiment of a wheel assembly having primary and secondary bead retention mechanisms, with the tire being hidden.
Figure 24B:
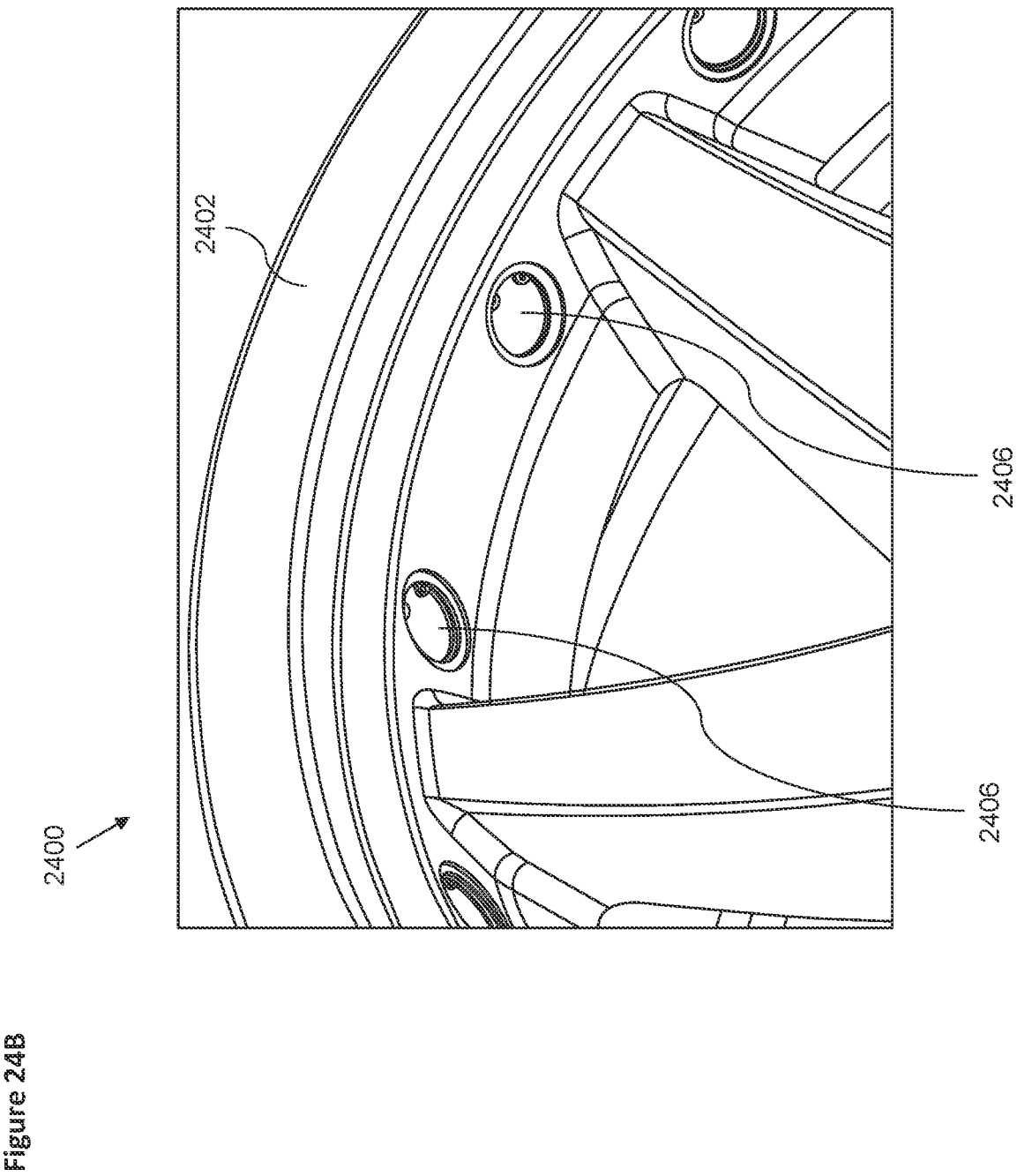
Figure 24C:
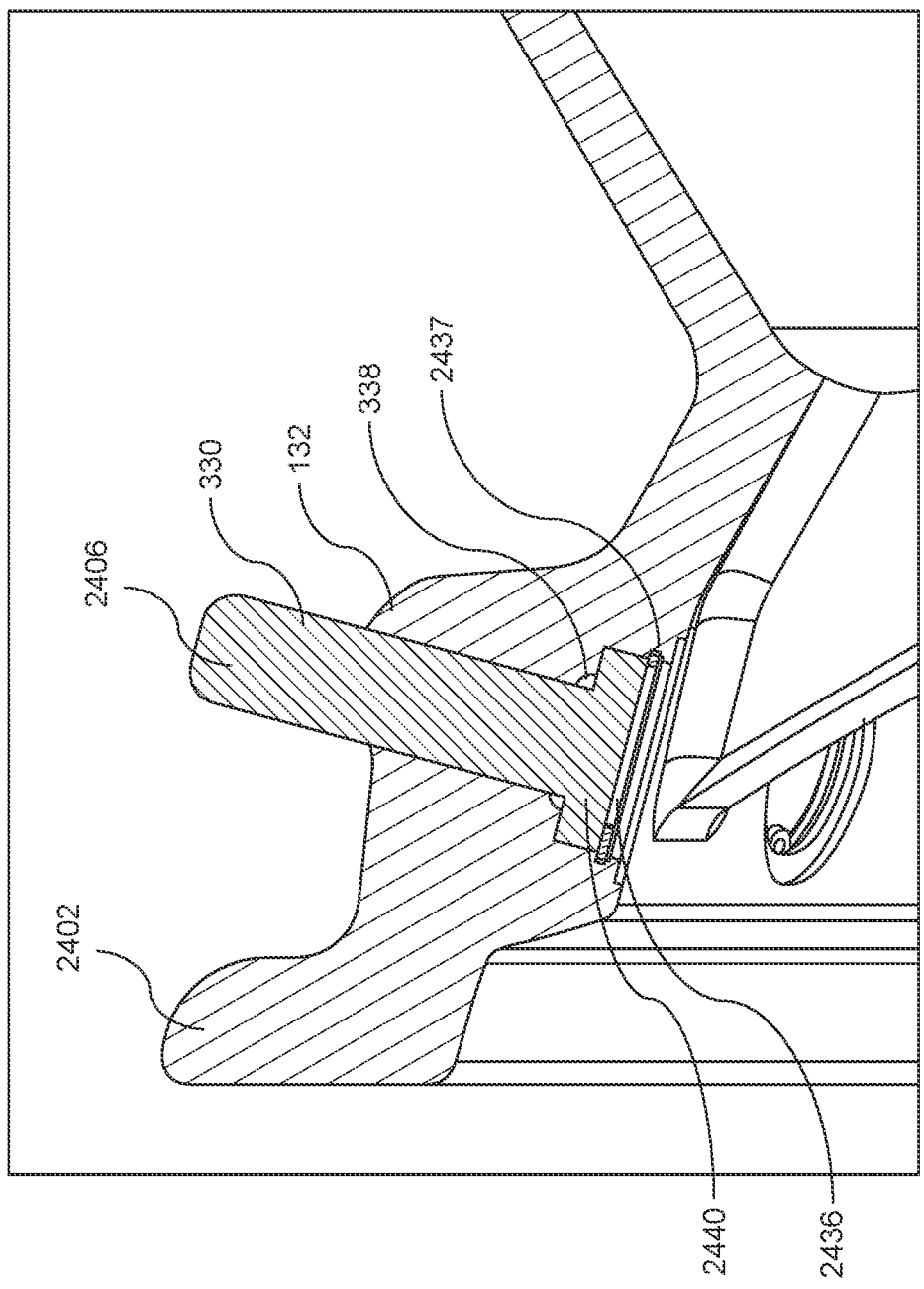
FIGS. 24C and 24D are perspective cross-sectional views of a portion of the wheel assembly of FIGS. 24A and 24B.
Figure 24D:
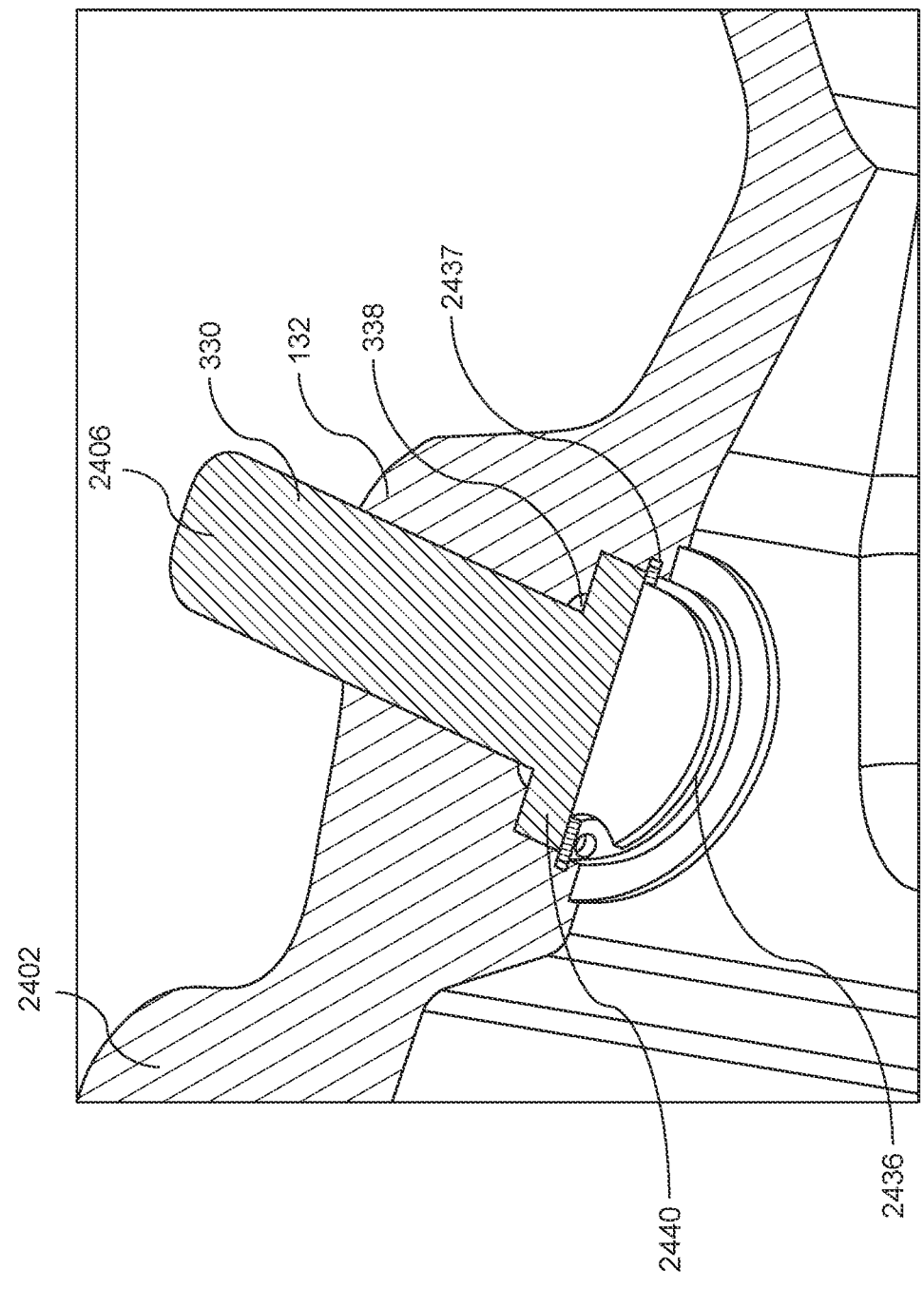

FIGS. 24A-24D illustrate another embodiment of a wheel assembly 2400 that includes a plurality of secondary bead retention members 2406, similar to other embodiments described elsewhere herein. FIGS. 24A and 24B illustrate enlarged perspective views of the wheel assembly 2400, which includes a rim 2402 and a plurality of secondary bead retention members 2406. For clarity, a tire is not shown in these figures, but a tire could be included, similar to various other embodiments disclosed herein. FIGS. 24C and 24D illustrate enlarged perspective cross-sectional views of the wheel assembly 2400, with the cross-section taken through the center of one of the secondary bead retention members 2406.

The wheel assembly 2400 is similar in many respects to various other embodiments disclosed herein, and the same or similar reference numbers are used to refer to the same or similar features. For clarity, the present description and figures focus on certain differences from other embodiments disclosed herein. Any features, dimensions, benefits, and/or the like discussed elsewhere herein with reference to other embodiments may also be used with the embodiment of FIGS. 24A-24D, and with modified versions thereof.

As discussed above, one benefit of various wheel assemblies disclosed herein is that a plurality of secondary bead retention members may be configured to be removable and/or movable with respect to a rim in order to more easily facilitate installation or removal of a tire. For example, at least a portion of the secondary bead retention members (for example, posts or pins 330) may be removed, rotated, translated, moved, and/or the like with respect to the rim in order to more easily facilitate installing the tire bead into the bead seat of the rim and/or removing the tire bead from the bead seat of the rim. In several of the embodiments disclosed herein, such secondary bead retention members are illustrated and described as including threads that enable the secondary bead retention members to be installed into a threaded receptacle of a rim, held in place during use, and removed from the receptacle (or at least moved and/or retracted with respect to the receptacle) when needed. Various other retention features and/or mechanisms may be used, however, to enable selective movement of the secondary bead retention members with respect to the rim and/or selective removal and installation of the secondary bead retention members with respect to the rim. The embodiment illustrated in FIGS. 24A-24D depicts one such embodiment.

With reference to the cross-sectional views of FIGS. 24C and 24D, it can be seen that the secondary bead retention members 2406 are shaped similarly to and function similarly to other secondary bead retention members disclosed herein (such as, for example, secondary bead retention members 106, 706, and 2006), except for the retention features or mechanisms used to retain the secondary bead retention members 2406 with respect to the rim 2402. In this embodiment, instead of the retention features or mechanisms comprising threads that retain the secondary bead retention member 2406 with respect to the rim 2402, the secondary bead retention member 2406 is retained with respect to the rim 2402 using retention features or mechanisms 2436 and 2437, which in this embodiment include a snap ring (retention feature 2436) that fits into a corresponding groove (retention feature 2437) in the rim 2402. In an exemplary tire change process, a tire installer may, for example, remove each of the snap rings 2436 using snap ring pliers, extract each of the secondary bead retention members 2406 from the receptacles of the rim 2402, remove the old tire from the rim, install the new tire on the rim, insert the secondary bead retention members 2406 back into the receptacles and the rim 2402, and finally reinstall the snap rings 2436 into the grooves 2437 using snap ring pliers in order to retain the secondary bead retention members 2406 with respect to the rim 2402.

Similar to other embodiments disclosed herein, the secondary bead retention members 2406 may be configured to form an airtight seal with the rim 2402, such as by including an O-ring in sealing gland 338. In some embodiments, the system may be configured such that retention feature 2436, such as a snap ring, applies a constant longitudinal force to the head 2440 of the secondary bead retention member 2406 in order to keep the O-ring in a longitudinally compressed state. In some embodiments, the O-ring may be configured to seal using radial compression between the rim 2402 and secondary bead retention member 2406 and may not require a constant longitudinal force applied by the retention feature 2436.

The embodiment of FIGS. 24A-24D illustrates one version of how secondary bead retention members 2406 may be movable and/or removably installable with respect to a rim without using threads. Various other techniques may be used, however, and are considered within the scope of the present disclosure. For example, secondary bead retention members may be retained with respect to the rim using other configurations of clips, snap rings, retaining rings, e-clips, or circlips, springs, ball lock mechanisms, detent mechanisms, cam lock mechanisms, friction fits, magnets, any combination thereof, and/or the like.

Further, the embodiment of FIGS. 24A-24D illustrates a head 2440 that comprises a generally cylindrical shape without any features for a wrench or other tool to interface with. This may be acceptable in some embodiments, for example, because the posts or pins 330 may have a slip fit with the rim 2402 that allows the secondary bead retention members 2406 to be removed from the rim 2402 without tools, air pressure within the tire could be used to help unseat the secondary bead retention members 2406 with respect to the receptacles in the rim 2402, and/or the like. It may be desirable in some embodiments, however, to include one or more features in the head 2440 of the secondary bead retention members 2406 that helps to facilitate insertion, removal, and/or movement of the secondary bead retention members 2406 with respect to the rim 2402. For example, the head 2440 could include a receptacle, a threaded receptacle, a protrusion, a threaded protrusion, one or more flats, and/or the like configured to enable an installer to grasp the secondary bead retention member 2406 (with a tool or otherwise) when installing, removing, or moving the secondary bead retention member 2406. In some embodiments, the assembly may be configured to require a special tool to remove one or more of the secondary bead retention members, such as to avoid vandalism, theft, and/or the like. Similar techniques could be used, for example, as are used in locking lug nuts that require a special tool for removal. As another example, the secondary bead retention members 2406 could include a ball lock, detent, and/or the like that needs to be activated by a special tool, such as a magnet or other tool, in order to unlock the secondary bead retention member 2406 from the rim for removal and/or movement with respect to the rim.

In some embodiments, one or more stop features or mechanisms may be included that allow the posts or pins 330 of the secondary bead retention members 2406 to be retracted with respect to the rim 2402 when installing or removing a tire, but that keep the secondary bead retention members 2406 from being fully removed from the rim 2402. For example, the post or pin 330 and/or the hole in the rim 2402 that the post or pin passes through may include a protrusion such as a pin, ball, or otherwise that slides within a longitudinally oriented groove of the other component. Such protrusion may limit the extent of the sliding or translating motion of the secondary bead retention member 2406 along its longitudinal axis. In some embodiments, the protrusion may be spring-loaded. For example, a spring-loaded ball could be used that stops the secondary bead retention member 2406 from retracting at a certain point, such as when the distal end of the pin or post 330 approaches or is near the primary bead retention hump 132. For example, the spring-loaded ball may contact the end of the longitudinal groove at that point. Such a configuration may also be configured such that further force applied to the secondary bead retention member 2406 could overcome the spring preload of the spring-loaded ball and allow the secondary bead retention member 2406 to be completely removed from the rim 2402. Such a configuration could be desirable, for example, because it could allow for easy replacement of the secondary bead retention members when needed. Such as configuration could also be desirable, for example, because it could allow for easy tire changes without completely removing the secondary bead retention members 2406 from the rim, thus reducing the risks of losing secondary bead retention members, contamination getting into the wheel through the receptacles for the secondary bead retention members, and/or the like.

Example Tire Mounting Process

Figure 25:
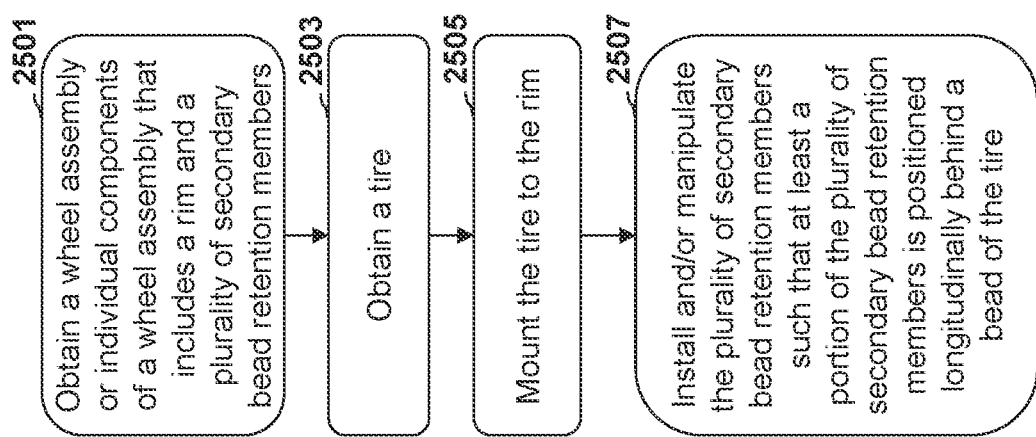
FIG. 25 is an embodiment of a process flow diagram illustrating a process for mounting a tire to a wheel assembly as disclosed herein.

FIG. 25 illustrates an example embodiment of a process flow diagram depicting a process for mounting a tire on a wheel assembly. The process illustrated in FIG. 25 may be used with various wheel assemblies disclosed herein that include secondary bead retention members. At block 2501, a wheel assembly, or individual components of a wheel assembly that includes a rim and a plurality of secondary bead retention members, is obtained. For example, a rim and a plurality of secondary bead retention members made in accordance with any of the embodiments disclosed herein may be purchased, manufactured, or otherwise obtained. In some embodiments, the secondary bead retention members may already be installed in the rim, and in some embodiments the secondary bead retention members may be separate from the rim.

At block 2503, a tire is obtained. At block 2505, the tire is mounted to the rim. In some embodiments, if the secondary bead retention members are in an installed position before the tire is mounted to the rim, the process may further include removing and/or manipulating the secondary bead retention members away from the installed position before mounting the tire to the rim.

At block 2507, the plurality of secondary bead retention members are installed and/or manipulated into an installed position, such that at least a portion of the plurality of secondary bead retention members is positioned longitudinally behind the bead of the tire. For example, in a wheel assembly that has removable secondary bead retention members, the secondary bead retention members may be installed into the rim. As another example, in a wheel assembly that has secondary bead retention members that may not be able to be removed or may not need to be removed, such as the secondary bead retention members 1206 of FIG. 13A, the secondary bead retention members may just be manipulated instead of installed.

Example Rim Manufacturing Process

Figure 26:
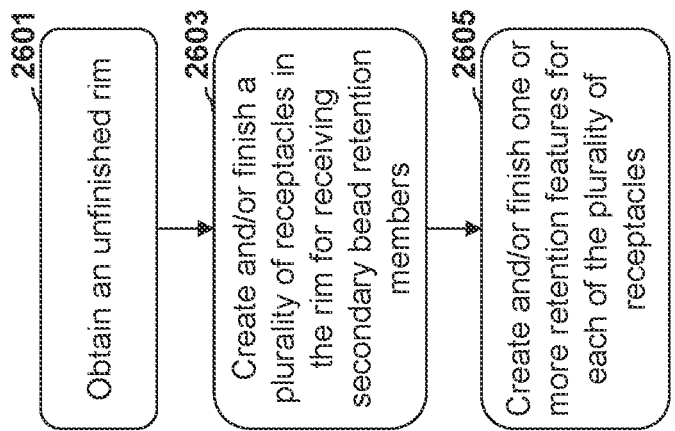
FIG. 26 is an embodiment of a process flow diagram illustrating a process for manufacturing a rim for a wheel assembly as disclosed herein.

FIG. 26 illustrates an example embodiment of a process flow diagram for manufacturing a rim for use with any of the wheel assemblies disclosed herein. At block 2601, and unfinished rim is obtained. An unfinished rim may be obtained in various ways. For example, a rim that does not have any receptacles for receiving secondary bead retention members may be purchased, manufactured, and/or the like. As another example, a rim that comprises unfinished receptacles, such as rough cast or rough machined receptacles may be purchased, manufactured, and/or the like.

At block 2603, a plurality of receptacles in the rim for receiving secondary bead retention members are created and/or finished. For example, in a rim that has no receptacles for secondary bead retention members when obtained at block 2601, the plurality of receptacles may be created and finished in block 2603. For example, the plurality of receptacles may be created in a single manufacturing process, such as drilling, milling, honing, and/or the like, or the plurality of receptacles may be created and finished through a number of manufacturing processes, such as drilling, milling, honing, and/or the like. Further, in an example where a rim that had rough cast or rough machined or similar features for the plurality of receptacles was obtained in block 2601, the process completed in block 2603 may involve one or more additional manufacturing processes, such as drilling, milling, honing, and/or the like that finish the plurality of receptacles.

At block 2605, one or more retention features for each of the plurality of receptacles are created and/or finished. For example, a thread may be tapped into the receptacles, a snap ring groove may be cut into the receptacles, another groove, void, hole, and/or the like may be manufactured into receptacles, and/or the like. It should be noted that, the processes performed in blocks 2601, 2603, and 2605 may not necessarily be conducted sequentially, and in some embodiments may be conducted simultaneously. For example, some embodiments may create and/or finish the one or more retention features at the same time as creating and/or finishing the plurality of receptacles. Further, some embodiments, may create and/or finish other portions of the rim at the same time as creating and/or finishing the plurality of receptacles and/or the retention features.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The headings used herein are for the convenience of the reader only and are not meant to limit the scope of the inventions or claims.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. Additionally, the skilled artisan will recognize that any of the above-described methods can be carried out using any appropriate apparatus. Further, the disclosure herein of any particular feature, aspect, method, property, characteristic, quality, attribute, element, or the like in connection with an embodiment can be used in all other embodiments set forth herein. For all of the embodiments described herein the steps of the methods need not be performed sequentially. Thus, it is intended that the scope of the present inventions herein disclosed should not be limited by the particular disclosed embodiments described above.

What is claimed is:

1. A wheel assembly comprising:
   a rim for mounting thereon of a tire, the rim comprising
      a barrel having a pressurized side and an ambient side, the barrel comprising a bead retention portion that comprises:
         an annular flange for engaging a longitudinal outer surface of a bead of the tire, the annular flange defining a vertical plane;
         an annular bead seat for engaging a radial inner surface of the bead of the tire, the annular bead seat extending longitudinally inward from the flange; and
         a plurality of receptacles each comprising an inner opening through the pressurized side of the barrel, an outer opening through the ambient side of the barrel, and a threaded region between the inner and outer openings;
   a plurality of bead retention members, each of the plurality of bead retention members being movably coupleable to a receptacle of the plurality of receptacles, each of the plurality of bead retention members comprising:
      a head shaped for rotational manipulation by a hand tool;
      a threaded shaft sized to engage the threaded region of a receptacle; and
      a smooth shaft sized to extend through the inner opening of a receptacle and to extend radially beyond the bead seat with the bead retention member coupled to a receptacle, the smooth shaft comprising a distal end that is aligned axially with the threaded shaft; and
   a plurality of sealing members each configured to create an airtight seal between a bead retention member of the plurality of bead retention members and a receptacle of the plurality of receptacles,
   wherein the plurality of receptacles are each positioned such that, with the plurality of bead retention members coupled to the plurality of receptacles, each of the smooth shafts is positioned at a non-parallel angle to the vertical plane, with the distal end of the smooth shaft positioned closer to the vertical plane than a proximal end of the smooth shaft, and with the distal end of the smooth shaft suspended radially above a portion of the annular bead seat.

2. The wheel assembly of claim 1, further comprising:
   the tire mounted on the rim with the outer surface of the bead of the tire engaging the annular flange,
   wherein the plurality of receptacles are each positioned such that, with the plurality of bead retention members coupled to the plurality of receptacles and the tire pressurized to at least 15 psi with no external forces applied to the tire along a longitudinal direction, each of the smooth shafts is engaged with and at least partially compresses an inner surface of the bead of the tire.

3. The wheel assembly of claim 1, wherein the plurality of bead retention members are configured to be removable and re-coupleable to the plurality of receptacles using a hand tool without damaging the plurality of bead retention members or the plurality of receptacles.

4. The wheel assembly of claim 1, wherein the bead retention members are not expandable.

5. The wheel assembly of claim 1, wherein the bead retention portion of the barrel further comprises:
   a bead retention ridge positioned longitudinally behind the bead seat, extending about a circumference of the pressurized side of the barrel, and protruding radially outward beyond at least a portion of the bead seat,
   wherein the plurality of receptacles are positioned such that at least a portion of each inner opening passes through the bead retention ridge.

6. The wheel assembly of claim 1, wherein the non-parallel angle is within a range of 5° to 35°.

7. The wheel assembly of claim 1, wherein the non-parallel angle is within a range of 10° to 30°.

8. The wheel assembly of claim 1, wherein the non-parallel angle is within a range of 15° to 25°.

9. The wheel assembly of claim 1, wherein the plurality of receptacles comprises at least 8 receptacles spaced angularly apart about a circumference of the barrel.

10. The wheel assembly of claim 1, wherein the plurality of receptacles comprises at least 12 receptacles spaced angularly apart about a circumference of the barrel.

11. The wheel assembly of claim 1, wherein the rim comprises a longitudinal outboard end and a longitudinal inboard end, wherein the bead retention portion is positioned at the longitudinal outboard end.

12. A wheel assembly comprising:
    a rim for mounting thereon of a tire, the rim comprising
       a barrel having a pressurized side and an ambient side, the barrel comprising a bead retention portion that comprises:
          an annular flange for engaging a longitudinal outer surface of a bead of the tire;
          an annular bead seat for engaging a radial inner surface of the bead of the tire, the annular bead seat extending longitudinally inward from the flange; and
          a plurality of receptacles each comprising an inner opening through the pressurized side of the barrel, an outer opening through the ambient side of the barrel, and a pocket between the inner opening and outer opening;
    a plurality of bead retention members, each of the plurality of bead retention members being rotatably coupleable to a receptacle of the plurality of receptacles and having a first rotational orientation and a second rotational orientation, each of the plurality of bead retention members comprising:
a head shaped for rotational manipulation by a hand tool;
a shaft extending from the head and defining a rotational axis; and
a protrusion extending from the shaft in a direction other than parallel to the rotational axis; and
a plurality of sealing members each configured to create an airtight seal between a bead retention member of the plurality of bead retention members and a receptacle of the plurality of receptacles,
wherein the plurality of receptacles are each positioned such that:
with the plurality of bead retention members in the first rotational orientation, the protrusion of each of the plurality of bead retention members extends through the inner opening of a receptacle with a distal end of the protrusion positioned radially beyond the annular bead seat, and
with the plurality of bead retention members in the second rotational orientation, the distal end of the protrusion of each of the plurality of bead retention members is positioned within the pocket of the receptacle.

13. The wheel assembly of claim 12, wherein the protrusion extends from the shaft in a direction that is perpendicular to the rotational axis.

14. The wheel assembly of claim 12, wherein the protrusion extends from the shaft in a direction other than parallel to the rotational axis and other than perpendicular to the rotational axis.

15. The wheel assembly of claim 12, wherein the annular flange defines a vertical plane, and the rotational axis is perpendicular to the vertical plane.

16. The wheel assembly of claim 12, wherein the bead retention portion of the barrel further comprises:
a bead retention ridge positioned longitudinally behind the bead seat, extending about a circumference of the pressurized side of the barrel, and protruding radially outward beyond at least a portion of the bead seat,
wherein the plurality of receptacles are positioned such that at least a portion of each inner opening passes through the bead retention ridge, and
wherein the protrusion of the bead retention member does not extend radially beyond the bead retention ridge in the second rotational orientation.

17. The wheel assembly of claim 12, wherein the plurality of receptacles comprises at least 8 receptacles spaced angularly apart about a circumference of the barrel.

18. The wheel assembly of claim 12, wherein the plurality of receptacles comprises at least 12 receptacles spaced angularly apart about a circumference of the barrel.

19. The wheel assembly of claim 12, further comprising:
the tire mounted on the rim with the longitudinal outer surface of the bead of the tire engaging the annular flange,
wherein the plurality of bead retention members are coupled to the plurality of receptacles in the first rotational orientation, and
wherein the distal end of each protrusion is spaced apart from the bead of the tire.

20. The wheel assembly of claim 12, wherein the rim comprises a longitudinal outboard end and a longitudinal inboard end, wherein the bead retention portion is positioned at the longitudinal outboard end.

21. A wheel assembly comprising:
a rim for mounting thereon of a tire, the rim comprising a barrel having a pressurized side and an ambient side, the barrel comprising a bead retention portion that comprises:
an annular flange for engaging a longitudinal outer surface of a bead of the tire, the annular flange defining a vertical plane;
an annular bead seat for engaging a radial inner surface of the bead of the tire, the annular bead seat extending longitudinally inward from the flange; and
a plurality of receptacles each comprising an inner opening through the pressurized side of the barrel, an outer opening through the ambient side of the barrel, and a threaded region between the inner and outer openings;
a plurality of bead retention members, each of the plurality of bead retention members being movably coupleable to a receptacle of the plurality of receptacles, each of the plurality of bead retention members comprising:
a head shaped for rotational manipulation by a hand tool;
a threaded shaft sized to engage the threaded region of a receptacle; and
a smooth shaft sized to extend through the inner opening of a receptacle and to extend radially beyond the bead seat with the bead retention member coupled to a receptacle; and
a plurality of sealing members each configured to create an airtight seal between a bead retention member of the plurality of bead retention members and a receptacle of the plurality of receptacles,
wherein the plurality of receptacles are each positioned such that, with the plurality of bead retention members coupled to the plurality of receptacles, each of the smooth shafts is positioned at a non-parallel angle to the vertical plane, with a distal end of the smooth shaft positioned closer to the vertical plane than a proximal end of the smooth shaft, and with the distal end of the smooth shaft suspended radially above a portion of the annular bead seat,
wherein the bead retention portion of the barrel further comprises a bead retention ridge positioned longitudinally behind the bead seat, extending about a circumference of the pressurized side of the barrel, and protruding radially outward beyond at least a portion of the bead seat, and
wherein the plurality of receptacles are positioned such that at least a portion of each inner opening passes through the bead retention ridge.

22. The wheel assembly of claim 21, wherein the non-parallel angle is within a range of 5° to 35°.

23. The wheel assembly of claim 21, wherein the rim comprises a longitudinal outboard end and a longitudinal inboard end, wherein the bead retention portion is positioned at the longitudinal outboard end.

* * * * *